(12) United States Patent
Wright

(10) Patent No.: US 7,635,304 B2
(45) Date of Patent: *Dec. 22, 2009

(54) MULTIPLE LEVELS OF PARTICIPATION IN A LOTTERY JACKPOT

(75) Inventor: Robert Wright, Irving, TX (US)

(73) Assignee: Integrated Group Assets Inc., Dallas, TX (US)

( * ) Notice: Subject to any disclaimer, the term of this patent is extended or adjusted under 35 U.S.C. 154(b) by 668 days.

This patent is subject to a terminal disclaimer.

(21) Appl. No.: 11/044,427

(22) Filed: Jan. 26, 2005

(65) Prior Publication Data

US 2005/0176490 A1 Aug. 11, 2005

Related U.S. Application Data

(63) Continuation-in-part of application No. 10/987,474, filed on Nov. 12, 2004, which is a continuation-in-part of application No. 10/879,939, filed on Jun. 28, 2004, which is a continuation-in-part of application No. 10/876,390, filed on Jun. 25, 2004, which is a continuation-in-part of application No. 10/766,676, filed on Jan. 27, 2004, now Pat. No. 6,935,948, application No. 11/044,427, which is a continuation-in-part of application No. 10/766,656, filed on Jan. 27, 2004.

(51) Int. Cl.
*A63F 13/00* (2006.01)
(52) U.S. Cl. .............................. 463/17; 463/26; 463/27; 273/139
(58) Field of Classification Search .................. 463/17, 463/26, 27; 273/138, 139
See application file for complete search history.

(56) References Cited

U.S. PATENT DOCUMENTS 4,157,829 A 6/1979 Goldman et al.

(Continued)

FOREIGN PATENT DOCUMENTS

WO WO 01/18759 3/2001

(Continued)

OTHER PUBLICATIONS

International Search Report dated Oct. 24, 2005 for PCT/US2005/003010.

(Continued)

*Primary Examiner*—Dmitry Suhol
*Assistant Examiner*—Joshua P. Wert
(74) *Attorney, Agent, or Firm*—Patent Ingenuity, P.C.; Samuel K. Simpson

(57) ABSTRACT

A virtual lottery unit can be utilized by a player to play a virtual lottery. A virtual lottery ticket display is provided to display a plurality of virtual lottery ticket prices. Each of the virtual lottery ticket prices corresponds to a distinct known percentage of a progressive jackpot that can be won with a winning virtual lottery number. The progressive jackpot increases progressive jackpot increases in size based on a portion of ticket sales revenue and that can be won with a winning virtual lottery number. A price selection input receives a selection of the virtual lottery ticket price of which the lottery ticket is to be purchased. Further, a number selection input receives a selection of a virtual lottery ticket number from the player. In addition, a random number generator generates the winning virtual lottery ticket number. A virtual lottery processor compares the selection of the virtual lottery ticket number form the player with the winning virtual lottery ticket number.

60 Claims, 33 Drawing Sheets

U.S. PATENT DOCUMENTS

| | | | | |
|---|---|---|---|---|
| 4,494,197 | A | 1/1985 | Troy et al. | |
| 4,652,998 | A * | 3/1987 | Koza et al. | 463/26 |
| 4,689,742 | A | 8/1987 | Troy et al. | |
| 4,991,848 | A * | 2/1991 | Greenwood et al. | 463/21 |
| 5,083,784 | A | 1/1992 | Nilssen | |
| 5,223,698 | A | 6/1993 | Kapur | |
| 5,282,620 | A | 2/1994 | Keesee | |
| 5,286,023 | A | 2/1994 | Wood | |
| 5,380,007 | A | 1/1995 | Travis | |
| RE35,864 | E | 7/1998 | Weingardt | |
| 5,851,149 | A | 12/1998 | Xidos et al. | |
| 5,855,514 | A | 1/1999 | Kamille | |
| 6,017,032 | A * | 1/2000 | Grippo et al. | 273/138.1 |
| 6,105,007 | A | 8/2000 | Norris | |
| 6,168,521 | B1 | 1/2001 | Luciano et al. | |
| 6,296,569 | B1 * | 10/2001 | Congello, Jr. | 463/17 |
| 6,371,855 | B1 | 4/2002 | Gavriloff | |
| 6,416,408 | B2 | 7/2002 | Tracy et al. | |
| 6,454,650 | B1 | 9/2002 | Aronin | |
| 6,527,175 | B1 | 3/2003 | Dietz et al. | |
| 6,554,710 | B1 * | 4/2003 | Olson | 463/42 |
| 6,572,106 | B2 * | 6/2003 | Alexoff | 273/138.1 |
| 6,648,753 | B1 | 11/2003 | Tracy et al. | |
| 6,692,354 | B2 | 2/2004 | Tracy et al. | |
| 6,840,857 | B2 | 1/2005 | Ghela | |
| 6,869,362 | B2 | 3/2005 | Walker et al. | |
| 6,887,152 | B2 * | 5/2005 | Stanek | 463/17 |
| 6,935,948 | B2 * | 8/2005 | Wright | 463/17 |
| 7,347,776 | B2 * | 3/2008 | Wright | 463/17 |
| 7,351,142 | B2 * | 4/2008 | Walker et al. | 463/17 |
| 2002/0180151 | A1 * | 12/2002 | Alexoff | 273/292 |
| 2003/0003984 | A1 | 1/2003 | Petruzzi | |
| 2003/0045339 | A1 | 3/2003 | Ghela | |
| 2003/0050109 | A1 | 3/2003 | Caro et al. | |
| 2003/0069059 | A1 * | 4/2003 | Stanek | 463/17 |
| 2003/0080507 | A1 | 5/2003 | Higginson | |
| 2003/0154094 | A1 | 8/2003 | Bredemeier et al. | |
| 2003/0186735 | A1 | 10/2003 | Byrne | |
| 2003/0187765 | A1 | 10/2003 | Sgaraglio | |
| 2003/0190959 | A1 * | 10/2003 | Olson | 463/42 |
| 2003/0226028 | A1 | 12/2003 | Kra | |
| 2003/0232651 | A1 | 12/2003 | Huard et al. | |
| 2004/0058726 | A1 | 3/2004 | Klugman | |
| 2004/0088203 | A1 | 5/2004 | Kakuwa | |
| 2004/0103011 | A1 | 5/2004 | Hatano et al. | |
| 2004/0110554 | A1 | 6/2004 | Bromfield | |
| 2004/0110556 | A1 | 6/2004 | Bromfield | |
| 2004/0116176 | A1 | 6/2004 | Tulley et al. | |
| 2004/0139032 | A1 | 7/2004 | Rowan | |
| 2004/0172317 | A1 | 9/2004 | Davis et al. | |
| 2004/0173965 | A1 | 9/2004 | Stanek | |
| 2004/0185931 | A1 | 9/2004 | Lowell et al. | |
| 2005/0164768 | A1 * | 7/2005 | Wright | 463/17 |
| 2005/0164770 | A1 * | 7/2005 | Wright | 463/17 |
| 2005/0165619 | A1 * | 7/2005 | Wright | 705/1 |
| 2005/0176490 | A1 * | 8/2005 | Wright | 463/17 |
| 2006/0064330 | A1 | 3/2006 | Sumino et al. | |

FOREIGN PATENT DOCUMENTS

| | | |
|---|---|---|
| WO | WO 01/42968 | 6/2001 |
| WO | WO 02/07018 | 1/2002 |
| WO | WO 02/27424 | 4/2002 |
| WO | WO 03/091958 | 11/2003 |

OTHER PUBLICATIONS

McQueen, Patricia A., "Lotteries Offer Add-on Games Attached To Existing Online Options", International Gaming & Wagering Business, Apr. 2004, pp. 22, 26-27.

Patel, Freny, "Lottery Firms Seek Cover For Jackpots," rediff.com, Jul. 4, 2003.

European Examination Report dated Jul. 17, 2009 for European Patent Application No. 05712446.3-1238.

European Examination Report dated Jul. 17, 2009 for European Patent Application No. 04777229.8-1238.

* cited by examiner

Jackpot = $10,000,000

| Price Category | Jackpot % |
|---|---|
| $3 | 100% |
| $2 | 50% |
| $1 | 25% |

MULTIPLE LEVELS OF PARTICIPATION IN A LOTTERY JACKPOT

RELATED APPLICATIONS

This application is a Continuation-In-Part application of U.S. patent application Ser. No. 10/987,474, filed on Nov. 12, 2004, entitled VIRTUAL LOTTERY by Robert J. Wright, which is a Continuation-In-Part application of U.S. patent application Ser. No. 10/879,939, filed on Jun. 28, 2004, entitled LOTTERY TICKET DISPENSING MACHINE FOR MULTIPLE PRICED TICKETS BASED ON VARIABLE RATIOS by Robert J. Wright, which is a Continuation-In-Part application of U.S. patent application Ser. No. 10/876,390, filed on Jun. 25, 2004, entitled MULTIPLE PRICING IN A LOTTERY BASED ON VARIABLE RATIOS by Robert J. Wright, which is a Continuation-In-Part application of U.S. patent application Ser. No. 10/766,676, filed on Jan. 27, 2004 now U.S. Pat. No. 6,935,948, entitled MULTIPLE PRICING SHARED SINGLE JACKPOT IN A LOTTERY by Robert J. Wright; and all of which are hereby incorporated by reference in their entireties. This application is also a Continuation-In-Part application of U.S. patent application Ser. No. 10/766,656, filed on Jan. 27, 2004, entitled A SYSTEM AND METHOD OF PROVIDING A GUARANTEE IN A LOTTERY by Robert J. Wright, and which is hereby incorporated by reference in its entirety.

BACKGROUND

1. Field

A system and method are disclosed which generally relate to gaming, and more specifically to lotteries.

2. General Background

A lottery is generally a distribution of tokens such that a subset of the distributed tokens may win a prize. The token can be in the form of a ticket. One of the most popular forms of lottery involves the distribution of lottery tickets. Each lottery ticket includes a lottery number. After the lottery tickets have been distributed to the lottery ticket holders, the winning number is chosen. The usual method of selecting the winning number involves a random selection of the winning number. A random number generator can be used to randomly select the winning number. Some lottery systems require the ticket to have the entire number that is randomly selected while other lottery systems require the ticket to have a superset of an ordered sequence of numbers that are randomly selected.

Lotteries as normally used by jurisdictions reflect a pari-mutuel model in which the prize is funded by a portion of the ticket sales. One potential problem with the pari-mutuel model is that a sufficient number of tickets need to be sold in order to provide a reasonable lottery prize. However, interest in purchasing lottery tickets is generally stimulated only when the prize becomes substantial. For instance, a large number of lottery tickets are purchased in a $10 million dollar lottery, but a disproportionately large number of lottery tickets are purchased in a $50 million dollar lottery.

In addition, traditional lotteries sell tickets for one price. If there are multiple winners of a jackpot, the winners split the jackpot prize.

SUMMARY

In one aspect, there is virtual lottery unit in which a player can play a virtual lottery comprised of a virtual lottery ticket price display that displays a plurality of virtual lottery ticket prices, each of the virtual lottery ticket prices corresponding to a distinct known percentage of a progressive jackpot that can be won with a winning virtual lottery number. A progressive jackpot increases as the sales from the virtual lottery tickets increase. A price selection input receives a selection of the virtual lottery ticket price of which a virtual lottery ticket is to be purchased. A number selection input receives a selection of a virtual lottery ticket number from the player. A random number generator generates the winning virtual lottery ticket number. A virtual lottery processor compares the selection of the virtual lottery ticket number from the player with the winning virtual lottery ticket number. The virtual lottery processor calculates the distribution of the jackpot to the player based upon the distinct known percentage associated with the virtual lottery ticket price selected by the player if the virtual lottery ticket number from the player equals the winning virtual lottery ticket number.

In another aspect, there is virtual lottery unit. The jackpot is a probabilistic jackpot that has a value which can be greater than revenue generated from the sale of the virtual lottery tickets. The jackpot can be guaranteed by a third party entity.

In one aspect, the portion of ticket sale revenue is accumulated according to distinct or identical percentages, each of the distinct or identical percentages being associated with each of the distinct virtual lottery ticket prices.

In another aspect, the portion of ticket sale revenue is accumulated according to distinct or identical amounts, each of the identical or distinct amounts being associated with each of the distinct virtual lottery ticket prices.

In another aspect, the virtual lottery ticket price selected by the player is the least expensive price, and if the virtual lottery ticket number from the player equals the winning virtual lottery ticket number, the player is provided with the distribution of the progressive jackpot. In another aspect, the virtual lottery ticket selected by the player is the most expensive price, and if the virtual lottery ticket number from the player equals the winning virtual lottery ticket number, the player is provided with the distribution of the progressive jackpot.

In another aspect, there virtual lottery unit that receives value of the progressive jackpot from a server. The virtual lottery unit can further comprise a memory which stores the value of the progressive jackpot. The virtual lottery unit can be linked to a plurality of virtual lottery units, the virtual lottery unit and the plurality of virtual lottery units being connected through the server.

In another aspect, the server sends the increased value of the progressive jackpot to each one of the plurality of virtual lottery units. In yet another aspect, the server sends a value representative of the portion of ticket sale revenue to each one of the plurality of virtual lottery units. In another aspect, the ticket sales revenue is generated by the virtual lottery unit, or by the virtual lottery unit and an additional virtual lottery unit connected through a network or by a plurality of additional virtual lottery units connected through a network.

In one aspect, there is a virtual lottery system. A server stores a progressive jackpot that can be won with a winning virtual lottery number. The progressive jackpot increases in size based on a portion of ticket sales revenue. A plurality of virtual lottery units communicates with the server, each of the plurality of virtual lottery units receive the progressive jackpot value from the server. Each of the virtual lottery units has a virtual lottery ticket price display that displays a plurality of virtual lottery ticket prices. Each of the virtual lottery ticket prices corresponding to a distinct known percentage of the progressive jackpot value. Each of the virtual lottery units having a number selection input that receives a selection of a virtual lottery ticket number from the player.

In another aspect, the server compares the virtual lottery ticket number received from a virtual lottery unit with the winning virtual lottery ticket number to determine if the lottery has been won by the player.

In yet another aspect, after a virtual lottery ticket is purchased at one of the plurality of virtual lottery units, the server sends an increased progressive jackpot value to each of the plurality of virtual lottery units so that each of the plurality of virtual lottery units can provide the player with a current progressive jackpot value.

In another aspect, the server determines the increased progressive jackpot value by adding a previously stored progressive jackpot value and a percentage of the price of the virtual lottery ticket sold. In on aspect, the server determines the increased progressive jackpot value by adding a previously stored progressive jackpot value and a fixed amount.

In another aspect, the server calculates the distributions of the progressive jackpot value that can be won by computing the percentages associated with each of the virtual lottery ticket prices in relation to the progressive jackpot.

In another aspect, the server sends the calculated distributions to each of the plurality of virtual lottery units. In another aspect, the server periodically recalculates an increased progressive jackpot by querying each of the plurality of virtual lottery units for a total amount of sales since a previous query, and wherein the server sends the increased progressive jackpot value to each of the virtual lottery units so that the virtual lottery units can provide the player with a current progressive jackpot value.

In another aspect, the server calculates the distributions of the progressive jackpot value that can be won by computing the percentages associated with each of the virtual lottery ticket prices. In another aspect, the server sends the calculated distributions to each of the plurality of virtual lottery units. In another aspect, the server decreases the progressive jackpot value after a player has won a virtual lottery.

In another aspect, the server sends the decreased progressive jackpot value to each of the virtual lottery units so that the virtual lottery units can provide the player with the current progressive jackpot value. In another aspect, the server calculates the distributions of the decreased progressive jackpot value that can be won by computing the percentages associated with each of the virtual lottery ticket prices in relation to the decreased progressive jackpot.

In another aspect, the portion of ticket sales revenue is accumulated according to distinct percentages, each of the distinct percentages being associated with each of the virtual lottery ticket prices. In another aspect, the player selects a virtual lottery ticket price, the virtual lottery ticket price selected by the player being the least expensive price, and if the virtual lottery ticket number received from a virtual lottery unit with the winning virtual lottery ticket number, the player is provided with a distribution of the progressive jackpot. In another aspect, the player selects a virtual lottery ticket price, the virtual lottery ticket price selected by the player being the most expensive price, and if the virtual lottery ticket number received from a virtual lottery unit with the winning virtual lottery ticket number, the player is provided with a distribution of the progressive jackpot.

In another aspect, the portion of ticket sales revenue is accumulated according to identical percentages, each of the identical percentages being associated with each of the virtual lottery ticket prices. In another aspect, the portion of ticket sales revenue is accumulated according to distinct amounts, each of the distinct amounts being associated with each of the virtual lottery ticket prices. In another aspect, the portion of ticket sales revenue is accumulated according to identical amounts, each of the identical amounts being associated with each of the virtual lottery ticket prices.

In another aspect, the ticket sales revenue is generated by one of the plurality of virtual lottery units. In another aspect, the ticket sales revenue is generated by one of the plurality virtual lottery units and an additional one of the plurality of virtual lottery units connected through a network. In another aspect, the ticket sales revenue is generated by one the plurality of virtual lottery units.

In one aspect, there is a method of operating a virtual lottery. A selection of a virtual lottery ticket price is received. A percentage of a progressive jackpot value that increases in size based on a portion of virtual lottery ticket sales revenue is determined. The percentage of the progressive jackpot can be won according to the selection of the virtual lottery ticket price. A player selection of a virtual lottery ticket number is received. A winning virtual lottery number is randomly generated. The virtual lottery ticket number is compared with the randomly generated winning lottery number. The percentage of the jackpot is provided to the player if the virtual lottery ticket number equals the randomly generated winning lottery number.

In another aspect, the portion of ticket sales revenue is accumulated according to distinct percentages, each of the distinct percentages being associated with each of the virtual lottery ticket prices. In another aspect, the virtual lottery ticket price selected by the player is the least expensive price, and if the virtual lottery ticket number equals the randomly generated winning lottery number, the player is provided with the distribution of the progressive jackpot. In another aspect, the virtual lottery ticket price selected by the player is the most expensive price, if the virtual lottery ticket number equals the randomly generated winning lottery number, the player is provided with the distribution of the progressive jackpot.

In yet another aspect, the portion of ticket sales revenue is accumulated according to identical percentages, each of the identical percentages being associated with each of the virtual lottery ticket prices. In another aspect, the portion of ticket sales revenue is accumulated according to distinct amounts, each of the distinct amounts being associated with each of the virtual lottery ticket prices. In another aspect, the portion of ticket sales revenue is accumulated according to identical amounts, each of the identical amounts being associated with each of the virtual lottery ticket prices.

In another aspect, the ticket sales revenue is generated by a virtual lottery unit. In another aspect, the ticket sales revenue is generated by a virtual lottery unit and an additional virtual lottery unit connected through a network. In another aspect, the ticket sales revenue is generated by a virtual lottery unit and a plurality of additional virtual lottery units connected through a network.

In another aspect, the portion of ticket sales revenue is based on sales of virtual lottery tickets having different virtual lottery ticket prices. In another aspect, the virtual lottery ticket price selected by the player is the least expensive price. In another aspect, the virtual lottery ticket price selected by the player is the most expensive price. In another aspect, the progressive jackpot value is increased by adding a previously stored progressive jackpot value and a percentage of the virtual lottery ticket price.

In another aspect, the progressive jackpot value is increased by adding a previously stored progressive jackpot value and a fixed value. In another aspect, the distributions of the progressive jackpot value that can be won are calculated by computing the percentage of the progressive jackpot can be won according to the selection of the virtual lottery ticket price.

In another aspect, the increased progressive jackpot value is communicated to a plurality of players, wherein each one of the plurality of players may participate in the virtual lottery, the virtual lottery utilizing the increased progressive jackpot value. In another aspect, the increased progressive jackpot value is communicated to a plurality of virtual lottery units, the virtual lottery units utilizing the increased progressive jackpot value.

BRIEF DESCRIPTION OF THE DRAWINGS

By way of example, reference will now be made to the accompanying drawings.

DETAILED DESCRIPTION OF THE DISCLOSURE

A system and method are disclosed for a virtual lottery. A lottery player can purchase a virtual lottery ticket as opposed to a paper lottery ticket. Further, the lottery player will find out instantly whether the virtual lottery ticket has a winning lottery number rather than having to wait hours or even days for a drawing with respect to a paper lottery ticket. In essence, the virtual lottery player is provided with a similar experience to playing in an actual lottery through an electronic machine.

FIGS. 1-23 illustrate various embodiments of a lottery. In addition, FIGS. 24-28 illustrate the virtual lottery. The various features illustrated in FIGS. 1-23 can be implemented in the virtual lottery.

An overview of FIGS. 1-23 is now provided. After describing FIGS. 1-23, the disclosure explains how many of the features in FIGS. 1-23 can be implemented in the virtual lottery as illustrated in FIGS. 24-28. FIGS. 24-28 illustrate various embodiments of the virtual lottery. Finally, FIGS. 30-34 illustrate a virtual lottery with a progressive jackpot.

Figure 1:
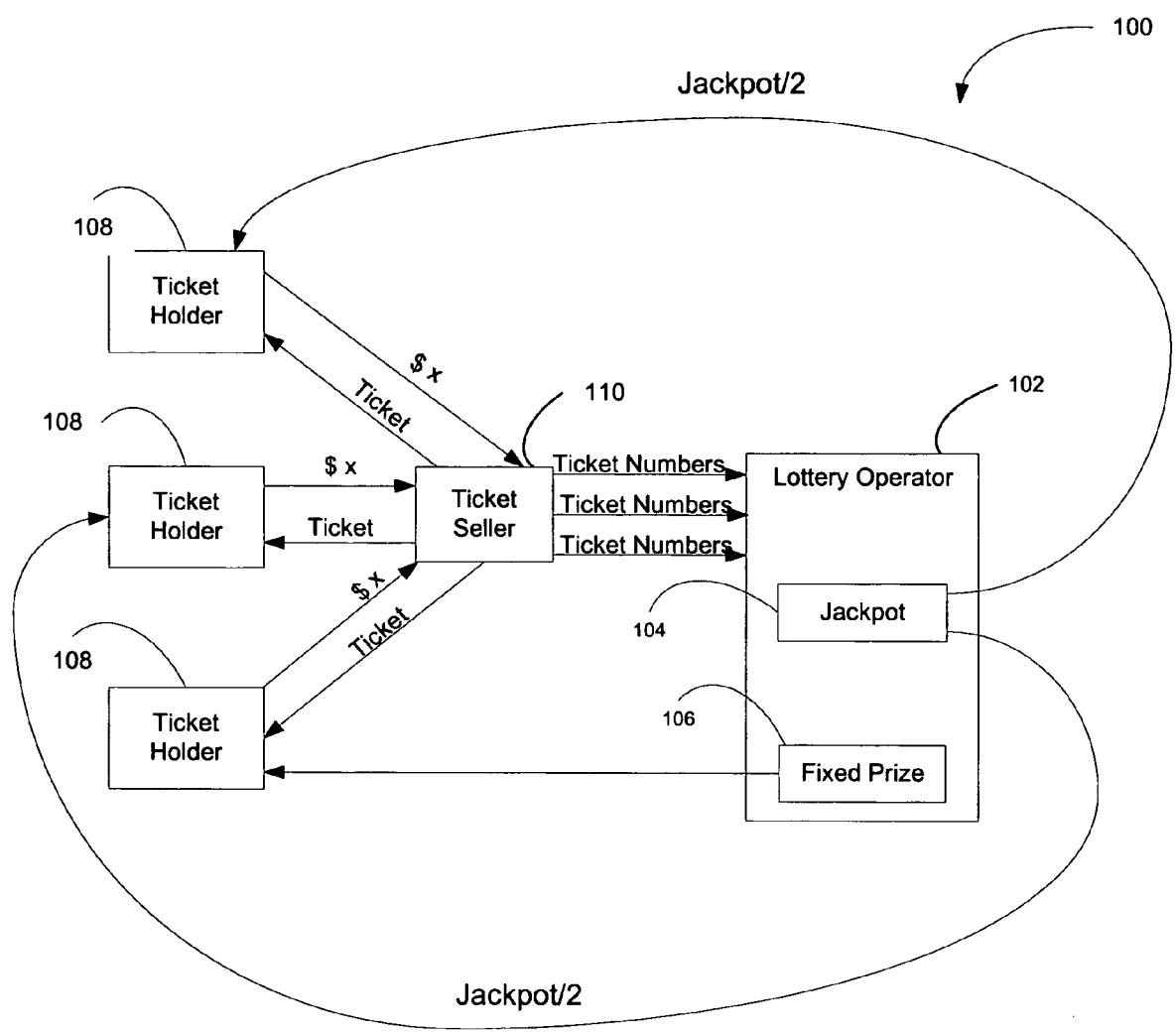
FIG. 1 illustrates a single priced lottery system that is based on a pari-mutuel model.

FIG. 1 illustrates a single priced lottery system 100 that is based on a pari-mutuel model. A lottery operator 102 establishes the lottery. The lottery operator 102 can be a jurisdiction such as a country, state, province, city, town, municipality, or any division or department thereof. Further, the lottery operator 102 can be a private organization that a jurisdiction hires to coordinate the lottery. The lottery operator 102 can also be a private organization that is not hired by a jurisdiction. The coordination involved can include establishment, maintenance, operation and oversight and/or winnings determination.

The lottery operator 102 can advertise that a lottery has a prize. For example, the lottery operator 102 can advertise that the lottery prize will be a minimum of ten million dollars. The lottery operator 102 provides the lottery prize from a jackpot 104. In one embodiment, the jackpot 104 is a variable jackpot that increases through allocation of a portion of the ticket sales. The lottery operator 102 can also provide a fixed prize 106. In one embodiment, ticket holders 108 purchase tickets at a price of $x per ticket from a ticket seller 110. The ticket seller then sends the ticket numbers on each of the tickets to the lottery operator, typically through a computer network 102. If one of the ticket holders 108 wins the lottery, the lottery operator 102 disburses the jackpot 104 to the ticket holder 108. On the other hand, if multiple ticket holders 108 win the lottery, the multiple ticket holders with the winning tickets split the jackpot 104. For instance, FIG. 1 illustrates two ticket holders 108 winning the lottery. The lottery operator 102 then splits the jackpot 104 and distributes half of the jackpot to each of the ticket holders 108.

The lottery operator 102 can also distribute a fixed prize 106. A ticket holder 108 can win a fixed prize that the ticket holder 108 does not have to share with other ticket holders 108. For instance, if multiple ticket holders 108 won the fixed prize 106, the lottery operator 102 would distribute the fixed prize 106 in its entirety to each of the multiple ticket holders 108 that won the fixed prize 106. In one embodiment, the multiple pricing method and system can be applied to the fixed prize 106. The ticket holder 106 can qualify for the higher fixed prize 106 by purchasing a higher priced ticket.

In one embodiment, the lottery operator 102 can use a random number generator (not shown) to determine the winning number. In another embodiment, the lottery operator 102 can use a ball draw machine to randomly select the winning number.

One of the difficulties of the single priced lottery system 100 is that the single priced lottery system 100 does not optimize the amount spent by a customer and the size of the jackpot 104. Some ticket holders 108 may want to purchase a less expensive lottery ticket even if the associated prize is relatively small. Further, some ticket holders 108 may not wish to purchase a lottery ticket unless the jackpot 104 is very large. These ticket holders 108 may be willing to pay more for a lottery ticket that provides a larger prize. Further, some ticket holders 108 generally buy lottery tickets in almost any lottery regardless of the size of the jackpot 104. The single priced lottery system 100 does not optimize the performance of a lottery since it does not create an optimal incentive for the customer to spend more and thereby increase the revenue of the lottery.

Figure 2:
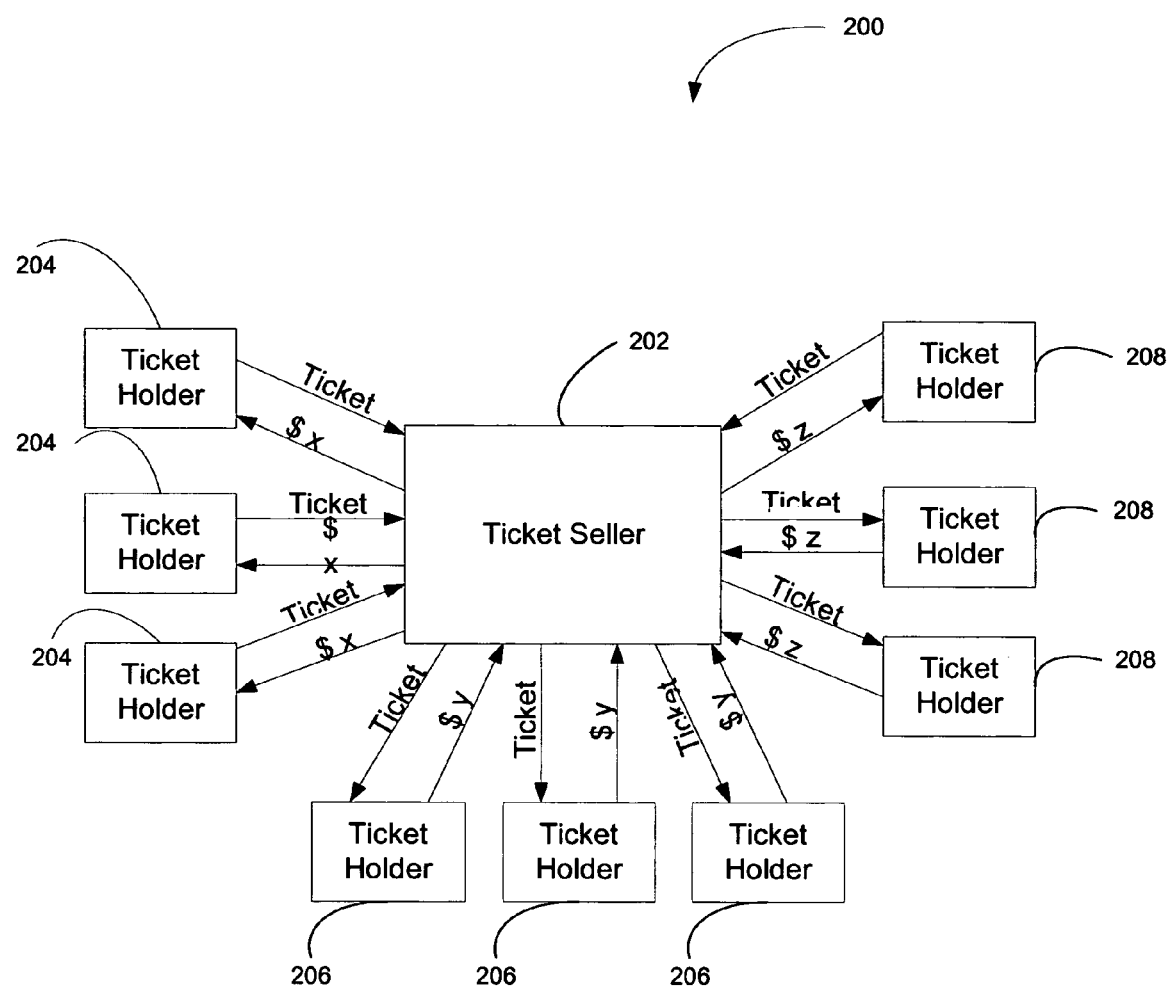
FIG. 2 illustrates a shared multiple-priced single-pool lottery system.

FIG. 2 also illustrates that a ticket holder 206 can purchase a lottery ticket in a second price category. For instance, the second price category can be lottery tickets purchased for $y. The second price category is associated with a second distribution of a lottery prize that can be won. For example, the ticket holder 206 may have purchased the lottery ticket for two dollars in order to win fifty percent of the jackpot. In one embodiment, if the only winning lottery ticket or winning lottery tickets are in the second price category, then the second distribution is distributed according to a second price category intra sharing distribution formula. In one embodiment, the second price category intra sharing distribution formula requires an even distribution among all the winners in the second price category. In the example above, if two ticket holders 206 have winning ticket numbers, the two ticket holders 206 share the applicable distribution evenly. In the example, the second distribution of the prize or in combination of the first and second distributions was fifty percent. Therefore, the two ticket holders 206 would each receive twenty five percent of the prize. In one embodiment, if the ticket holder 206 is the only winning ticket in the lottery, the second price category intra sharing distribution formula provides the entirety of the second distribution of the prize to the ticket holder 206. In this example, the ticket holder 206 would receive fifty percent of the jackpot.

In one embodiment, the progressive model can be applied so that each price category benefits. If the jackpot increases in size, potential winnings for each price category can increase because the jackpot increases.

In one embodiment, if the only winning lottery ticket or winning lottery tickets are in the first price category, then the first distribution is distributed according to a first price category intra sharing distribution formula. In one embodiment, the first price category intra sharing distribution formula requires an even distribution among all the winners in the first price category. In the example above, if two ticket holders 204 have winning ticket numbers, the two ticket holders 204 share the first distribution evenly. In the example, the first distribution of the prize was twenty-five percent. Therefore, the two ticket holders 204 would each receive twelve and one half percent of the prize. In one embodiment, if the ticket holder 204 has the only winning ticket in the lottery, the first price category intra sharing distribution formula provides the entirety of the first distribution of the prize to the ticket holder 204. In this example, the ticket holder 204 would receive twenty-five percent of the prize. In one embodiment, the remaining seventy five percent of the jackpot 104 would be rolled over to increase the prize for subsequent drawings.

In another embodiment, the first price category intra sharing distribution formula can be weighted. In one embodiment, the intra sharing distribution formula can be weighted in favor of the number of tickets purchased in the current drawing of the lottery. For example, if two ticket holders 204 are the only ticket winners in the lottery, one of the ticket holders, 204 may have purchased one hundred lottery tickets in the current drawing whereas the other one of the ticket holders 204 may have only purchased one lottery ticket in the current drawing. A weighting can be established so that the ticket holder 204 that purchased one hundred tickets in the current lottery can win, for example, twenty percent of the prize whereas the ticket holder 204 that purchased one ticket in the current lottery can win, for example, five percent of the prize.

In yet another embodiment, the first price category intra sharing distribution can be weighted in favor of previous ticket purchases. For example, if two ticket holders 204 are the only ticket winners in the lottery, one of the ticket holders 204 may have purchased one hundred lottery tickets in previous lotteries whereas the other one of the ticket holders 204 may have purchased a lottery ticket for the first time. The first price category intra sharing distribution formula can include a frequent lottery variable that would provide a larger portion of the first distribution to the ticket holder 204 that previously purchased one hundred tickets. For example, the ticket holder 204 that purchased one hundred tickets may receive twenty percent of the prize whereas the ticket holder 204 that only purchased one ticket may receive only five percent of the prize. This is only one example. The frequent lottery variable can also provide a small change. For instance, the ticket holder 204 that purchased one hundred tickets may receive thirteen percent of the prize and the thicket holder 204 that purchased one ticket may receive twelve percent prize. The lottery operator 102 may find that use of the frequent lottery variable provides more incentive to ticket holders 204 to participate in the lottery. The first price category intra sharing distribution formula can be determined according to consumer demand. One of ordinary skill in the art will recognize that a variety of formulae can be used for weighting the distribution. The first price category intra sharing distribution formula can be a variable, a ratio, etc.

In one embodiment, the lottery prize is a jackpot. In alternative embodiments, other types of prizes can be used. The prize is not limited to jackpots.

FIG. 2 also illustrates that a ticket holder 206 can purchase a lottery ticket in a second price category. For instance, the second price category can be lottery tickets purchased for $y.

The second price category is associated with a second distribution of a lottery prize that can be won. For example, the ticket holder 206 may have purchased the lottery ticket for two dollars in order to win fifty percent of the jackpot. In one embodiment, if the only winning lottery ticket or winning lottery tickets are in the second price category, then the second distribution is distributed according to a second price category intra sharing distribution formula. In one embodiment, the second price category intra sharing distribution formula requires an even distribution among all the winners in the second price category. In the example above, if two ticket holders 206 have winning ticket numbers, the two ticket holders 206 share the applicable distribution evenly. In the example, the second distribution of the prize or in combination of the first and second distributions was fifty percent. Therefore, the two ticket holders 206 would each receive twenty five percent of the prize. In one embodiment, if the ticket holder 206 is the only winning ticket in the lottery, the second price category intra sharing distribution formula provides the entirety of the second distribution of the prize to the ticket holder 206. In this example, the ticket holder 206 would receive fifty percent of the jackpot.

In one embodiment, the second price category intra sharing distribution formula is weighted. The second price category intra sharing distribution formula can be weighted in a similar manner as the first price category intra sharing distribution formula. One of ordinary skill in the art will recognize that a variety of formulae can be used for weighting the distribution. The second price category intra sharing distribution formula can be a variable, a ratio, etc.

In one embodiment, if a ticket holder 204 and a ticket holder 206 have winning lottery tickets, an inter sharing distribution formula is used to determine how the ticket holder 204 and the ticket holder 206 should share the jackpot. In one embodiment, the lottery operator 102 splits the first distribution so that the ticket holder 204 receives half of the first distribution and the ticket holder 206 receives half of the first distribution. The ticket holder 206 additionally receives the second distribution minus the first distribution. For example, if the first distribution is twenty five percent and the second distribution is fifty percent, the ticket holder 204 would receive twelve and one half percent. The ticket holder 206 would receive twelve and one half percent in addition to twenty five percent. Therefore, the ticket holder 206 would receive thirty seven and one half percent. The inter sharing distribution formula is not limited to an even distribution. In one embodiment, the inter sharing distribution formula may be weighted to favor the higher price category. In other words, the ticket holder 206 may be rewarded for purchasing a higher priced ticket. For example, the ticket holder 204 may only receive one third of the twenty five percent with the ticket holder 206 receiving two thirds of the twenty five percent in addition to an entire twenty five percent.

Although each ticket price is associated with a percentage of the jackpot, the winnings come from a single jackpot. In the example above, even if only one ticket is purchased in the first price category, the ticket holder 204 that has the winning number gets to receive twenty five percent of a jackpot that may be funded primarily by higher ticket price categories. Variations may occur from lottery to lottery in the numbers of tickets purchased in each price category. The lottery operator 102 increases the chances that the jackpot will be sufficient to cover winnings in each of the price categories by having a single pool from which disbursements are made for winnings in any of the price categories. The use of the single pool for multiple priced lottery tickets can be used independently of the sharing methodology discussed above. However, the lottery operator 102 can further optimize the performance of the lottery by using the single pool in conjunction with the sharing methodology. Further, the intra sharing methodology can be used independent of the inter sharing methodology. However, the lottery operator 102 can optimize performance by using the intra sharing methodology in conjunction with the inter sharing methodology.

FIG. 2 also illustrates that a ticket holder 208 can purchase a lottery ticket in a third price category. For instance, the third price category can be lottery tickets purchased for $z. The third price category is associated with a third distribution of a lottery prize that can be won. For example, the ticket holder 208 may have purchased the lottery ticket for three dollars in order to win one hundred percent of the jackpot 104. In one embodiment, if the only winning lottery ticket or winning lottery tickets are in the third price category, then the third distribution is distributed according to a third price category intra sharing distribution formula. In one embodiment, the third price category intra sharing distribution formula requires an even distribution among all the winners in the third price category. In the example above, if two ticket holders 208 have winning ticket numbers, the two ticket holders 208 share the third distribution evenly. In the example, the third distribution of the prize was one hundred percent. Therefore, the two ticket holders 208 would each receive fifty percent of the prize. In one embodiment, if the ticket holder 208 has the only winning ticket in the lottery, the third price category intra sharing distribution formula provides the entirety of the third distribution of the prize to the ticket holder 208. In this example, the ticket holder 208 would receive one hundred percent of the jackpot.

In one embodiment, the third price category intra sharing distribution formula is weighted. The third price category intra sharing distribution formula can be weighted in a similar manner as the first price category intra sharing distribution formula. One of ordinary skill in the art will recognize that a variety of formulae can be used for weighting the distribution. The third price category intra sharing distribution formula can be a variable, a ratio, etc.

In one embodiment, if the ticket holder 204, the ticket holder 206, and the ticket holder 208 have winning lottery tickets, a first triplet inter sharing distribution formula is used to determine how the ticket holder 204, the ticket holder 206, and the ticket holder 208 should share the first distribution of the jackpot. In one embodiment, the lottery operator 102 splits the first distribution so that the ticket holder 204 receives one third of the first distribution, the ticket holder 206 receives one third of the first distribution, and the ticket holder 208 receives one third of the first distribution. A second triplet inter sharing distribution formula is used to determine how the ticket holder 206 and the ticket holder 208 share the second distribution minus the first distribution. In one embodiment, the lottery operator 102 splits the second distribution so that the ticket holder 206 receives one half of the second distribution and the ticket 208 receives the other half of the second distribution. The ticket holder 208 additionally receives the third distribution minus the second distribution. For example, if the first distribution is twenty five percent, the second distribution is fifty percent, and the third distribution is one hundred percent, the ticket holder 204 would receive eight and one third percent. The ticket holder 206 would receive eight and one third percent in addition to twelve and one half percent. Therefore, the ticket holder 206 would receive twenty and five sixths percent. Finally, the ticket holder 208 would receive eight and one third percent in addition to twelve and one half percent in addition to fifty percent. Therefore, the ticket holder 208 would receive seventy and five sixths percent.

The first triplet inter sharing distribution formula can require an even distribution of the first distribution. However, in one embodiment, the first inter sharing distribution formula can be weighted. The ticket holder 206 can be given a greater portion of the first distribution than the ticket holder 204. Further, the ticket holder 208 can be given a greater portion of the first distribution than the ticket holder 206. However, different variations are possible. A volume lottery variable (based, for example on the number of tickets purchased or amount spent on tickets) can be used to determine weighting. In other words, the ticket holder 204 could potentially receive the largest portion of the first distribution if the ticket holder 204 has purchased the most lottery tickets. Further, the ticket holder 204 may receive the largest weighting of the first distribution to give incentive to the ticket holder 204 because the ticket holder 204 does not get to receive a portion of the second distribution or of the third distribution. Even if the ticket holder 204 spent an equivalent or a greater amount on purchasing tickets than the ticket holder 206, the incentive of the ticket holder 206 can be further increased over that of the ticket holder 204. Similarly, the ticket holder 206 may receive a greater weighted portion of the second distribution than the ticket holder 208 because the ticket holder 206 does not receive a portion of the third distribution or for other reasons related to the weighting formula. In one embodiment, the incentive of the ticket holder 208 can be further increased over that of the ticket holder 204. These weighted variations can also be used with the second triplet inter sharing distribution formula.

The example above discusses the possibility of having one winning ticket from each price category. In one embodiment, multiple ticket winners exist in some or all of the different price categories. A divided intra sharing distribution within each price category is applied so that winners in each price category split the winnings according to a divided intra sharing distribution formula. In the example above, the ticket holder 204 received eight and one third percent. In one embodiment, a first divided intra sharing distribution formula determines how to split the winnings for the first distribution. For instance, in the example above, if two ticket holders 204 had winning numbers, one of the ticket holders 204 could receive approximately four and sixteen one hundredths percent and the other ticket holder 204 would also receive approximately four and sixteen one hundredths percent. In one embodiment, a second divided intra sharing distribution formula determines how to split the winnings for the second distribution. For instance, in the example above, if two ticket holders 206 had winning numbers, one of the ticket holders 206 would receive ten and five twelfths percent and the other ticket holder 206 would also receive ten and five twelfths percent. In one embodiment, a third divided intra sharing distribution formula determines how to split the winnings for the third distribution. For instance, in the example above, if two ticket holders 208 had winning numbers, one of the ticket holders 208 would receive thirty five and three twelfths percent while the other one of the ticket holders 208 would also receive thirty five and three twelfths percent. The divided intra shared distributions do not have to be the same across price categories. Further, within price categories, the divided intra shared distributions can be weighted as discussed above with respect to the intra sharing distributions.

Although, in the above discussion, the first price category was associated with the ticket holder 204, the second price category with the ticket holder 206, and the third price category with the ticket holder 208, the ticket holders can be associated with different price categories. For instance, the first price category may be associated with the ticket holder 204 and the third price category may be associated with the ticket holder 206. The inter sharing distribution variable as discussed above could be used to share the jackpot if the ticket holder 204 and the ticket holder 206 were the only winning tickets. For instance, the ticket holder 204 would receive one half of twenty five percent. The ticket holder 206 would receive one half of twenty five percent in addition to seventy five percent. Further, the methodologies discussed above can be extended to any number of price categories. For instance, there could be a fourth price category. Any number of price categories can be used.

In one embodiment, the shared multiple priced single pool lottery system 200 can be used with a video lottery game. In another embodiment, the shared multiple priced single pool lottery system 200 can be used with online lotteries that are provided on a network such as the Internet.

In one embodiment the shared multiple priced single pool lottery system 300 can be computerized. Software modules can be used to establish and coordinate the multiple priced single pool lottery system. The use of computerized technologies can help facilitate calculating the sharing distributions. Without the computerized technologies, the quantity of the calculations could be burdensome.

A first price category module can provide a first price category in which a plurality of first price category lottery tickets can be purchased. Further, a second price category module can provide a second price category in which a plurality of second price category lottery tickets can be purchased. In addition, a random number selection module can randomly select the winning lottery number. The random number selection module can be a random number generator, can be coupled to a ball draw machine, or can simulate a ball draw machine. A first price intra shared distribution module provides a first price category intra shared distribution of the first distribution of the prize if at least one of the lottery tickets in the plurality of first price category lottery tickets has a winning number. Further, a second price category intra shared distribution module provides a second price category intra shared distribution of the second distribution of the prize if at least one of the lottery tickets in the plurality of second price category lottery tickets has a winning number. Additional intra shared distribution modules can be used for additional price categories.

In one embodiment, a divided first price category intra shared distribution module provides a divided first price category intra shared distribution of the first distribution of the prize. In addition, a divided second price category intra shared distribution module provides a divided second price category intra shared distribution of the second distribution. An inter shared distribution module provides an inter shared distribution of the first distribution of the prize if at least one of the lottery tickets in the plurality of first price category lottery tickets has a winning number and if at least one of the lottery tickets in the plurality of second price category lottery tickets has a winning number.

Figure 3:
FIG. 3 illustrates an example of a winnings table for the shared multiple-priced single-pool lottery system of FIG. 2.

FIG. 3 illustrates an example of a winnings table 300 for the shared multiple priced single pool lottery system of FIG. 2. For example, a lottery can have a jackpot of ten million dollars. Lottery players can purchase a one-dollar ticket, a two-dollar ticket, and a three-dollar ticket. The one-dollar ticket only gives the ticket holder a chance at receiving twenty five percent of the jackpot. Therefore, the one dollar ticket holder could at best receive two million five hundred thousand dollars if the one dollar ticket holder did not have to share the jackpot with any other winners. The two-dollar ticket holder could at best receive five million dollars if the two-dollar ticket holder does not have to share the jackpot with any other ticket holders. Finally, the three-dollar ticket holder could at best receive the full jackpot of ten million dollars if the three-dollar ticket holder does not have to share the jackpot with any other ticket holders.

Figure 4:
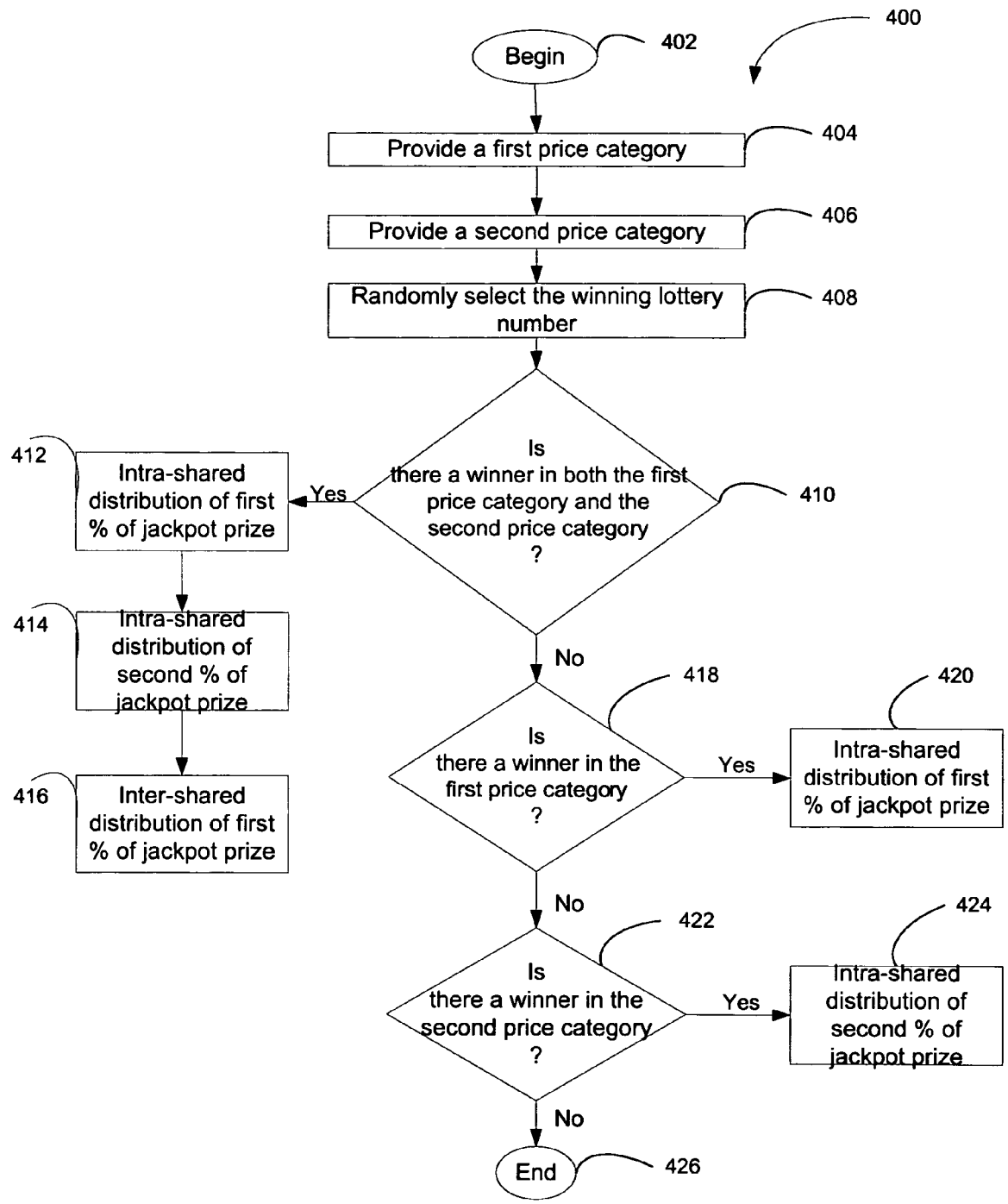
FIG. 4 illustrates a process that can be used with the shared multiple-priced single-pool lottery system illustrated in FIG. 2.

FIG. 4 illustrates a process 400 that can be used with the shared multiple priced single pool lottery system 200 illustrated in FIG. 2. The process 400 begins at a process block 402. The process 400 advances to a process block 404 to provide a first price category. Further, the process 400 then advances to a process block 406 to provide a second price category. The process then advances to a process block 408 to randomly select the winning lottery number. The process 400 then advances to a decision block 410 where it is determined whether there is a winner in both the first price category and the second price category. If there is a winner in both the first price category and the second price category, then the process 400 advances to a process block 412 where the first distribution of the jackpot prize is distributed through an intra shared distribution as discussed in FIG. 2. The process 400 then advances to a process block 414 where the second distribution of the jackpot prize is distributed through an intra shared distribution as discussed in FIG. 2. The process 400 then advances to a process block 416 where the first distribution is distributed through an inter shared distribution of the jackpot so that the winning ticket holders in the second price category receive the appropriate share of the first distribution.

If the decision block 410 determines that there is not both a winner in the first price category and a winner in the second price category, the process 400 advances to a decision block 418. At the decision block 418, the process 400 determines if there is a winner in the first price category. If there is a winner in the first price category, the process 400 advances to a process block 420 where the process 400 distributes the jackpot prize through an intra shared distribution to a winner or winners in the first price category. If the decision block 418 determines that there is not a winner in the first price category, the process 400 advances to a decision block 422 to determine if there is a winner in the second price category. If there is a winner in the second price category, the process 400 advances to a process block 424 where the process 400 distributes the jackpot prize through an intra shared distribution to winners in the second price category. If there is not a winner in the second price category, the process 400 determines that there are not any winners and the process ends at process block 426. In one embodiment, there is a roll over. In one embodiment, the undistributed jackpot is used in a future draw. In one embodiment, the roll over includes a percentage of the jackpot for use in a future draw. In one embodiment, the lottery operator 102 takes a percentage of the ticket sales revenue and adds that percentage to a future lottery jackpot even if there is a winner in the present jackpot. The process 400 can be extended to cover three price categories. Further, the process 400 can be extended to cover any number of price categories. In one embodiment, the process 400 can be implemented on a computer readable medium.

Figure 5:
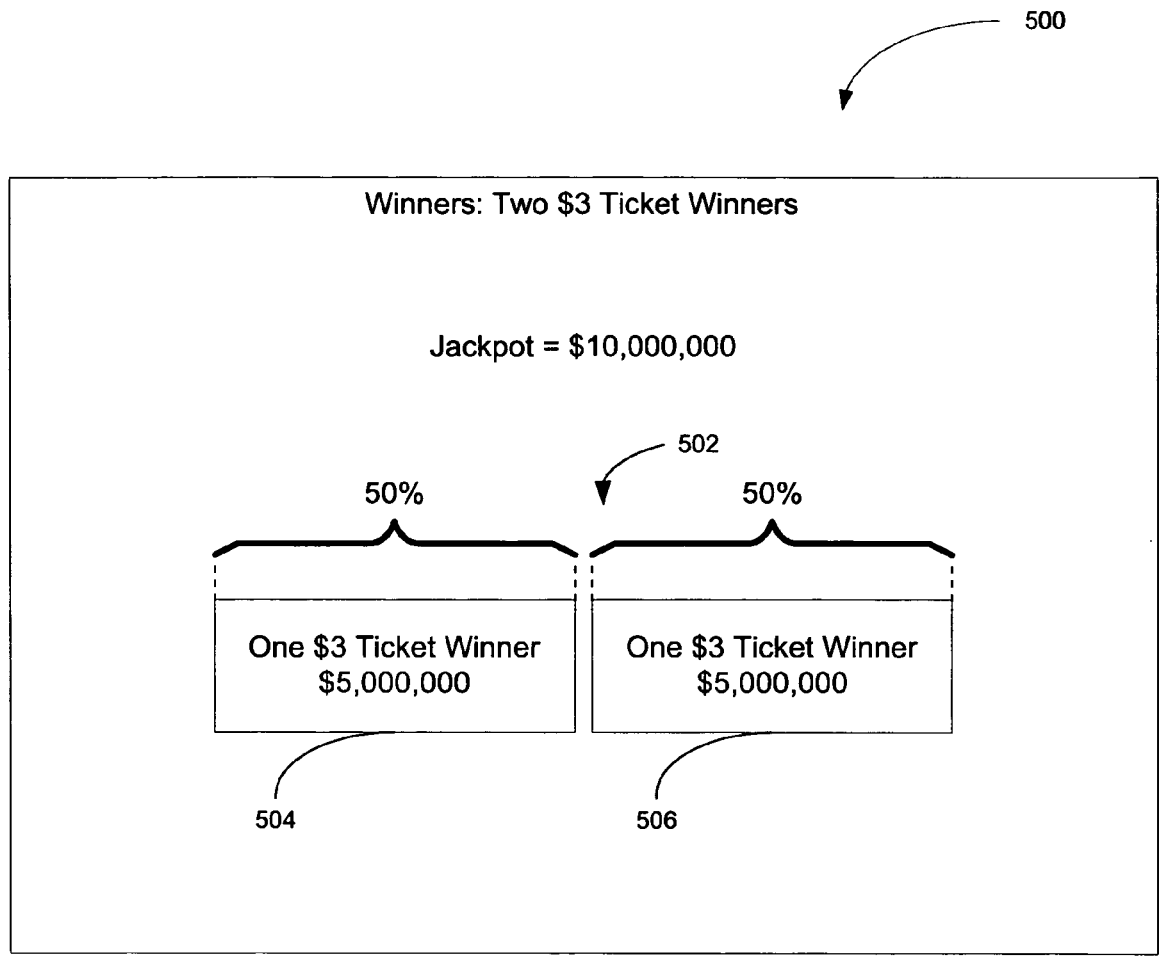
FIG. 5 illustrates an example of a winnings table of a lottery having two three-dollar ticket winners.

FIGS. 5 through 8 illustrate various examples of the multiple priced single prize lottery system 200. FIG. 5 illustrates an example of a winnings table 500 of a lottery having two three dollar ticket winners. The jackpot is for ten million dollars. The distribution displays one three dollar ticket winner sharing the ten million dollar jackpot with another three dollar ticket winner through an intra sharing distribution. One of the three dollar ticket winners receives five million dollars at a sharing section 504. Further, the other three dollar ticket winner receives five million dollars at a sharing section 506.

Figure 6:
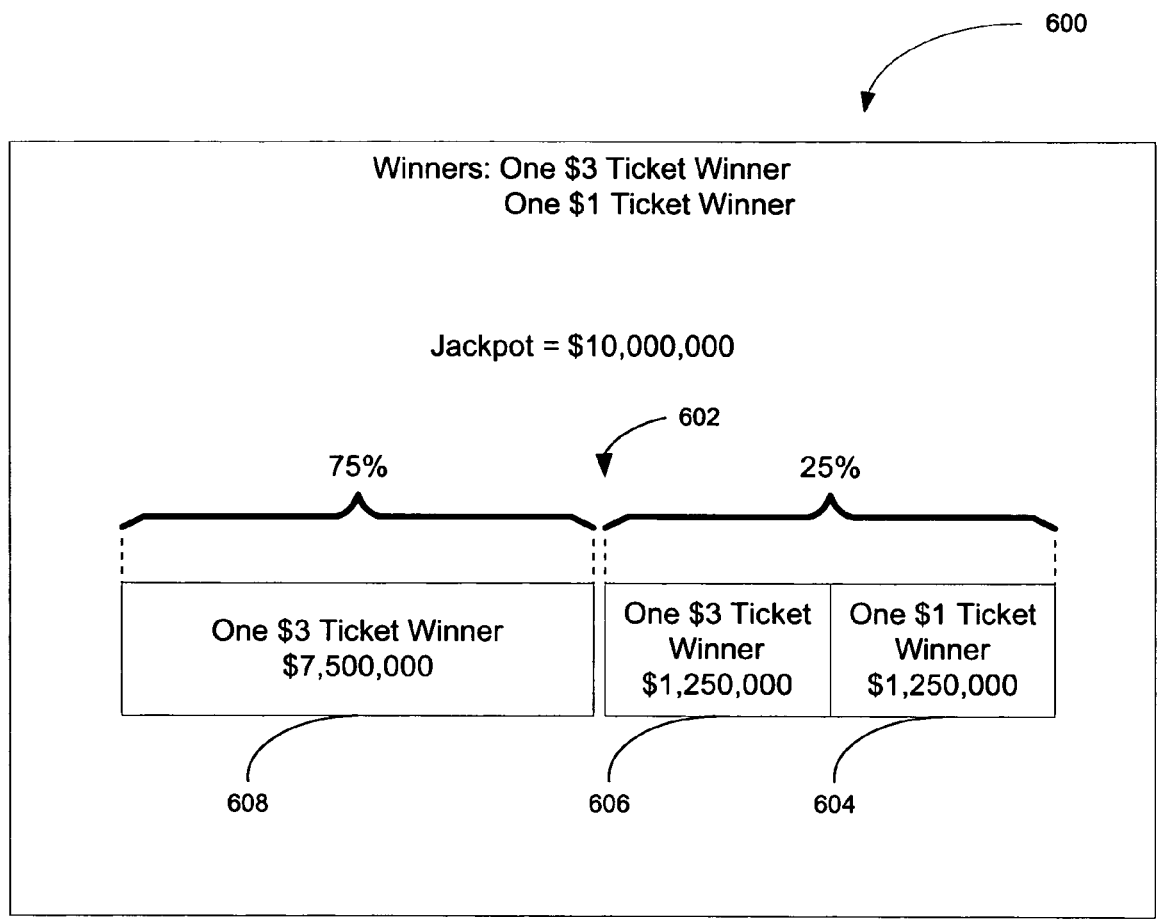
FIG. 6 illustrates an example of a winnings table of a lottery having one three-dollar ticket winner and one one-dollar ticket winner.

FIG. 6 illustrates an example of a winnings table 600 of a lottery having one three dollar ticket winner and one one-dollar ticket winner. The jackpot is for ten million dollars. The distribution 602 displays one three dollar ticket winner that shares the jackpot with one one-dollar ticket winner. The one dollar ticket winner receives one million two hundred fifty thousand dollars at a section 604 through an inter sharing distribution. Further, the three dollar ticket winner receives one million two hundred fifty thousand dollars through an inter sharing distribution at an inter sharing section 606. Finally, the three dollar ticket winner receives seven million five hundred thousand dollars at a section 608 through an intra shared distribution.

Figure 7:
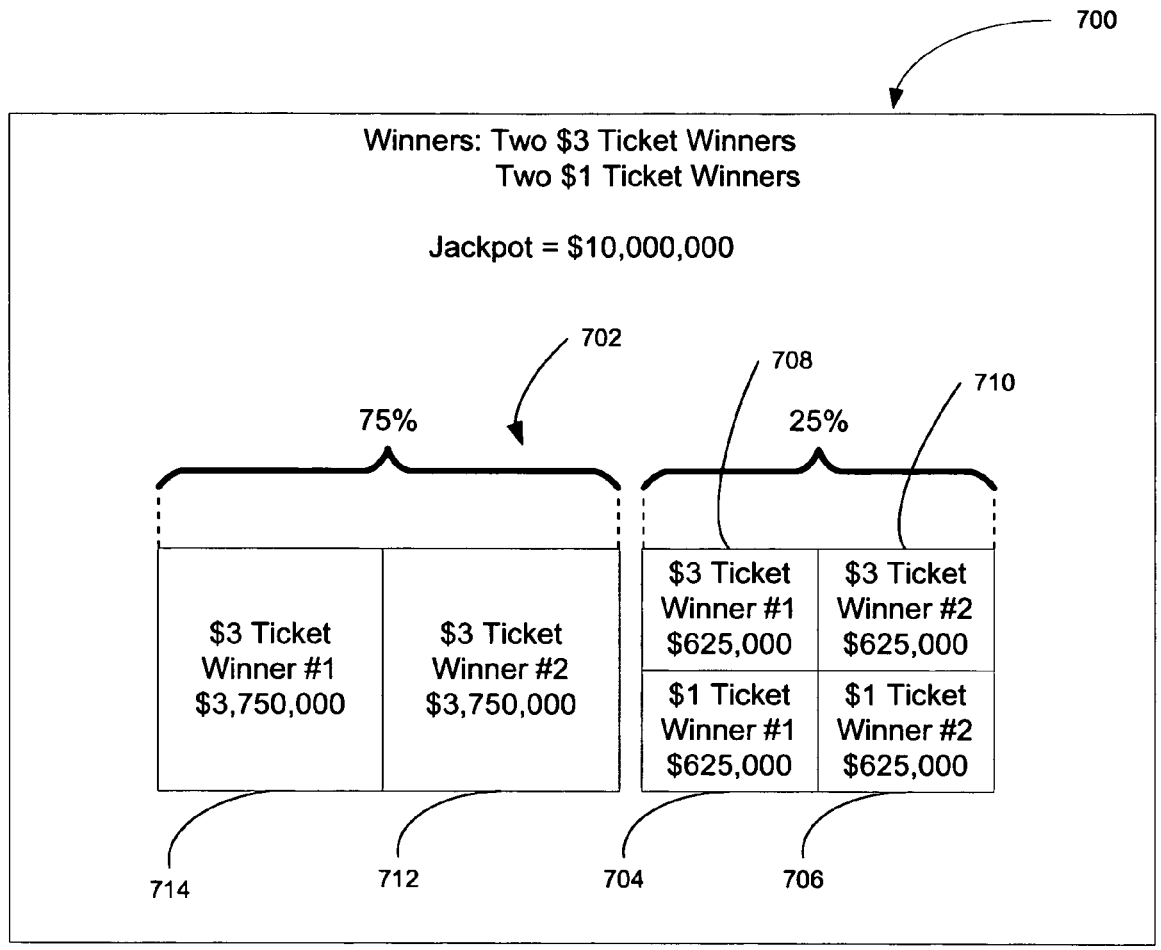
FIG. 7 illustrates an example of a winnings table of a lottery having two three-dollar ticket winners and two one-dollar ticket winners.

FIG. 7 illustrates an example of a winnings table 700 of a lottery having two three dollar ticket winners and two one dollar ticket winners. The jackpot is for ten million dollars. A distribution 702 displays a one dollar winner receiving six hundred twenty-five thousand dollars at a section 704, a one dollar winner receiving six hundred twenty-five thousand dollars at a section 706, a three dollar winner receiving six hundred twenty-five thousand dollars at a section 708, and a three dollar winner receiving six hundred twenty-five thousand dollars at a section 710. The one dollar ticket winners receive their winnings through an intra shared distribution. Further, the three dollar ticket winners receive a portion of the twenty five percent associated with the first price category through an inter shared distribution of half. Further, each of the three dollar ticket holders receives an additional three million seven hundred fifty thousand dollars through an intra shared distribution of the one hundred percent minus the twenty five percent.

Figure 8:
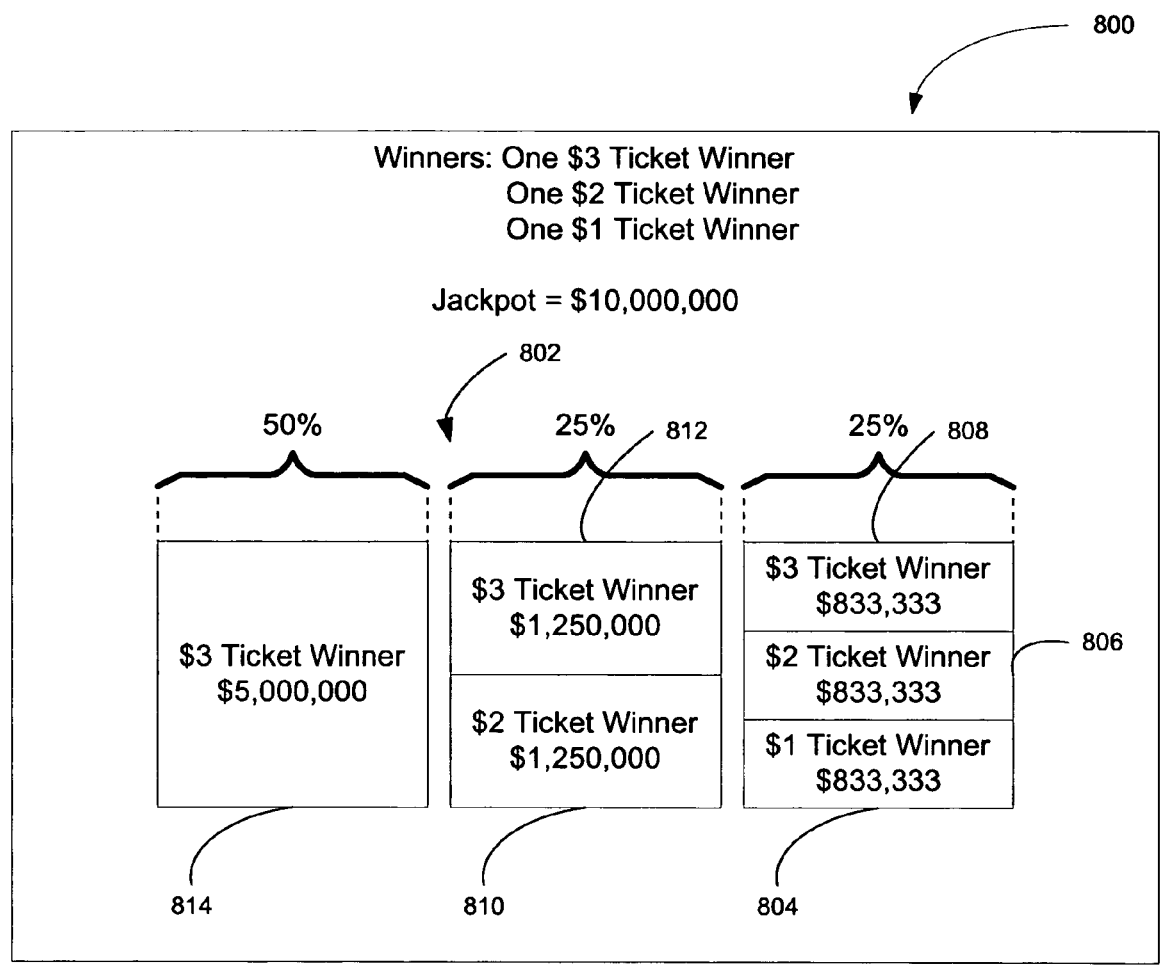
FIG. 8 illustrates an example of a winnings table of a lottery having one three-dollar ticket winner, one two-dollar ticket winner, and one one-dollar ticket winner.

FIG. 8 illustrates an example of a winnings table 800 of a lottery having one three dollar ticket winner, one two dollar ticket winner, and one one-dollar ticket winner. The jackpot is for ten million dollars. A distribution 802 displays a one dollar winner receiving eight hundred thirty three thousand dollars in a section 804 according to an inter shared distribution of twenty five percent of the jackpot. The two dollar ticket holder also receives eight hundred thirty three thousand dollars in a section 806 according to the inter shared distribution of twenty five percent of the jackpot. Accordingly, the three dollar ticket holder also receives eight hundred thirty three thousand dollars in a section 808 according to the inter shared distribution of twenty five percent of the jackpot. Further, the two dollar ticket holder receives an additional one million two hundred fifty thousand dollars at a sharing section 810 through an inter shared distribution of the second distribution. In addition, the three dollar ticket holder receives an additional one million two hundred fifty thousand dollars at a sharing section 812 through an inter shared distribution of the second distribution. Finally, the three dollar ticket holder receives an additional five million dollars at a section 814 because the third distribution minus the second distribution equals fifty percent. In one embodiment, the ticket holder in the highest price category receives the distribution associated with the highest price category minus the next highest distribution with an inter sharing distribution. Intra sharing distribution may occur in this remainder. Alternative embodiments will allow for different methodologies for calculating the remainder.

Figure 9:
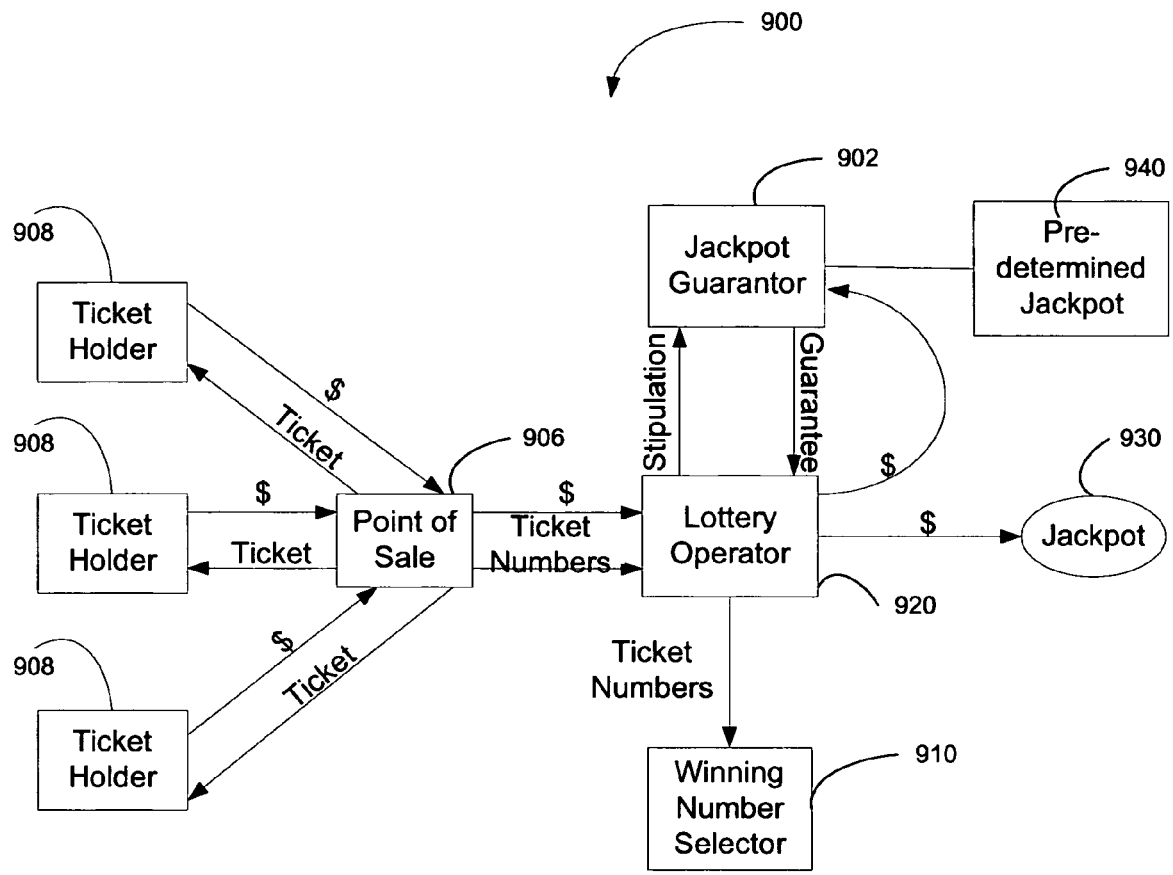
FIG. 9 illustrates a probabilistic lottery system.

FIG. 9 illustrates a probabilistic lottery system 900. The multiple priced shared lottery system 200 can be used in conjunction with the probabilistic lottery system 900. A jackpot guarantor 902 assumes the risk that would normally not exist in a pure pari-mutuel lottery or might be assumed in whole or in part by the lottery operator 920. In one embodiment, the jackpot guarantor 902 is a private organization other than a jurisdiction. In another embodiment, the jackpot guarantor is a publicly held company other than a jurisdiction. The jackpot guarantor 902 establishes a predetermined jackpot 940. In one embodiment, the predetermined jackpot 204 is a very large prize that will entice ticket holders 108 that would not normally purchase a lottery ticket to do so. The lottery operator 920 can advertise the predetermined jackpot 204 in order to stimulate and increase ticket sales. In one embodiment, the predetermined jackpot 940 is unfunded. Instead, the jackpot guarantor 902 sets the predetermined jackpot 940 at an amount that is large enough so that there is a probability that the allocable prize portion of ticket sales will equal or exceed the predetermined jackpot 940. If the allocable prize portion of ticket sales is less than the predetermined jackpot 940, the jackpot guarantor 902 assumes the risk for paying the differential between the ticket sales and the pre determined jackpot 930.

In one embodiment, the jackpot guarantor 902 provides a guarantee to the lottery operator 920. In one embodiment, the guarantee provides that the jackpot guarantor 902 assumes the risk for paying the predetermined jackpot if the allocable prize portion of ticket sales is not sufficient to cover the predetermined jackpot. In another embodiment, the guarantee provides that the jackpot guarantor assumes the risk of paying a portion of the predetermined amount of any secondary prizes that are won to the extent that the allocable prize portion of ticket sales is not sufficient.

In one embodiment, the jackpot guarantor 902 provides the guarantee in exchange for a stipulation. In one embodiment, the stipulation includes an obligation by the lottery operator 920 to provide a percentage of revenue generated from future ticket sales in exchange for the guarantee. In another embodiment, the stipulation includes an obligation by the lottery operator 920 to provide a fee in exchange for the guarantee.

The lottery operator 920 receives payments for ticket sales from the point of sale 106. Further, the lottery operator 920 receives ticket numbers from the tickets sold to the ticket holders 108 from the point of sale 906. The lottery operator provides the ticket numbers to the winning number selector 910 to determine which are winning tickets.

In one embodiment, the jackpot guarantor 902 allocates the funds to the pre determined jackpot 940 pool. In one embodiment, the entity has set aside the large prize in a protected account to provide for payment. Therefore, the lottery operator can advertise a large prize because another entity actually has set aside the large prize.

Figure 10:
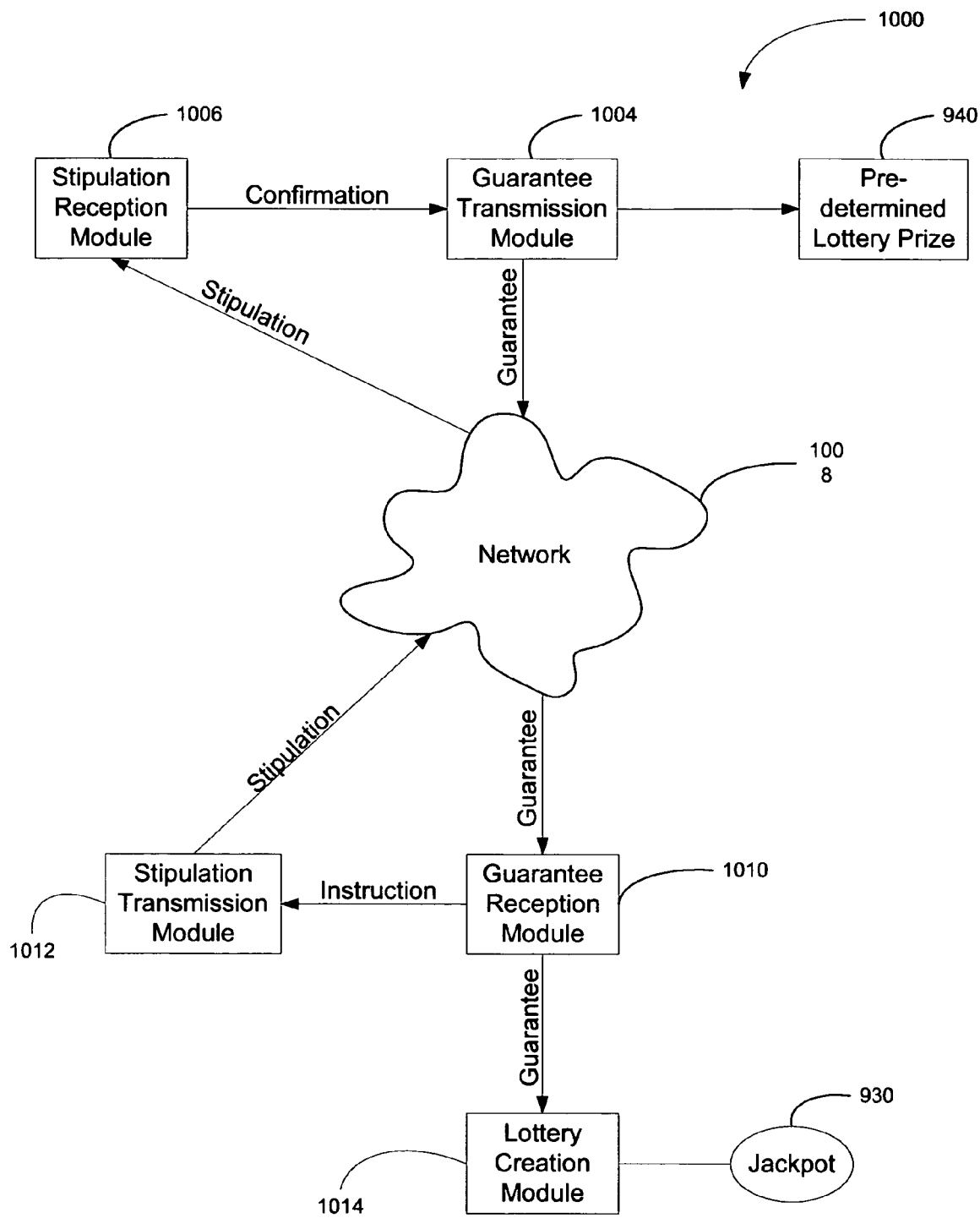
FIG. 10 illustrates a probabilistic software configuration that can be used with the probabilistic lottery system.

FIG. 10 illustrates a probabilistic software configuration 1000 that can be used with the probabilistic lottery system in conjunction with the multiple pricing shared lottery system 200. As can be seen from FIG. 10, the probabilistic software configuration 1000 includes software for establishing a guarantee for a pre determined lottery prize 940. A guarantee transmission module 404 transmits the guarantee through a network 1008. The network 1008 can be a wide area network, a local area network, the network, a wireless network, or any other network known to one of ordinary skill in the art. The guarantee transmission module 1004 transmits the guarantee in exchange for a stipulation. In one embodiment, the stipulation can be an obligation for a percentage of future ticket sales. A stipulation reception module 1006 receives the stipulation through the network 408. In one embodiment, after the stipulation reception module 1006 receives the stipulation, the stipulation reception module 1006 transmits a confirmation that the stipulation was received to the guarantee transmission module 1004.

A guarantee reception module 1010 receives the guarantee from the network 1008. In one embodiment, upon receiving the guarantee, the guarantee reception module 1010 provides an instruction to a stipulation transmission module 1012. The stipulation transmission module 1012 then sends the stipulation through the network 1008. As discussed above, the stipulation reception module 1006 can receive the stipulation and send the confirmation to the guarantee transmission module 1004 that the guarantee has been sent and the stipulation, in exchange for which the guarantee was sent, has been received.

Figure 11:
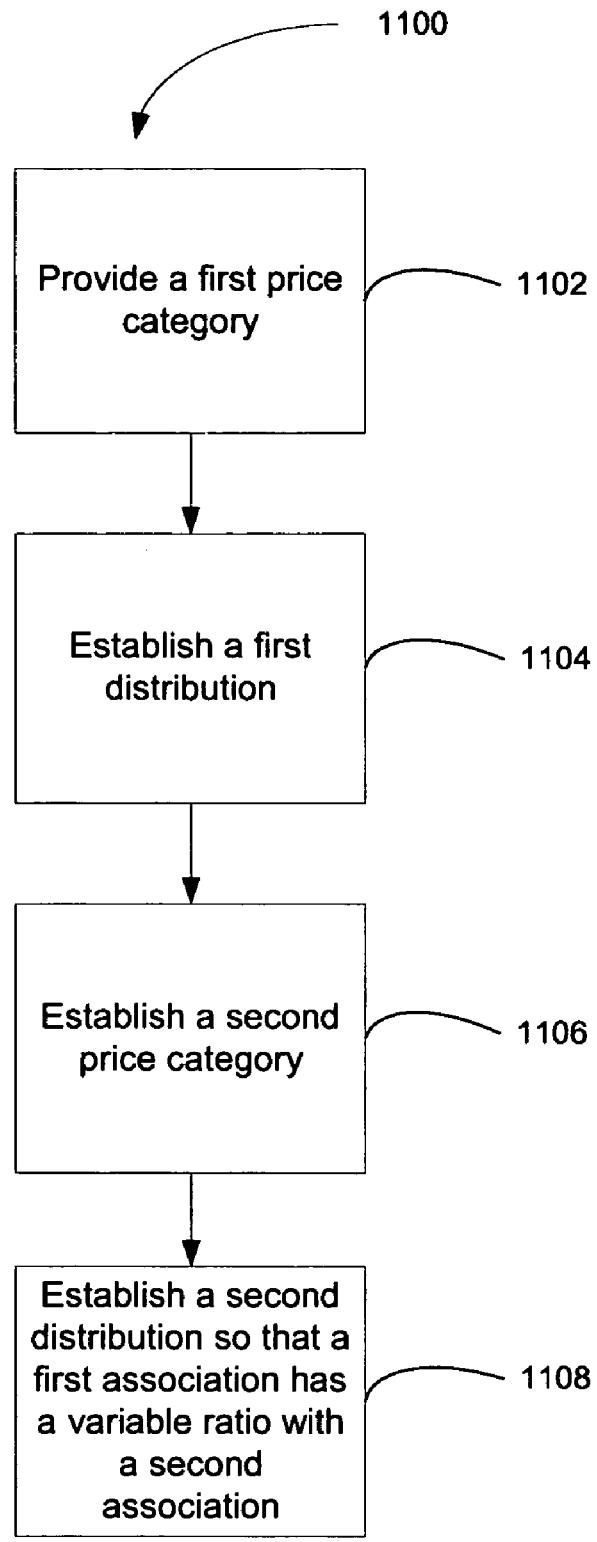
FIG. 11 illustrates a method for conducting a variable ratio based multiple-priced lottery system.

FIG. 11 illustrates a method 1100 for conducting a variable ratio based multiple pricing lottery system. The terms "variable" and "constant" will be explained in the following discussion.

In one embodiment, the multiple pricing system as discussed above can be implemented with a constant ratio based system. For example, a lottery player can purchase a one dollar ticket in the hope of winning a lottery distribution of ten million dollars. The lottery player can also purchase a two dollar ticket in the hope of winning a lottery distribution of twenty million dollars. A first association between the price category of one dollar and the distribution of ten million dollars can be the quotient of ten million divided by one, which equals ten million. Similarly, a second association between the price category of two dollars and the distribution of twenty million dollars can be the quotient of twenty million divided by two, which equals ten million. A constant ratio exists when the first association equals the second association. In one embodiment, a lottery player can purchase one two dollar ticket as opposed to two one dollar tickets to avoid having to purchase multiple tickets.

In one embodiment, the multiple pricing system as discussed above can be implemented to induce the purchase of higher priced lottery tickets. For example, a lottery player can purchase a one dollar ticket in the hope of winning a lottery distribution of ten million dollars. The lottery player can also purchase a two dollar ticket in the hope of winning a lottery distribution of thirty million dollars. The first association equals ten million (ten million divided by one) and the second association equals fifteen million (thirty million divided by two). A variable ratio exists because the first association does not equal the second association. In one embodiment, this variable ratio provides the lottery player with incentive to purchase a two dollar ticket. In one embodiment, the lottery ticket holder can purchase the two dollar ticket as opposed to two one dollar tickets because the potential distribution is greater by purchasing the two dollar ticket as opposed to the two one dollar tickets.

In one embodiment, the association is evaluated by dividing the total distribution by the associated price category. If multiple players share in that distribution, the association is still evaluated by dividing the total distribution by the associated price category. For instance, if two one dollar ticket holders win and share in the distribution of ten million dollars, the ten million dollars is the number that is divided by the price category (one dollar) to determine the first association. In another embodiment, a ticket holder in another price category (e.g., three dollar) shares the ten million dollar distribution with the winners in the first price category. Even in this situation, the ten million dollars is the number that is divided by the price category (one dollar) to determine the first association. In one embodiment, the potential distribution is the distribution that is divided by the price category to determine the association.

The method 1100 begins at a process block 1102 where a first price category is provided. A plurality of first price category lottery tickets can be purchased in the first price category. The method 1100 then advances to a process block 1104 where a first distribution is established. The first distribution can be won with the lottery tickets in the plurality of first price category lottery tickets having a winning lottery number. The method 1100 next advances to a process block 1106 where a second price category is established. A plurality of second price category lottery tickets can be purchased in the second price category. Finally, the method 1100 advances to a process block 1108 where a second distribution is established so that a first association has a variable ratio with a second association.

Figure 12:
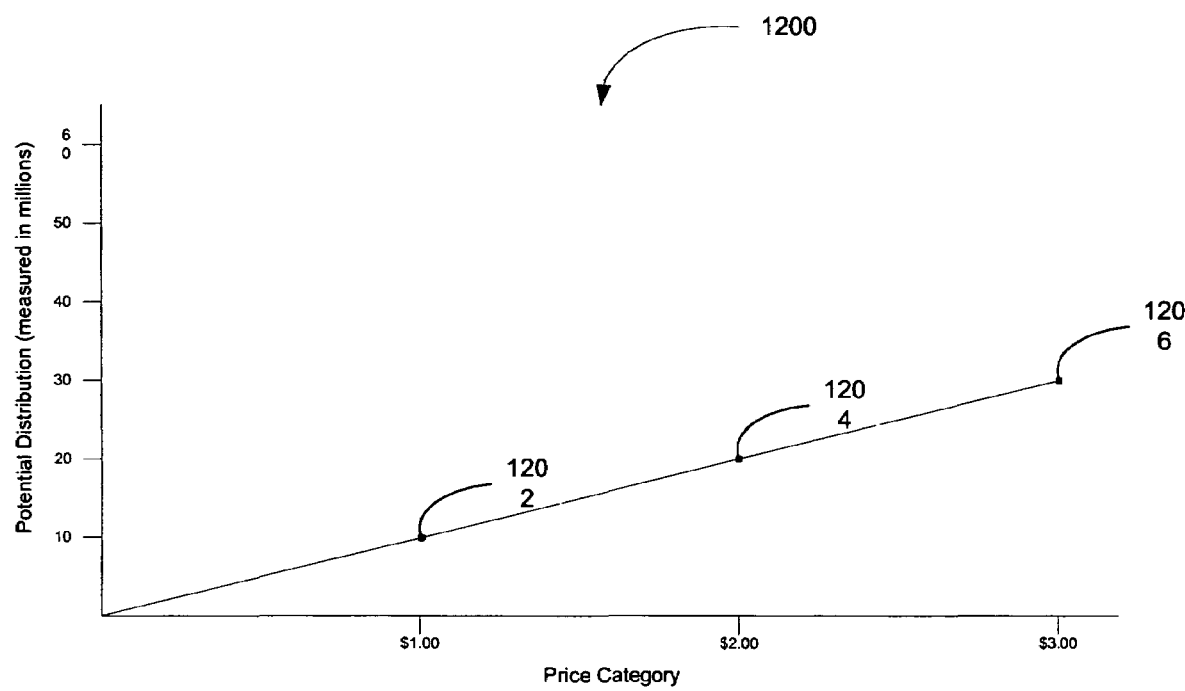
FIG. 12 illustrates a graph for a constant ratio between associations.

FIG. 12 illustrates a graph 1200 for a constant ratio between associations. The graph 1200 illustrates the potential distribution on the y axis for a price category listed on the x axis. In one embodiment, a first point 1202 is plotted to illustrate that a potential distribution of ten million dollars can be won for a first price category of one dollar tickets. The lottery ticket purchaser in the first price category may not actually win the full ten million dollars if there are other winners in the first price category or other price categories for which the lottery ticket purchaser must share the distribution. The second point 1204 is plotted to illustrate that a potential distribution of twenty million dollars can be won for a second price category for two dollar tickets. Finally, the third point 1206 is plotted to illustrate that a potential distribution of thirty million dollars can be won for a third price category for three dollar tickets.

In order to determine a first association and a second association in the graph 1200, any two of the plotted points can be chosen. For instance, the first point 1202 can be used to determine the first association. In one embodiment, the first potential distribution of ten million dollars is divided by the first price category of one dollar to result in the first association being ten million. The second point 1204 can be used to determine the second association. In one embodiment, the second potential distribution of twenty million dollars is divided by the second price category of two dollars to result in the second association being ten million. The second association minus the first association equals zero. In other words, the first association equals the second association. Therefore, a constant ratio exists between the first association and the second association. The graph 1200 illustrates this constant ratio by displaying a straight line between the first point 1202 and the second point 1204.

Any two points in the graph 1200 can be used to determine the first association and the second association. For instance, the second point 1204 can be used to determine the first association and the third point 1206 can be used to determine the second association. In this instance, a constant ratio also exists between the first association and the second association. The first and the third points can also be used as the first and the second associations. Alternatively, the points can even be used backwards for associations. For instance, the third point can be the first association and the first point can be the second association. Similarly, the second point can be the first association and the first point can be the second association.

Figure 13:
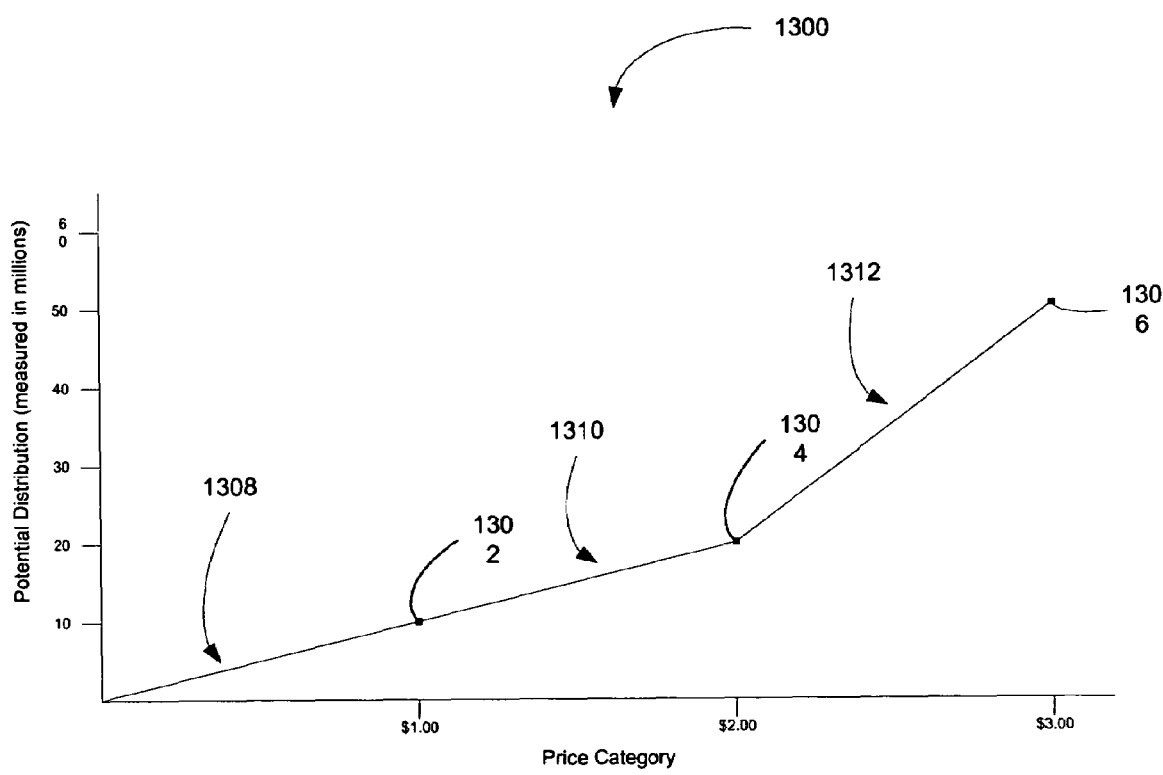
FIG. 13 illustrates a graph in which a variable ratio exists between at least two associations.

FIG. 13 illustrates a graph 1300 in which a variable ratio exists between at least two associations. A first point 1302 is plotted to illustrate a potential distribution of ten million dollars that can be won in the first price category. A second point 1304 is plotted to illustrate a potential distribution of twenty million dollars that can be won in the second price category. The first association is ten million (ten million dollars divided by the one dollar price category) and the second association is ten million (twenty million dollars divided by the two dollar price category). Therefore, a constant ratio exists between the first association and the second association.

In other words, an origin line 1308, which connects the origin with the first point 1302, has an equal slope to a first line 1310, which connects the first point 1302 with the second point, 1304. In one embodiment, the slope does not have to be identical but rather approximately the same to be considered a constant ratio.

However, a variable ratio exists between the first association and the second association when the reference points are the second point 1304 and a third point 1306. The first association is ten million (ten million dollars divided by the one dollar price category) and the second association is twenty five million (fifty million dollars divided by the two dollar price category). The second association minus the first association equals fifteen million (twenty five million minus ten million). A variable ratio exists between the first association and the second association when the reference points are the second point 1304 and the third point 1306 because the second association minus the first association is a positive number. The variable ratio is depicted in the graph 1300 because a second line 1312 is displayed between the second point 1304 and the third point 1306, which has a different slope than the origin line 1308 or the first line 1310. In one embodiment, a variable ratio would exist between the first association and the second association if the second association minus the first association equals a negative number.

The entire graph may be but is not necessarily entirely constant. For instance, the graph 1300 depicts a constant ratio and a variable ratio. A purchaser of a lottery ticket is provided with an added incentive to purchase a lottery ticket when a variable ratio exists. For instance, the purchaser can purchase a one dollar ticket to potentially win ten million dollars. The purchaser could purchase two one dollar tickets or one two dollar ticket to potentially win twenty million dollars. In one embodiment, the purchaser receives a benefit in purchasing the two dollar ticket if the purchaser is not the sole winner and has to share the distribution. The two dollar ticket could potentially end up with a larger share than the two one dollar ticket winners according to the sharing formulae as discussed above. Whether a sole winner or a shared winner, the purchaser can win a potentially greater distribution by purchasing one three dollar ticket rather than purchasing three one dollar tickets. If the purchaser was the sole winner, the purchaser of the three dollar ticket could potentially win fifty million dollars. On the other hand, if that purchaser instead purchased three one dollar tickets, the purchaser could at most potentially win ten million dollars. Whether the purchaser has one one-dollar ticket that has a winning number or three one dollar tickets with winning numbers, the purchaser of the one dollar ticket can only win in the first price category. The purchaser would share winnings with himself if he or she had multiple one dollar tickets with winning numbers. Therefore, purchasers are more likely to purchase higher priced lottery tickets thereby leading to an increase in lottery ticket sales revenues.

Figure 14:
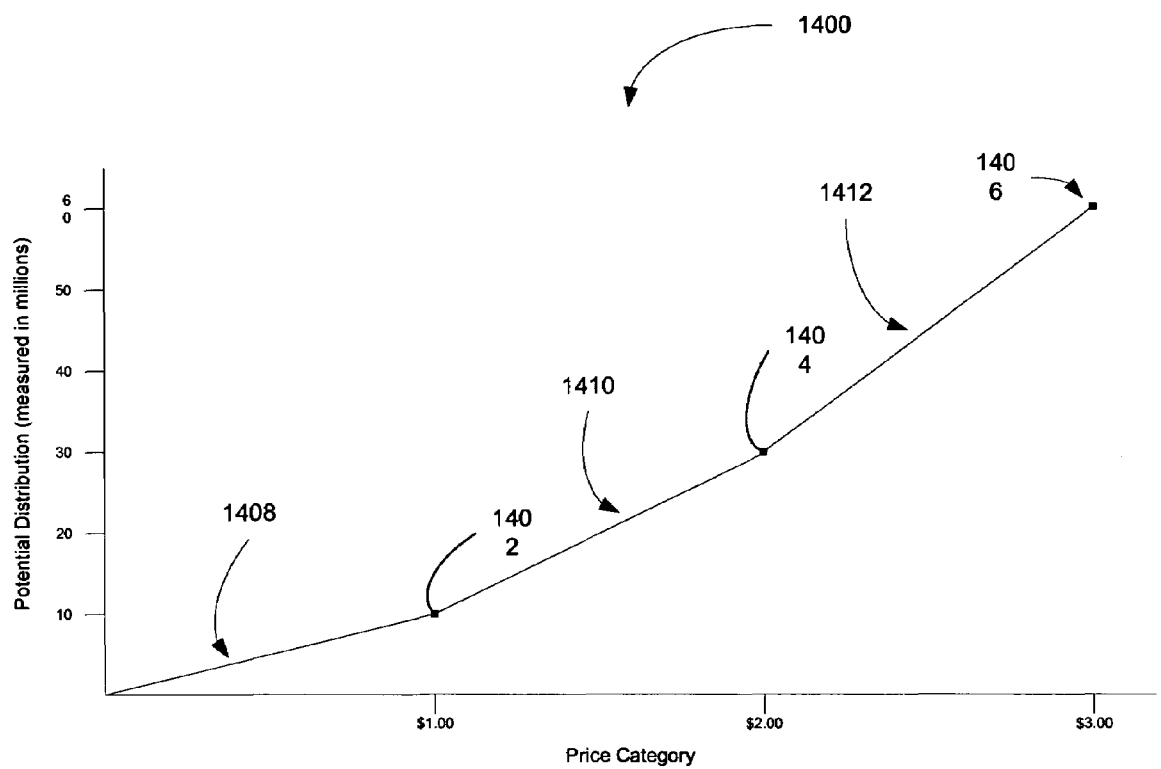
FIG. 14 illustrates a graph in which two different variable ratios exist.

FIG. 14 illustrates a graph 1400 in which two different variable ratios exist. A first point 1402 is plotted to illustrate a potential distribution of ten million dollars that can be won in the first price category. A second point 1404 is plotted to illustrate a potential distribution of thirty million dollars that can be won in the second price category. The first association is ten million (ten million dollars divided by the one dollar price category) and the second association is fifteen million (thirty million dollars divided by the two dollar price category). The second association minus the first association equals five million (fifteen million minus ten million). Therefore, a variable ratio exists between the first association and the second association. In addition, a variable ratio exists between the first association and the second association when the reference points are the second point 1404 and a third point 1406. The first association is fifteen million (thirty million dollars divided by the two dollar price category) and the second association is twenty million (sixty million dollars divided by the three dollar price category). The second association minus the first association equals five million (twenty million minus fifteen million). These variable ratios are depicted in the graph 1400 because a first line 1410 is depicted between the first point 1402 and the second point 1404, and a second line 1412 is depicted between the second point 1404 and the third point 1406. The first line 1410 has a greater slope than an origin line 1408 that is depicted from the origin to the first point 1402 because there is more incentive for a purchaser of a ticket to purchase a two dollar ticket than a one dollar ticket. One of ordinary skill in the art will recognize that the term "origin" refers to the point on a graph that has an x-coordinate of zero and a y-coordinate of zero. Further, the second line 1412 has a greater slope than the first line 1410, thereby illustrating that a purchaser of a ticket has more incentive to purchase a three dollar ticket than a two dollar ticket.

In one embodiment, the potential distributions are not limited to specific ratios. For instance, the potential distributions can be established according to a constant ratio, a variable ratio, or a combination of a constant ratio and a variable ratio.

Figure 15:
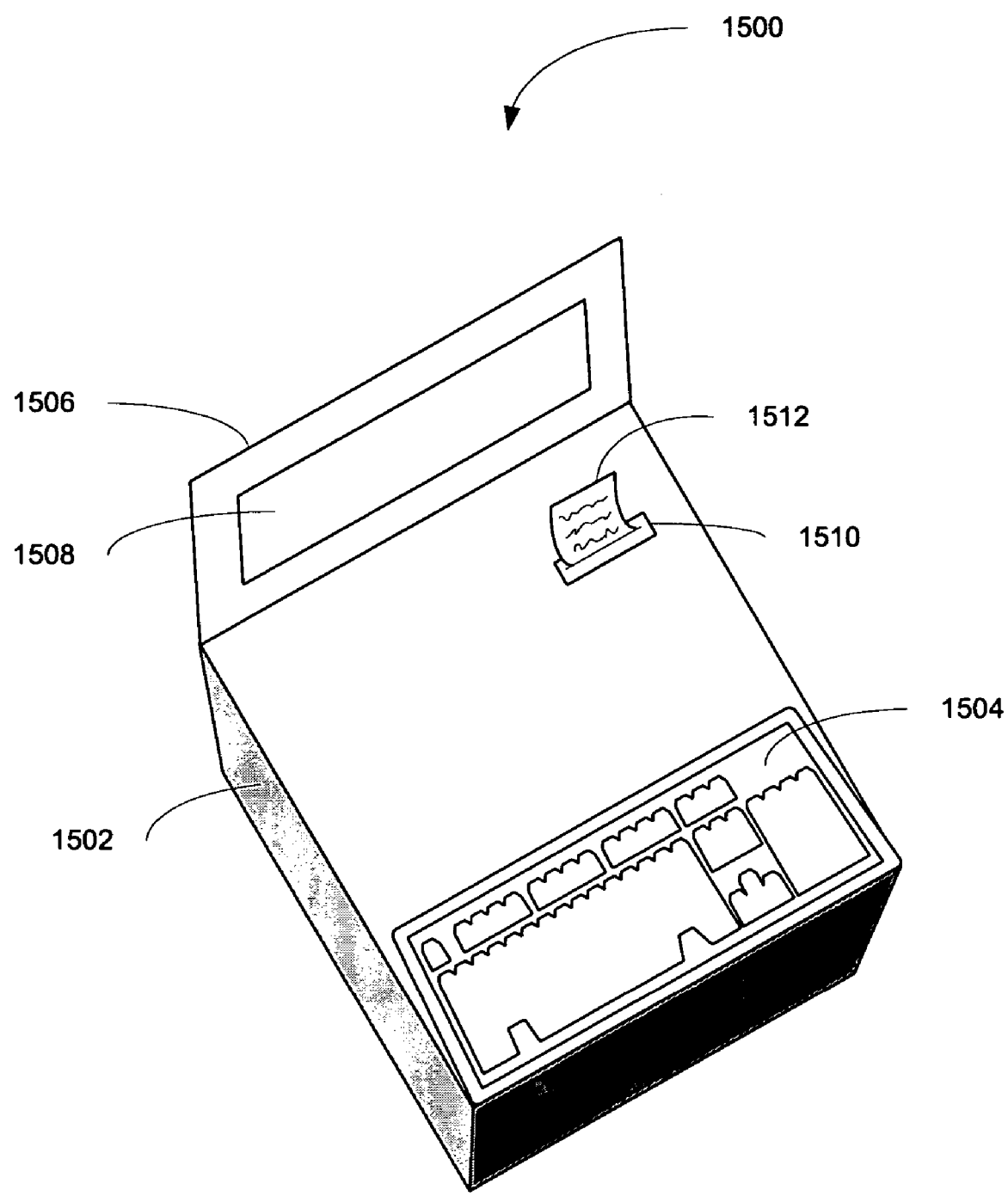
FIG. 15 illustrates a lottery ticket dispensing machine.

FIG. 15 illustrates a lottery ticket dispensing machine 1500. The different embodiments discussed above can be implemented with the use of the lottery ticket dispensing machine 1500, which can be positioned at various point of sale locations. The lottery ticket dispensing machine has a housing 1502 which stores the internal components of the lottery ticket dispensing machine 1500. In addition, the lottery ticket dispensing machine 1500 also has a user input device 1504 on which a user can input data for the sale of a lottery ticket. For instance, the vendor can input one of the different price categories in the multi-priced lottery system.

The price category that the vendor enters can be displayed on a screen 1508 of a display 1506. In one embodiment, the display 1506 is a graphical user interface. In another embodiment, the display 1506 displays data other than the price categories.

The vendor can then sell tickets in the respective price categories. When a purchaser would like to purchase a lottery ticket, the vendor enters the purchase information into the lottery ticket dispensing machine 1500 via the user input device 1504. In one embodiment, the user input device is a keyboard. In another embodiment, the user input device is operated by using a computer mouse. In an alternate embodiment, the user input device is a touch screen. In yet another embodiment, the user input device is voice activated. In an alternative embodiment, the display 1506 displays the purchased information that is entered via the user input device 1504.

In one embodiment, the lottery ticket dispensing machine 1500 has a payment reception module (not shown) that receives a payment for the purchase of a lottery ticket. In another embodiment, the payment reception module receives an electronic payment.

After the vendor inputs the data needed to sell a ticket from one of the selected price categories, a ticket 1512 is printed from a lottery ticket printer 1510. In one embodiment, the ticket printer 1510 is housed within the housing 1502. In another embodiment, the lottery ticket printer 1510 is positioned outside of the housing 1502 and is operably connected to the lottery ticket dispensing machine 1500. In yet another embodiment, the lottery ticket printer 1510 receives data from the lottery ticket dispensing machine 1500 through a wireless connection.

Figure 16:
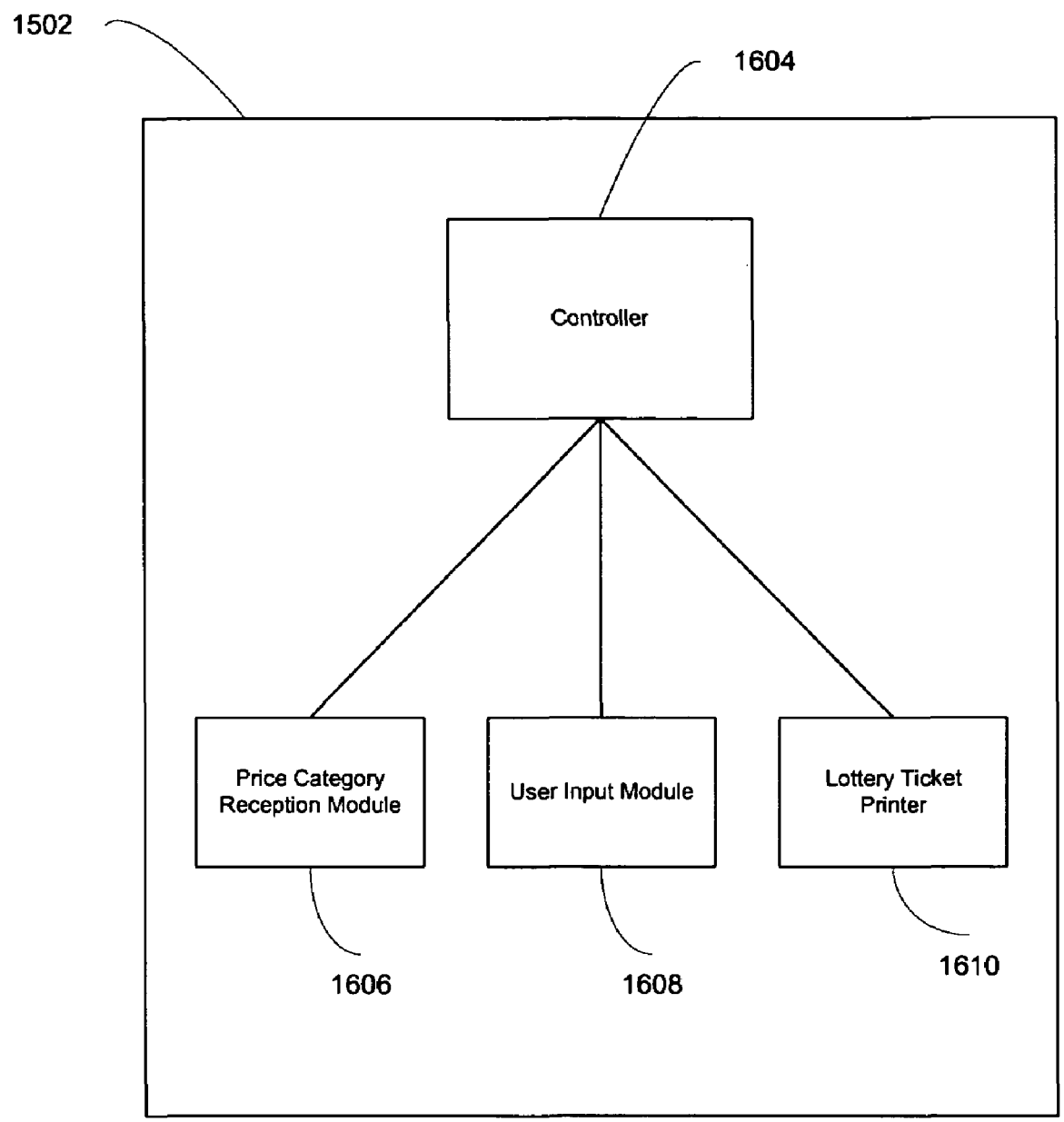
FIG. 16 illustrates the internal components of the housing of the lottery ticket dispensing machine.

FIG. 16 illustrates the internal components of the housing 1502 of the lottery ticket dispensing machine 1500. The housing 1502 houses a controller 1604, a price category reception module 1606, a user input module 1608, and a lottery ticket printer 1610. The controller 1604 coordinates the operation of these internal components.

The price category reception module 1606 receives the different price categories in which lottery tickets can be purchased in the multi-priced lottery system. In one embodiment, the price category reception module receives the different price categories and the associated distributions for each of the respective price categories. In one embodiment, a vendor can manually input the different price categories into the lottery ticket dispensing machine 1500. In another embodiment, the vendor can electronically input the different price categories into the lottery ticket dispensing machine 1500 by inserting a computer readable medium into the lottery ticket dispensing machine 1500. In yet another embodiment, the price category reception module 1606 receives the data related to the price category reception module from a server through a network.

In one embodiment, the user input module 1608 receives a user input from the user input device 1504. The user input module 1608 communicates with the controller 1504 SO that the controller can provide an instruction to the lottery ticket printer 1610 to print the lottery ticket.

Figure 17:
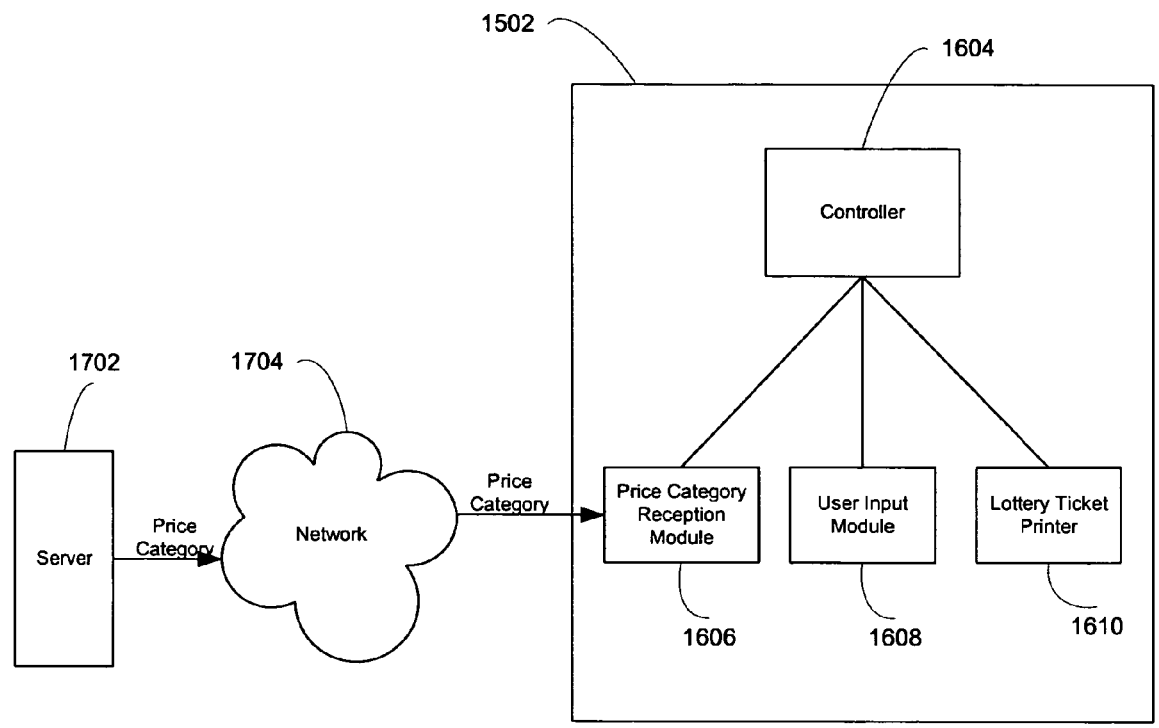
FIG. 17 illustrates a configuration in which the lottery ticket dispensing machine communicates with a server to receive a price category and the associated distribution of the price category.

FIG. 17 illustrates a configuration in which the lottery ticket dispensing machine 1500 communicates with a server 1702 to receive a price category and the associated distribution of the price category. The price category and the associated distribution can be determined according to the multi-priced lottery as a variable ratio or as a constant ratio as discussed above. The internal components housed within the housing 1602 are once again illustrated. The server 1702 provides a price category through a network 1704 to the price category reception module 1606 in the lottery ticket dispensing machine 1500. In one embodiment, multiple price categories are sent simultaneously with their associated distributions. In another embodiment, each price category is sent by itself with its associated distribution.

Figure 18:
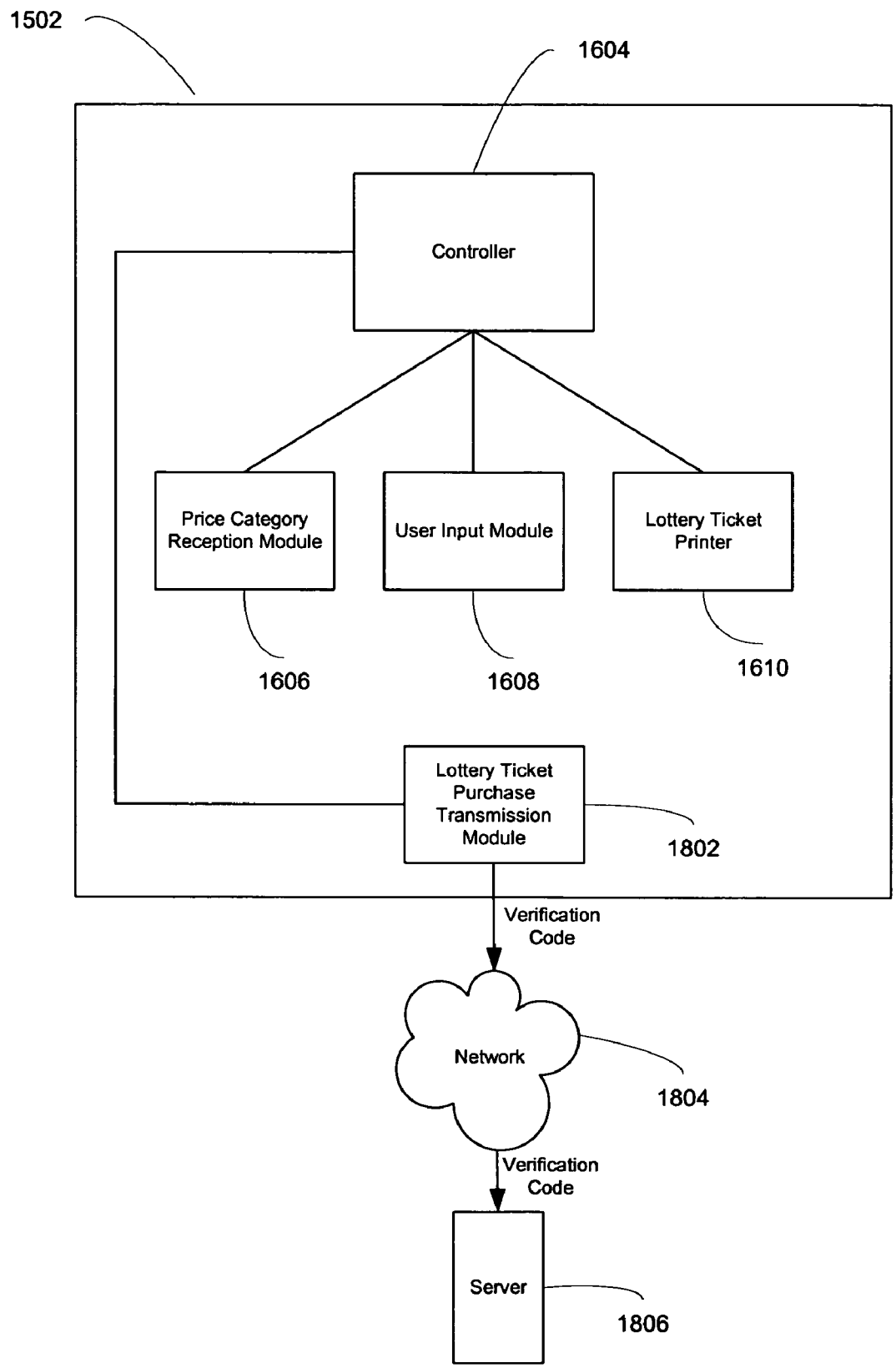
FIG. 18 illustrates a configuration in which the lottery ticket dispensing machine communicates with a server to transmit a verification code.

FIG. 18 illustrates a configuration in which the lottery ticket dispensing machine 1500 communicates with a server 1702 to transmit a verification code. In one embodiment, the housing 1602 also houses a lottery ticket purchase transmission module 1802. The lottery ticket purchase transmission module 1802 determines when a ticket has been purchased and transmits a verification code to a server 1806 through a network 1804. Upon a lottery ticket winner winning a distribution, the lottery operator can verify that the ticket holder purchased a valid lottery ticket by confirming that the verification code printed on the ticket matches the verification code received by the server 1806. In one embodiment, the lottery ticket printer 1610 prints the verification code on the ticket.

In another embodiment, the lottery ticket purchase transmission module transmits other data to the server 1806. For instance, the price category of the purchased ticket can be transmitted. The lottery operator can then record how large a jackpot is increasing in order to advertise the size of the jackpot to the public.

In another embodiment, the server 1806 is the same server as the server 1702. Therefore, the transmission of the price category and the reception of the verification code can be done by one server. In another embodiment, the server 1806 and the server 1702 are located at the same location. Therefore, the server 1702 and the server 1806 can more easily communicate with one another.

Figure 19:
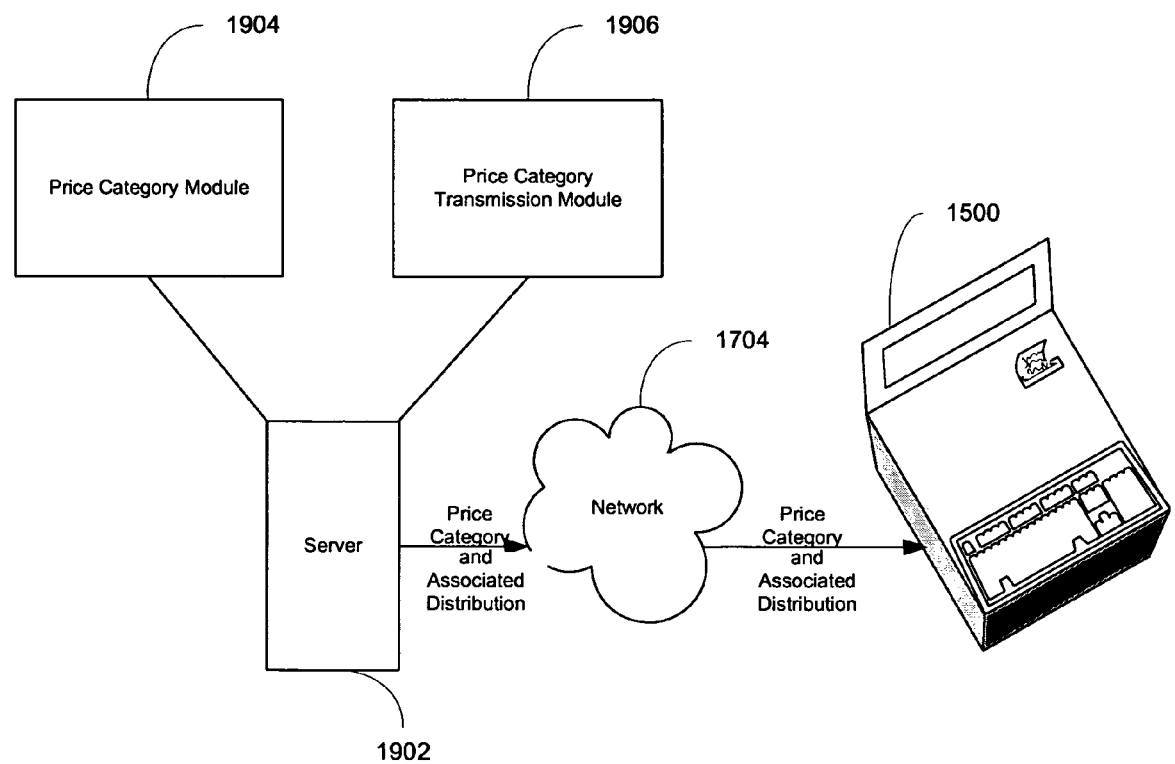
FIG. 19 illustrates a configuration in which a server sends data to the lottery ticket dispensing machine.

FIG. 19 illustrates a configuration in which a server 1902 sends data to the lottery ticket dispensing machine 1500. The server 1902 provides instructions to a price category module 1904 and to a price category transmission module 1906. The price category module 1904 determines price categories and distributions according to a variable ratio or a constant ratio in a multi-priced lottery distribution as discussed above. The price category transmission module 1906 then transmits the price category and the associated distribution through the network 1704 to the lottery ticket dispensing machine 1500. In one embodiment, the price category reception module illustrated in FIG. 17 receives the price categories and associated distributions.

Figure 20:
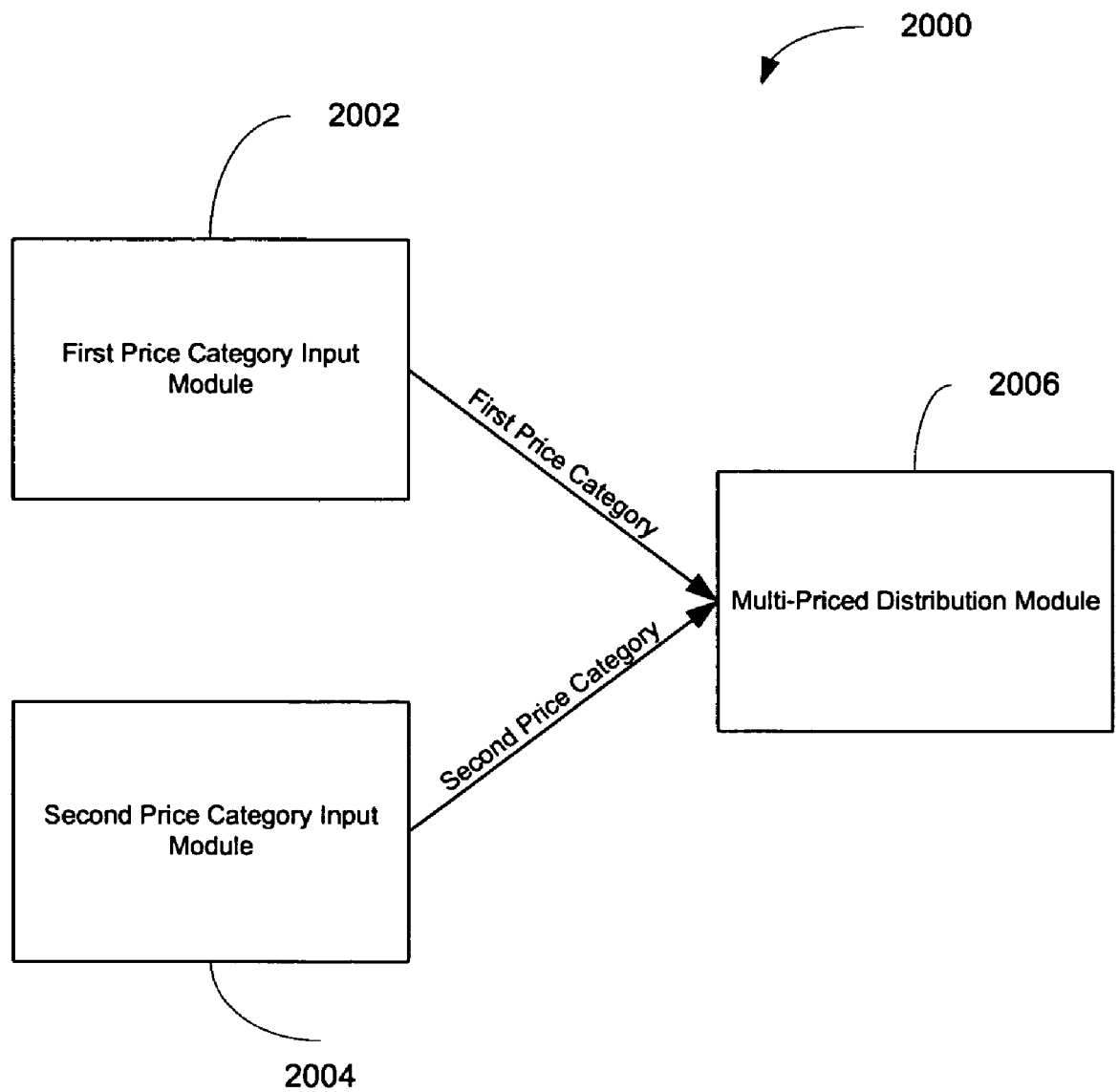
FIG. 20 illustrates a multi-priced distribution system. A first price category input module provides a first price category to a multi-priced distribution module.

FIG. 20 illustrates a multi-priced distribution system. A first price category input module 2002 provides a first price category to a multi-priced distribution module 2006. In addition, a second price category input module 2004 provides a second price category to the multi-priced distribution module 2006. In one embodiment, the multi-priced distribution module 2006 calculates a variable ratio for a multi-priced lottery as discussed above. In another embodiment, the multi-priced distribution module 2006 calculates a constant ratio for a multi-priced lottery as discussed above. In yet another embodiment, the multi-priced distribution module 2006 calculates a variable ratio and a constant ratio for a multi-priced lottery as discussed above. In one embodiment, the first price category input module, the second price category input module, and the multi-priced distribution module are stored on a computing device. In another embodiment, the first price category input module, the second price category input module, and the multi-priced distribution module are stored on a server. In another embodiment, the first price category input module, the second price category input module, and the multi-priced distribution module are stored on a client computer. In yet another embodiment, the first price category input module, the second price category input module, and the multi-priced distribution module are stored on the lottery ticket dispensing machine 1500.

Figure 21:
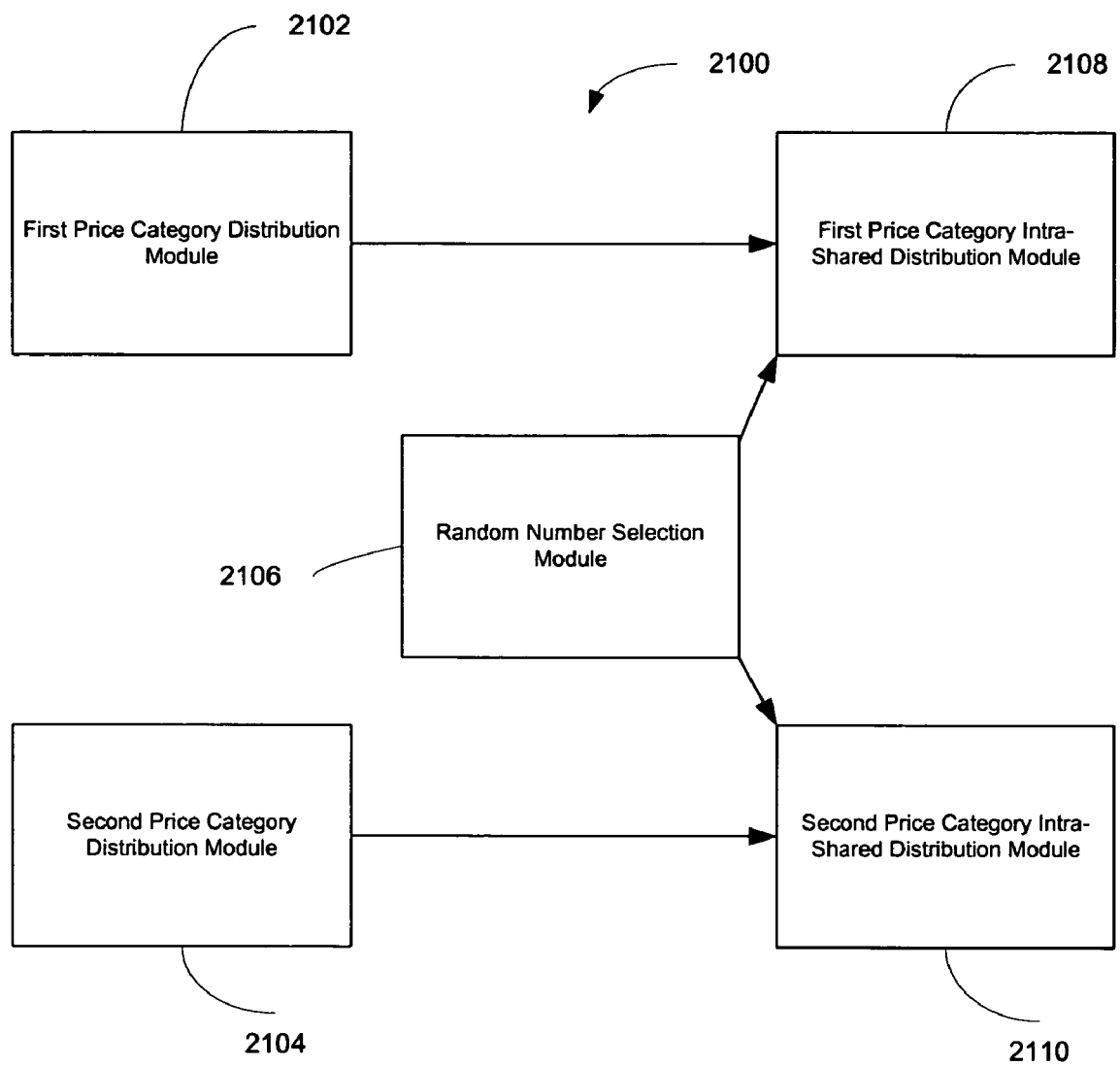
FIG. 21 illustrates a multi-priced lottery system configuration for intra-shared distributions.

FIG. 21 illustrates a multi-priced lottery system configuration for intra-shared distributions. A first price category distribution module 2102 receives requests to distribute portions of the first distribution to lottery ticket holders in the first price category. If there are multiple lottery ticket holders in the first price category, the first price category distribution module 2102 sends a request to a first price category intra-shared distribution module 2108, which distributes portions of the first distribution to the lottery ticket holders in the first price category.

A second price category distribution module 2104 receives requests to distribute portions of the second distribution to lottery ticket holders in the second price category. If there are multiple lottery ticket holders in the second price category, the second price category distribution module 2104 sends a request to a second price category intra-shared distribution module 2110, which distributes portions of the second distribution to the lottery ticket holders in the second price category.

In one embodiment, a random number selection module 2106 randomly selects a winning lottery number. The random number selection module 2106 provides the winning lottery number to the first price category intra-shared distribution module 2108, and to the second price category distribution module 2110.

Figure 22:
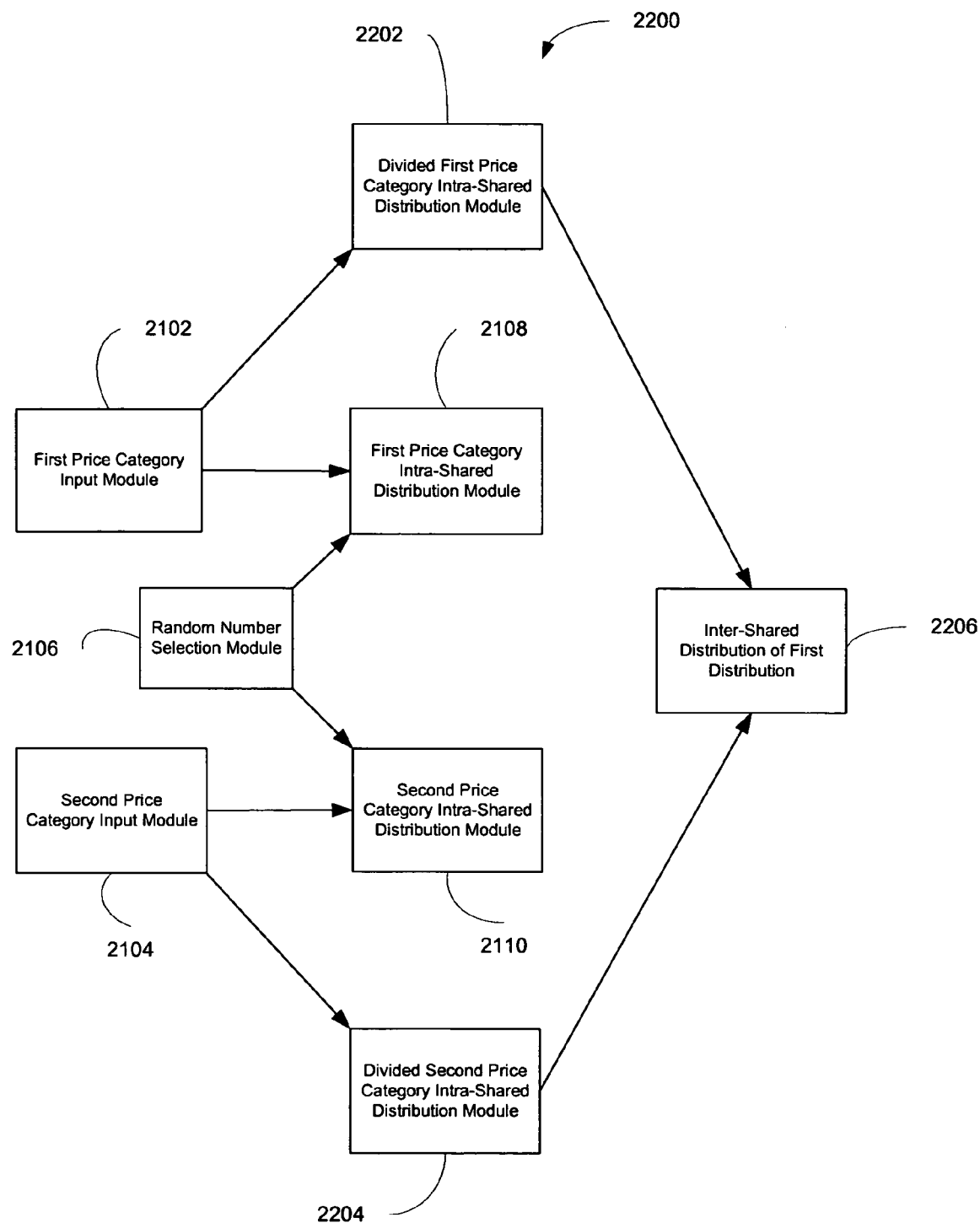
FIG. 22 illustrates an inter-shared lottery distribution system, which encompasses the lottery distribution configuration of FIG. 21.

FIG. 22 illustrates an inter-shared lottery distribution system 2200, which encompasses the lottery distribution configuration of FIG. 21. If there are winners in both the first price category and the second price category, the first price category module 2102 sends a request to a divided first price category distribution module 2202 and the second price category module 2104 sends a request to a divided second price category distribution module 2204. The divided first price distribution module 2202 and the second price distribution module 2204 provide requests to a first inter-shared distribution module 2206. The first inter-shared distribution module 2206 calculates the inter-shared distribution according to the inter-shared distribution in the multi-priced lottery system discussed above.

Figure 23:
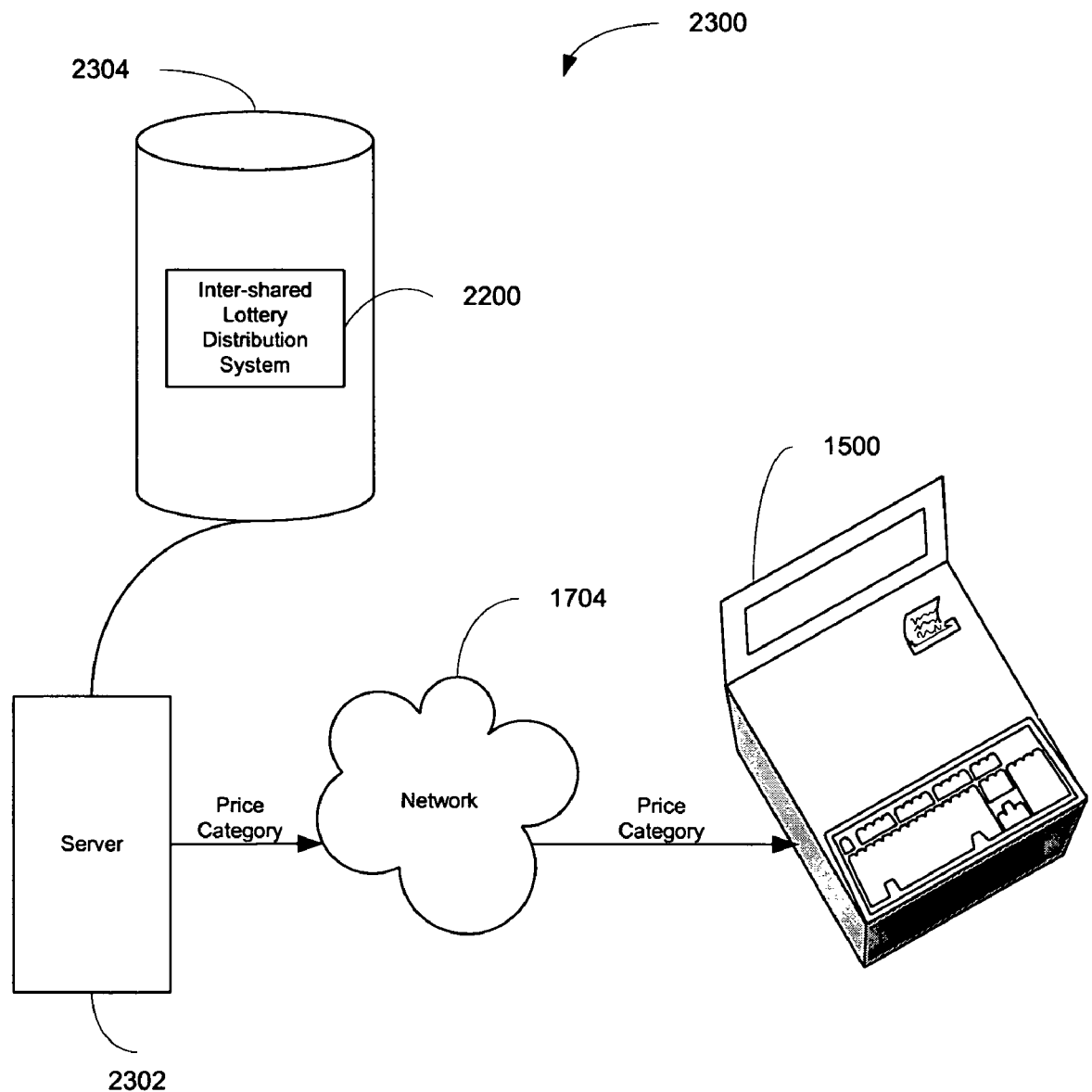
FIG. 23 illustrates a lottery ticket dispensing system.

FIG. 23 illustrates a lottery ticket dispensing system 2300. The lottery ticket dispensing system 2300 includes a server 2302, which is operably connected to a database 2304. In one embodiment, the components of the inter-shared lottery distribution system 2200 are stored on the database 2304. The server 2302 communicates with the lottery ticket dispensing machine 1500 through the network 1704 to provide price categories and associated distributions. In one embodiment, the server 2302 receives a verification code from lottery ticket dispensing machine 1500. In another embodiment, the server 2302 receives statistical information regarding lottery ticket sales from lottery ticket dispensing machine 1500.

Figure 24:
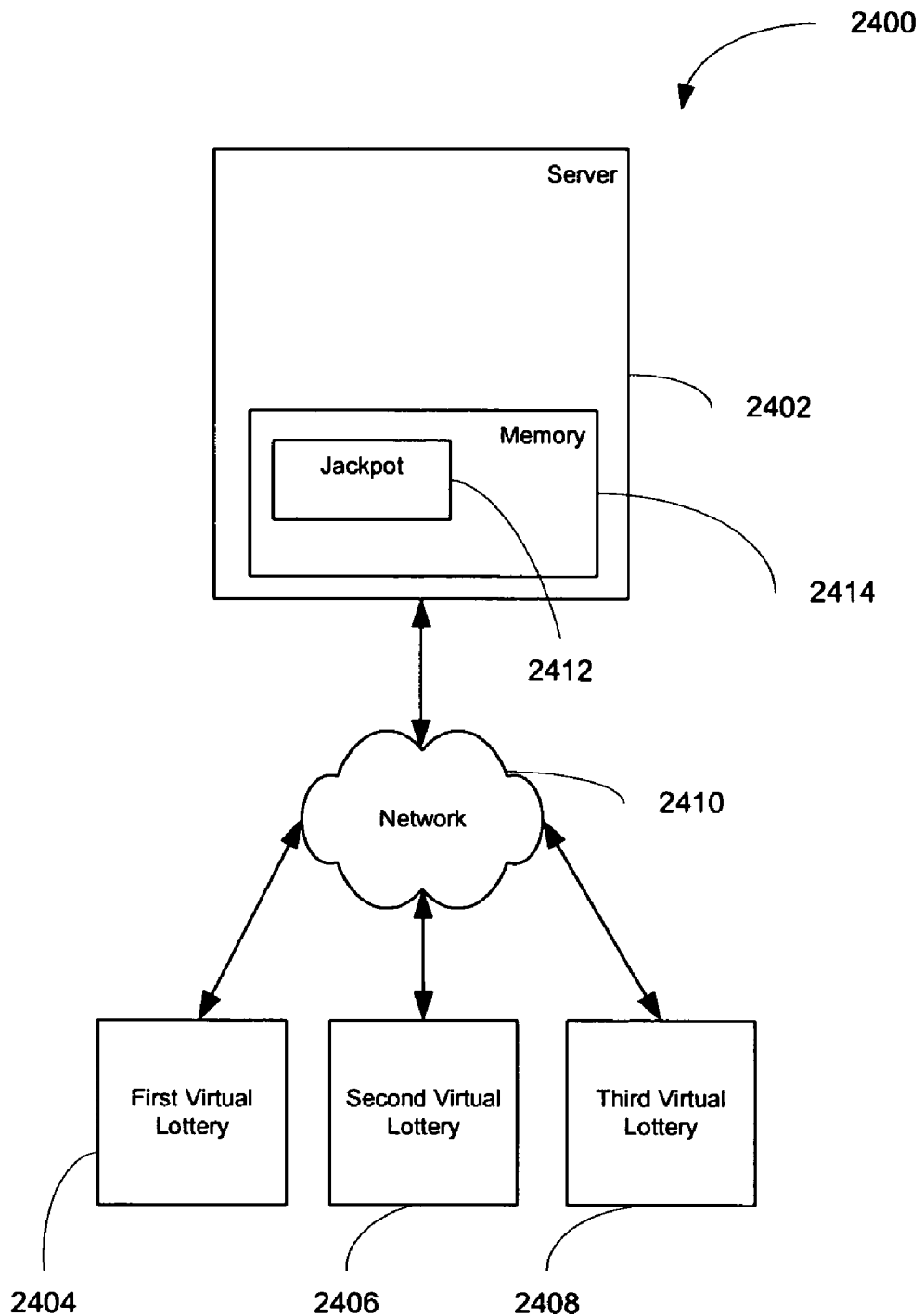
FIG. 24 illustrates a virtual lottery system.

FIG. 24 illustrates a virtual lottery system 2400. In one embodiment, a server 2402 communicates with a first virtual lottery unit 2404, a second virtual lottery unit 2406, and a third virtual lottery unit 2408. The server 2402 can communicate with these units through a network 2410 such as a Local Area Network ("LAN"), a Wide Area Network ("WAN"), the Internet, cable, satellite, etc. Alternatively, the server 2402 can be hardwired to the units.

In one embodiment, as players provide payment to enter a virtual lottery at one of the units, at least a portion of the payment is added to a jackpot 2412 stored in a memory 2414. In one embodiment, the jackpot 2412 is a progressive jackpot where the advertised jackpot is increased with a percentage of virtual ticket sales revenue. Therefore, player can win a larger jackpot than initially advertised. In one embodiment, the jackpot is increased with a percentage of the revenue from each virtual ticket sold. In essence, a variable prize is offered with a progressive jackpot. The prize can increase with each ticket sale. Thus, an increase in ticket sales results in the jackpot increasing or progressing in value. In one embodiment, the prize increases with a portion of the virtual ticket sales. In another embodiment, the progressive jackpot can be divided among multiple winners located at multiple units. For example, in FIG. 24, the progressive jackpot 2412 can be shared among virtual units 2402, 2406, and 2408. In one embodiment, a minimum amount of ticket sales is not required. The lottery prize can be a variable prize from the outset. A percentage of each ticket sale can be contributed to the variable prize jackpot.

Accordingly, when a player is considering entering a virtual lottery at the first virtual lottery unit 2404, the server 2402 provides the size of the current jackpot, which has accumulated from other players at the second virtual lottery unit 2406 and the third virtual lottery unit 2408 at previous times, to the first virtual lottery unit 2404. In one embodiment, the first virtual lottery unit 2404, the second virtual lottery unit 2406, and the third virtual lottery unit 2408 are all linked to one another. For instance, the server 2402 can provide updated jackpot information based on lottery wins and/or losses to the first virtual lottery unit 2404, the second virtual lottery unit 2406, and the third virtual lottery unit 2408. Thus, the progressive jackpot will change in value according to the wins and/or losses between the players at first virtual lottery unit 2404, the second virtual lottery unit 2406, and the third virtual lottery unit 2408. In another embodiment, the server 2402 is not needed to communicated the updated jackpot information because the virtual lottery units communicate with one another.

By having the virtual lottery units connected through a network, the progressive jackpot 2412 can build up more than in a paper based lottery. Players do not have the time constraints of having to wait for a lottery drawing. Further, players do not have to wait for selections of other players. Accordingly, the progressive jackpot can build up much more quickly through this type of configuration. The progressive jackpot can also build up in a similar manner if the virtual lottery units are linked to one another.

When the player at the first virtual lottery unit 2404 enters a virtual lottery, the player is essentially purchasing a virtual lottery ticket for a drawing in which that virtual lottery ticket is the only virtual lottery ticket that exists. Accordingly, the player can instantly determine if a winning virtual lottery-ticket has been purchased.

Similar to a regular lottery, the first virtual lottery unit 2404 provides the player with the opportunity to select a virtual lottery ticket number or to have the first virtual lottery unit 2404 randomly generate a "quick pick" for the player. The first virtual lottery unit 2404 then randomly selects the winning virtual lottery ticket numbers. Further, the first virtual lottery unit 2404 compares the virtual lottery ticket number to determine if the player won the virtual lottery. If the player won the virtual lottery, then a portion of the jackpot or the jackpot in its entirety is provided to the player and is deducted from the jackpot for future play. On the other hand, if the player does not win the virtual lottery, the jackpot is available to future players of the virtual lottery.

In another embodiment, the server 2402 randomly generates the winning virtual lottery ticket number. In yet another embodiment, the player selects the virtual lottery ticket number by entering the number of the virtual lottery ticket without having a quick pick option. In yet another embodiment, the player selects the virtual lottery ticket number by selecting the quick pick option and cannot manually enter the numbers of the virtual lottery tickets.

In one embodiment, the jackpot 2412 is probabilistic. In other words, a large amount is indicated as being the jackpot 2412 in order to induce the purchase of virtual lottery tickets regardless of whether sufficient sales of virtual lottery tickets have occurred to cover the jackpot 2412. Accordingly, there is an increased likelihood that the sales of the virtual lottery tickets will suffice to cover the jackpot 2412 because players are more likely to purchase virtual lottery tickets for a large jackpot than for a low jackpot. In one embodiment, insurance is purchased as a guarantee that the jackpot will be paid in the event that the virtual lottery ticket sales are insufficient to cover the jackpot 2412.

Figure 25:
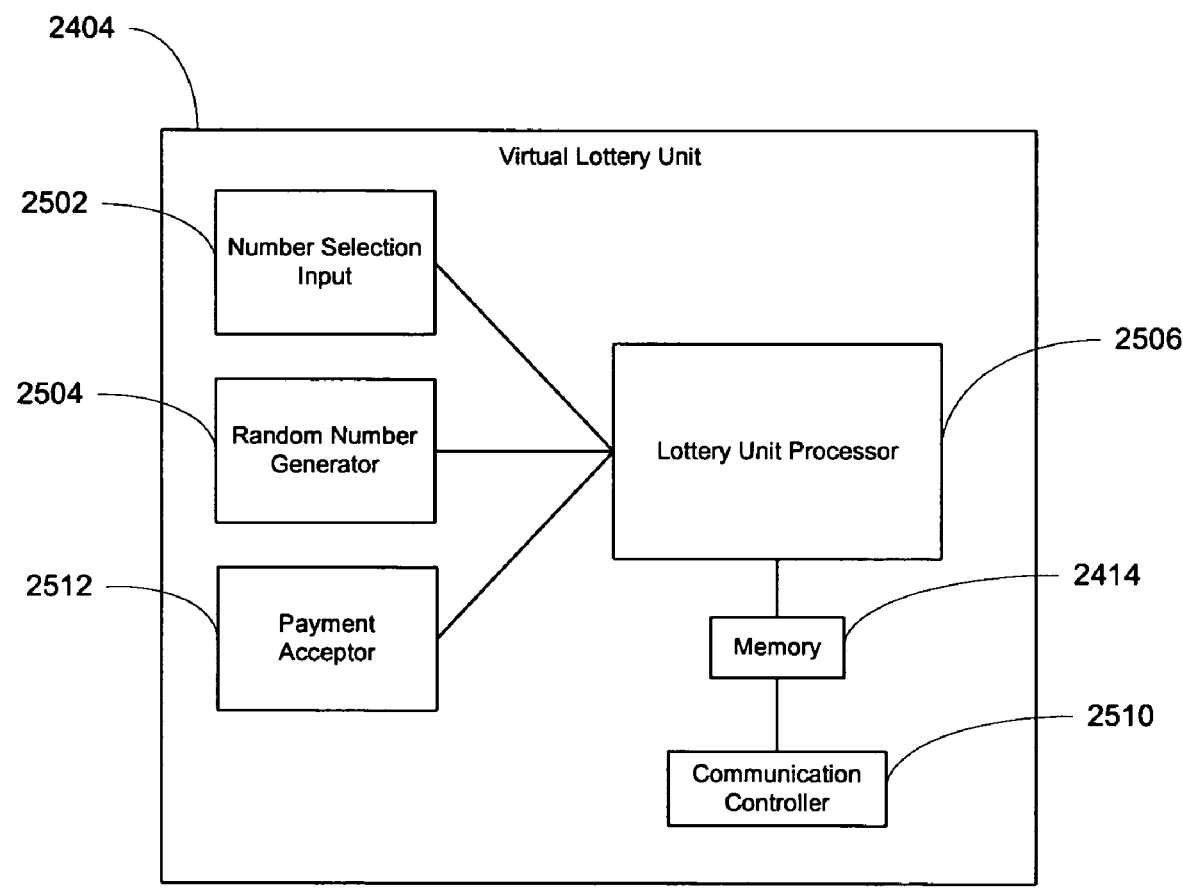
FIG. 25 illustrates the components of the first virtual lottery unit.

FIG. 25 illustrates the components of the first virtual lottery unit 2404. In one embodiment, a number selection input 2502 receives a virtual lottery ticket number selected by the player. In one embodiment, the number selection input 2502 is a keypad that the player can utilize to manually enter the virtual lottery ticket number. In another embodiment, the number selection input 2502 is a touch screen on which the player can enter the virtual lottery ticket number. In yet another embodiment, the number selection input 2502 is a voice recognition system through which the player can vocally provide the virtual lottery ticket number. In yet another embodiment, the player can enter a command for a quick pick so that the first virtual lottery unit 2404 randomly generates the virtual lottery number.

In one embodiment, the first virtual lottery unit 2404 has a random number generator 2504. In one embodiment, the random number generator 2504 randomly generates the winning virtual lottery number. In another embodiment, the random number generator 2504 randomly generates a quick pick virtual lottery number. In yet another embodiment, the random number generator 2504 both randomly generates the winning virtual lottery number and the quick pick number. In another embodiment, the server 2402 has a random number generator that randomly generates the winning virtual lottery number while the random number generator 2504 in the virtual lottery unit 2404 randomly generates the quick pick number.

In one embodiment, the first virtual lottery unit 2404 has a lottery unit processor that coordinates the various operations of the first virtual lottery unit 2404. For instance, the lottery unit processor 2506 receives the virtual lottery number from the number selection input 2502 that was selected by the player. The lottery unit processor 2506 can then store the virtual lottery number in a memory 2414. In addition, the lottery unit processor 2506 receives the winning virtual lottery number from the random number generator 2504 and stores the winning virtual lottery number in the memory 2414. The lottery unit processor 2506 then retrieves the virtual lottery number in the memory 2414. The lottery unit processor 2506 then retrieves the virtual lottery number to compare the two numbers. If the two numbers are the same in entirety, then the player wins a known percentage of the virtual lottery prize. If subsets of the two numbers are the same, then the player wins a secondary prize which is a fixed prize.

In one embodiment, a communication controller 2510 in the virtual lottery unit 2404 communicates with the server 2402. The communication controller 2510 receives data such as the value of the jackpot. The communication controller 2510 can store this value on the memory 2414 so that the lottery unit processor 2506 can compute a known percentage of the jackpot that can be won by the player. In another embodiment, the lottery unit processor 2506 communicates with the communication controller 2510 after data is received by the communication controller 2510 from the memory 2414. The lottery unit processor 2506 then stores the data in the memory 2414.

In one embodiment, a payment acceptor 2512 accepts payment for a virtual lottery ticket. The lottery unit processor 2506 stores the amount provided by the player. In one embodiment, the payment acceptor 2512 is a bill acceptor that accepts paper currency. In another embodiment, the payment acceptor 2512 is a coin acceptor that accepts coins for payment. In yet another embodiment, the payment acceptor accepts cashless payment. Various forms of cashless can include a credit card, smart card, stored value card purchased at a kiosk, stored value card received in a promotion, code such as number that is printed on a ticket, etc.

The first virtual lottery unit 2404 can be implemented in a number of different combinations. Any type of computing device, such as a personal computer, can be utilized. Further, various displays can be operably attached or integrated into the first virtual lottery unit 2404 to provide the player with data such as the jackpot value, known percentages of the jackpot that can be won according to respective virtual lottery ticket prizes, the virtual lottery ticket, and the winning virtual lottery number. Other embodiments may provide displays with other pertinent information.

FIGS. 26A-26D illustrate the contents of the memory 2414 as data is received from the server 2402. One or more displays operably connected to or operably integrated into the first virtual lottery unit 2404 to provide the player with data such as the jackpot value, known percentages of the jackpot that can be won according to respective virtual lottery ticket prices, the virtual lottery ticket, and the winning virtual lottery number. Other embodiments may provide displays with other pertinent information.

FIGS. 26A-26E illustrate the contents of the memory 2414 as data is received from the server 2402. One or more displays operably connected to or operably integrated into the virtual lottery unit 2404 can display these contents.

Figure 26A:
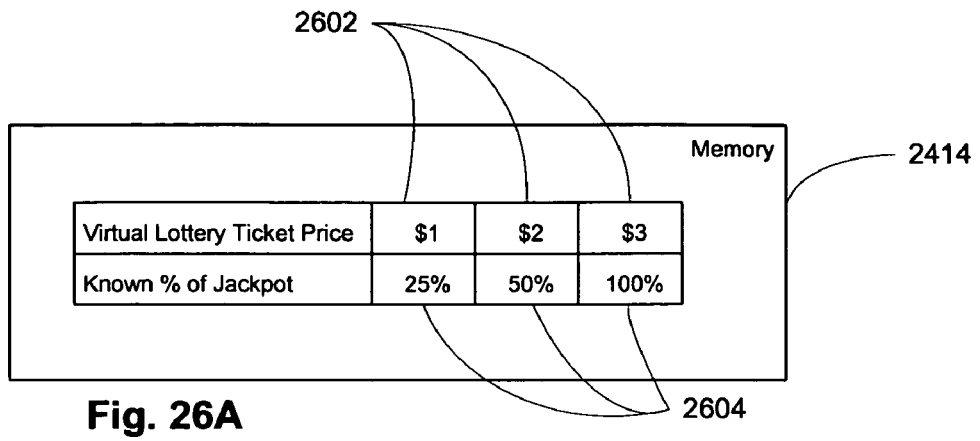
FIGS. 26A-26E illustrate the contents of the memory as data is received from the server.

FIG. 26A illustrates the memory 2414 containing a plurality of virtual lottery ticket prices and a plurality of known percentages 2604 of the jackpot. In one embodiment, each of the known percentages 2604 corresponds to one of the virtual lottery ticket prices 2602. For instance, a purchase of a one dollar virtual lottery ticket can provide the player with the ability to win twenty five percent of the jackpot. Similarly, a purchase of a two dollar ticket can provide the player with the ability to win fifty percent of the jackpot. Finally, a purchase of the three dollar ticket can provide the player with the ability to win one hundred percent of the jackpot.

The player has more inducement to purchase the three dollar ticket than the one dollar ticket or the two dollar ticket because the player can win a larger portion of the jackpot. The player is actually eligible to win a larger percentage of the jackpot by purchasing one three dollar ticket as opposed to three one dollar tickets. Therefore, over an extended period of time, players are more likely to purchase higher-priced tickets rather than lower-priced tickets, thereby creating higher revenues.

In one embodiment, the player can purchase a plurality of virtual lottery tickets for a single virtual lottery drawing. For instance, the player can purchase a one dollar virtual lottery ticket and a three dollar virtual lottery ticket, each having different virtual lottery ticket numbers. Accordingly, the player increases the odds at winning that particular virtual lottery drawing by having multiple different virtual lottery ticket numbers. The player can also purchase multiple virtual lottery tickets for the same drawing. For instance, the player can purchase two three dollar virtual lottery tickets. On the other hand, the player may choose to enter different drawings.

In one embodiment, the player can select the virtual lottery ticket number for some of the virtual lottery tickets and can have quick picks of the virtual lottery tickets for other virtual lottery tickets in the same drawing. Accordingly, additional interest in playing the lottery is provided because the player can have a mixture of some of the player's own selections of virtual lottery ticket numbers and the random number generator's selection of virtual lottery ticket numbers.

The various choices that the player is given provide further inducement to play the virtual lottery more frequently and to purchase higher priced virtual lottery tickets. The player is given an opportunity to purchase differently priced tickets to win various percentages of the jackpot 2412 and/or secondary prizes, and to increase the odds at winning a percentage of the jackpot 2412 or a secondary prize by purchasing multiple virtual lottery tickets.

Different percentages than the percentages illustrated may be utilized. Further, different virtual lottery ticket prices than the virtual lottery ticket prices illustrated may also be utilized. A different number of virtual lottery ticket prices and a different number of corresponding jackpot percentages may also be utilized. Further, the virtual lottery ticket prices 2602 and the percentages 2604 of the jackpot may be updated by the server 2404. Alternatively, the virtual lottery ticket prices 2602 and the percentages 2604 of the jackpot may be permanently stored in the memory 2414 such as if the memory 2414 is a read only memory.

Figure 26B:
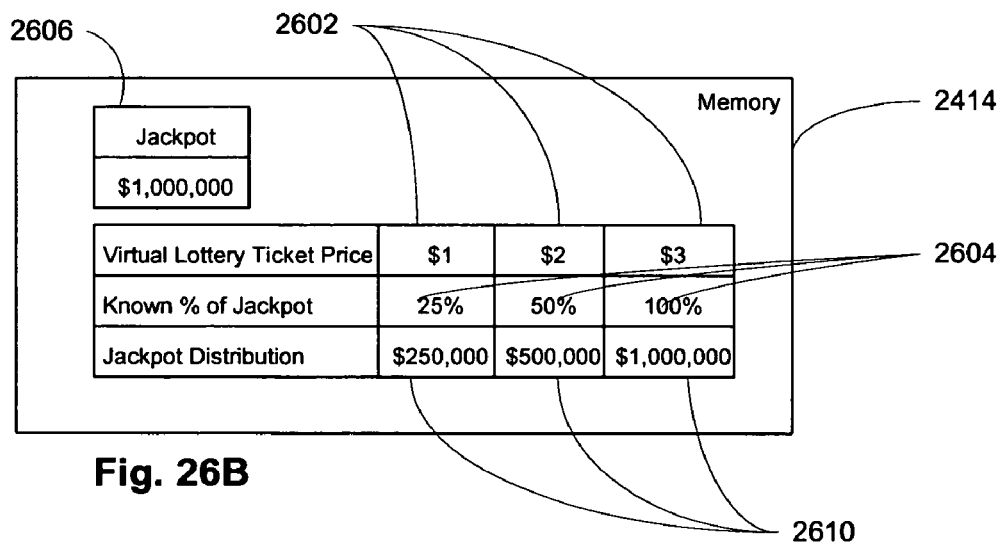

FIG. 26B illustrates the memory 2414 depicted in FIG. 26A with a jackpot value 2606 and a plurality of jackpot distributions 2610. In one embodiment, the jackpot value 2606 is received from the server 2404. As players at other virtual lottery units 2406 and 2408 win or lose, the jackpot value 2606 is increased or decreased. The server 2402 stores the current value of the jackpot. Once the virtual lottery unit 2404 receives the jackpot value 2606, the virtual lottery unit 2404 can calculate the percentage values 2610 corresponding to the virtual lottery ticket prices 2602. For instance, the one dollar virtual lottery ticket holder can win two hundred fifty thousand dollars. The two dollar virtual lottery ticket holder can win five hundred thousand dollars. Finally, the three dollar virtual lottery ticket holder can win one million dollars.

In another embodiment, the jackpot value 2606 is based on a probabilistic model rather than a strictly pari-mutuel model. For instance, the jackpot value 2606 will initially be a guaranteed large prize prior to any sales of virtual lottery tickets. Accordingly, more players will be induced to purchase virtual lottery tickets because they do not have to wait for a significant number of virtual lottery ticket sales in order for the jackpot value 2606 to become large. A third party entity can provide insurance so that the situations in which players happen to win virtual lotteries where the virtual lottery ticket sales are not significant enough to be greater than or equal to the jackpot value 2606 are provided for. A portion or all of virtual lottery ticket sales that exceed the guaranteed prize amount can be added to the jackpot value 2606.

In one embodiment, the virtual lottery unit 2404 calculates the jackpot distribution 2610 after receiving the jackpot value 2606 from the server 2402. For instance, the virtual lottery unit processor 2506 (FIG. 25) can perform the calculation. In another embodiment, the server 2402 performs the calculation and sends the result to the virtual lottery unit 2404.

Figure 26C:
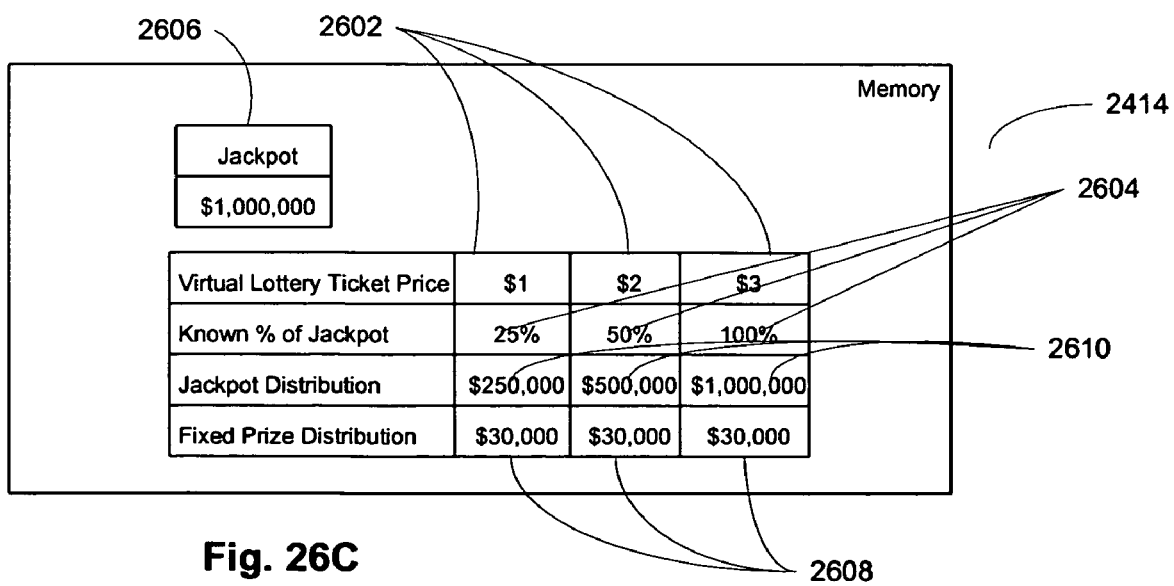

FIG. 26C illustrates the virtual lottery ticket price 2602 depicted in FIG. 26A with the addition of a secondary prize. In one embodiment, a secondary prize is a fixed prize. By the term fixed prize, the same prize will be provided irrespective of virtual lottery ticket sales at other virtual lottery units. In other words, the fixed prize is not increased or decreased according to virtual lottery ticket sales. The fixed prize may be accumulated according to a probabilistic or a pari-mutuel model.

In one embodiment, if the virtual lottery ticket number is not the same in entirety as the winning virtual lottery ticket number, the player cannot win the percentage of the jackpot value 2606 associated with virtual lottery ticket price of the virtual lottery ticket purchased. However, the player can still win a secondary prize if a subset of the virtual lottery ticket number equals a subset of the winning virtual lottery ticket number.

In one embodiment, the secondary prize is a fixed prize that is the same across virtual lottery prices. For instance, if the player has virtual lottery ticket number that has a subset of the winning virtual lottery ticket number, the player wins a fixed prize distribution 2612 of, for example, thirty thousand dollars regardless of the amount that the player purchased the virtual lottery ticket for.

Figure 26D:
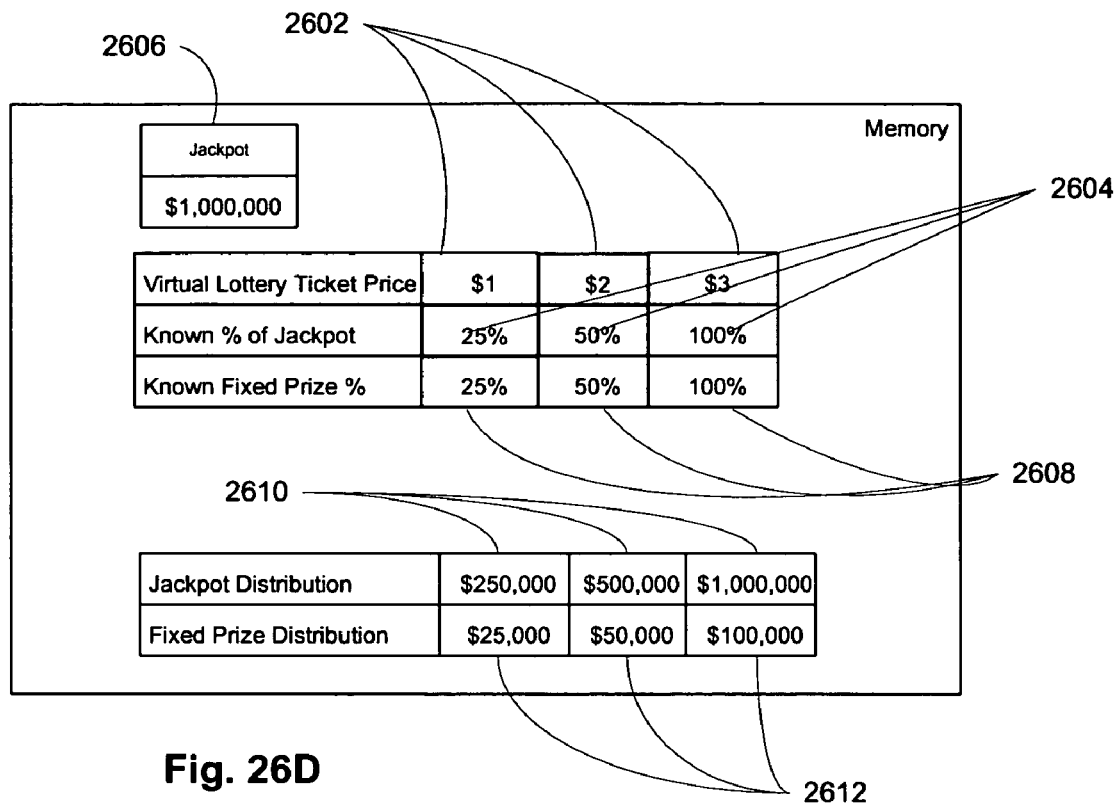

FIG. 26D illustrates an embodiment in which the secondary prize is a fixed prize that can be won according to a known percentage configuration. In one embodiment, the percentage configuration is the same as that associated with the virtual lottery ticket prices for winning a percentage of the jackpot.

For instance, if the fixed prize is one hundred thousand dollars, a virtual lottery player with a virtual lottery ticket number that has a match which is a subset of the full match may win a known percentage 2604 associated with price of the virtual lottery ticket purchased. For example, a player that purchases a one-dollar virtual lottery ticket can win a known twenty five percent of one hundred thousand dollars, which is twenty five thousand dollars. A player that purchases a two-dollar virtual lottery ticket can win fifty percent of one hundred thousand dollars, which is fifty thousand dollars. Finally, a player that purchases a three-dollar virtual lottery ticket can win one hundred percent of one hundred thousand dollars, which is one hundred thousand dollars.

In one embodiment, each of the percentages of the fixed prize can vary according to the quality of the match. For instance, in the above example, if the player had a match that had all of the numbers of the winning virtual lottery number except for one, the player could win twenty-five percent of the fixed prize. If the player had a match that had all of the numbers of the winning virtual lottery number except for two, the player could win twenty percent of the fixed prize. In other words, the percentage of the fixed prize associated with a virtual lottery ticket price can be smaller for virtual lottery ticket numbers that have a smaller subset of the winning virtual lottery number.

Figure 26E:
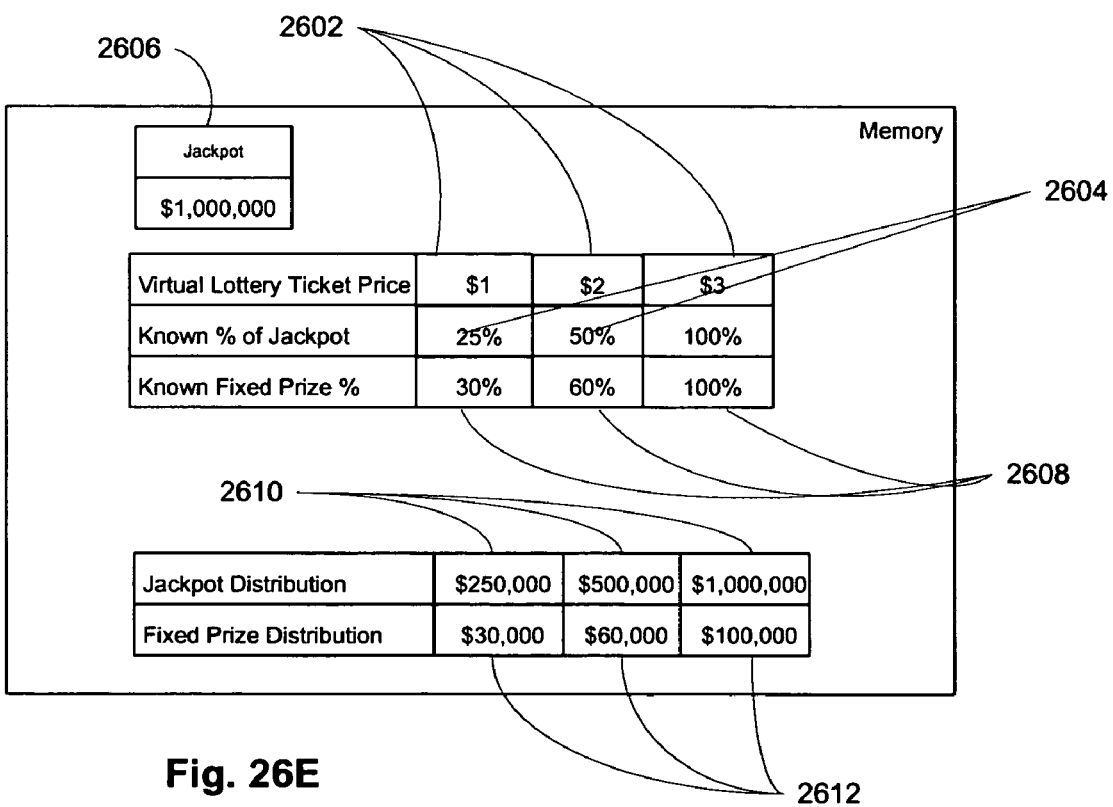

FIG. 26E illustrates an embodiment in which the fixed prize distribution is based on a percentage configuration other than that of the progressive jackpot configuration. In one embodiment, higher percentages are utilized for higher priced virtual lottery tickets. For instance, the known fixed prize percentages 2608 can be thirty percent for the first lottery ticket price, sixty percent for the second lottery ticket price, and one hundred percent for the third lottery ticket price. As a result, a series of fixed prize distributions 2612 can be made. For instance, a thirty thousand dollar distribution can be made for the one-dollar virtual lottery ticket, a sixty thousand dollar distribution can be made for the two-dollar virtual lottery ticket, and a one hundred thousand dollar distribution can be made for the three-dollar virtual lottery ticket.

Figure 27:
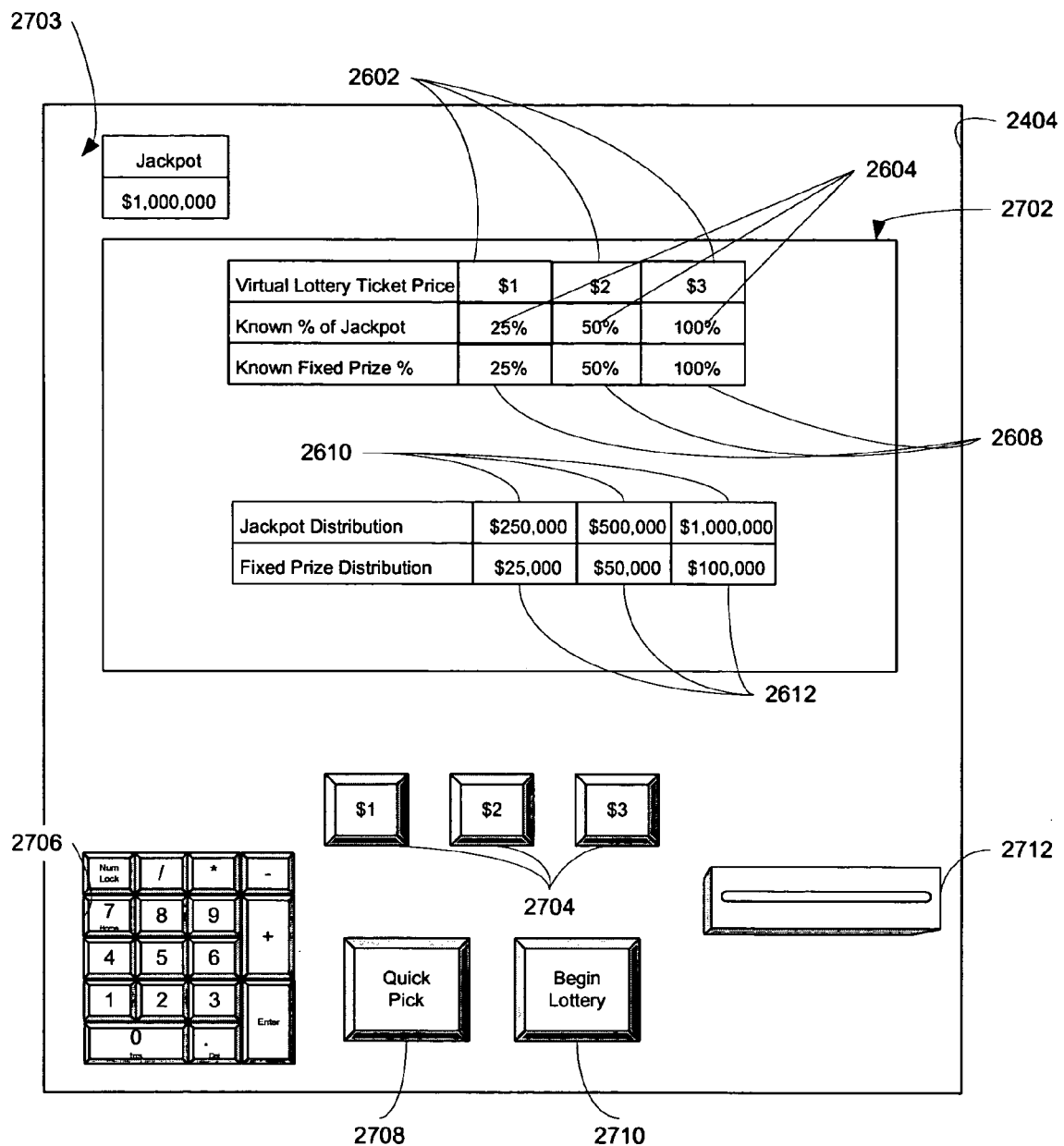
FIG. 27 illustrates the virtual lottery unit.

FIG. 27 illustrates the virtual lottery unit 2404. The virtual lottery unit has a jackpot display 2703 that indicates the current progressive jackpot value. In one embodiment, the server 2402 sends the jackpot value to the virtual lottery unit for display on a progressive jackpot display 2703. The virtual lottery unit also has a virtual lottery price display 2702 that displays prices for virtual lottery tickets and associated known percentages for each of the virtual lottery ticket prices. An indication is also provided as to whether a virtual lottery ticket is for a fixed prize. For instance, a one-dollar virtual lottery ticket may be purchased to potentially win a fixed prize of one hundred thousand dollars. A two-dollar virtual lottery ticket may be purchased to potentially win twenty-five percent of the jackpot for a possible two hundred fifty thousand dollars. In addition, a three-dollar virtual lottery ticket may be purchased to potentially win one hundred percent of the jackpot for a possible one million dollars.

A plurality of price selection inputs 2704 are provided so that the player can select the virtual lottery ticket that the player would like to purchase. For instance, the player can press the one-dollar button if the player would like to purchase the one-dollar virtual lottery ticket to potentially win the fixed prize of one hundred thousand dollars. Further, the player can press the two-dollar button if the player would like to purchase the two-dollar virtual lottery ticket to potentially win twenty five percent of the jackpot. In addition, the player can press the three-dollar button if the player would like to purchase the three-dollar virtual lottery ticket to potentially win one hundred percent of the jackpot.

The player can enter a selection of a virtual lottery ticket number through an input module 2706. In one embodiment, the input module 2706 is a keypad. In another embodiment, the input module 2706 is a touch screen. Alternatively, the player can press a quick pick button 2708 to have the virtual lottery unit 2404 select the virtual lottery ticket number for the player. The player can press a virtual lottery initiation button 2710 to being lottery play. Further, the payment module 2712 receives one of the various forms of payment described above.

In one embodiment, the virtual lottery unit 2402 has the plurality of buttons illustrated, such as the input module 2706 and the quick pick button 2708, to determine the virtual lottery ticket number. In another embodiment, a menu is provided that provides the player with the ability to make a choice of a manual selection or of a quick pick selection of the virtual lottery ticket number. The menu can be provided on a computerized display such as a liquid crystal display or a plasma display.

In one embodiment, the player can choose a first known percentage that is distinct from a second known percentage in which to purchase a virtual lottery ticket. The first known percentage is associated with a first price of a virtual lottery ticket, and the second known percentage is associated with a second price of a virtual lottery ticket.

Figure 28:
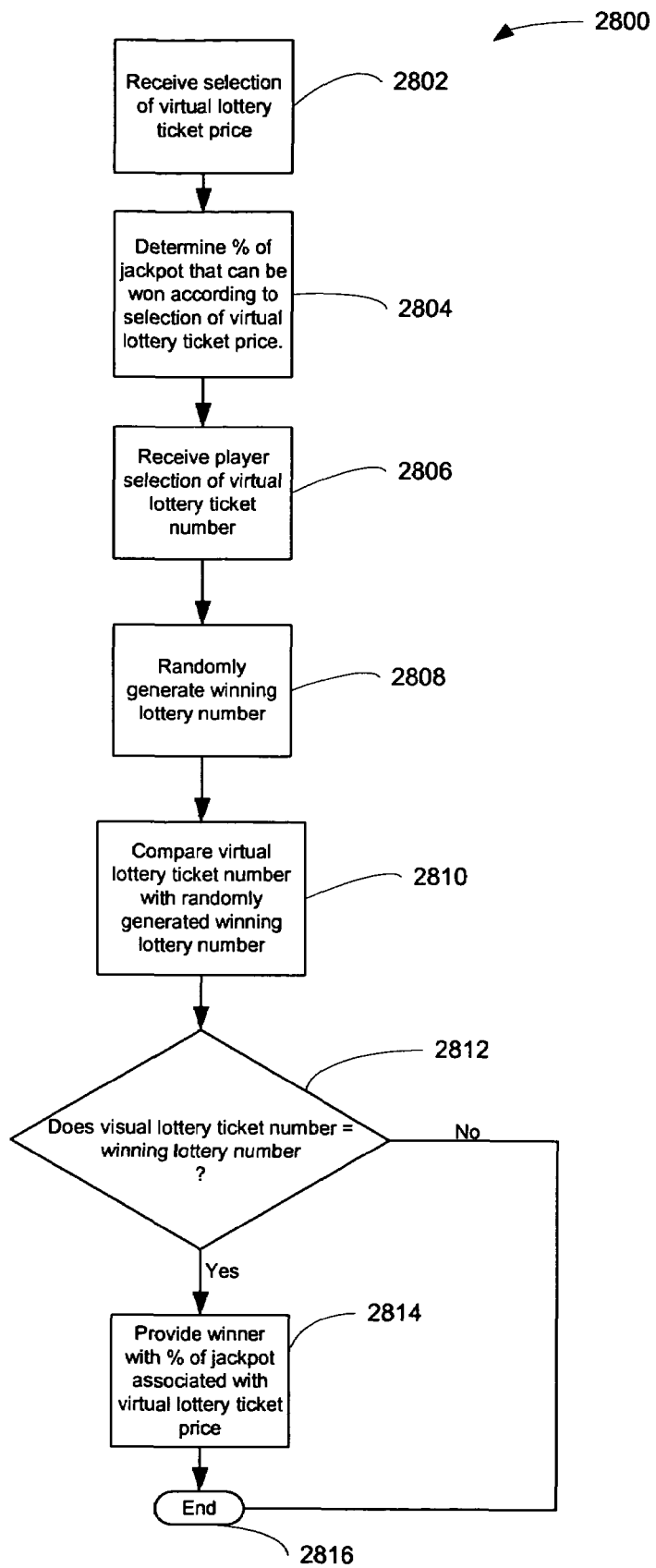
FIG. 28 illustrates a process for the conducting the virtual lottery.

FIG. 28 illustrates a process 2800 for the operating the virtual lottery. At a process block 2802, a selection of a virtual lottery ticket price is received. A determination of the potential distribution of the jackpot that can be won is then determined at a process block 2804. If the lottery ticket price is associated with a percentage of the jackpot, the percentage of the current jackpot is calculated and displayed to the player. In one embodiment, this calculation is performed and displayed for all of the price categories prior to the player's selection at the process block 2802. A calculation is not needed for the fixed prize as the fixed prize does not change. At a process block 2806, the player selects a virtual lottery ticket number. The player can manually enter the virtual lottery ticket number through the input module 2706 on the virtual lottery machine. In an alternative embodiment, the player can choose the quick pick button to have the virtual lottery unit 2404 randomly generated the virtual lottery ticket number for the player. At a process block 2808, the winning virtual lottery ticket number is generated. In one embodiment, the virtual lottery unit generates the winning virtual lottery ticket number. In another embodiment, the server generates the winning virtual lottery ticket number.

At a process block 2810, a comparison is made between virtual lottery ticket number and the winning virtual lottery ticket number. In one embodiment, the virtual lottery unit 2404 performs this comparison. In another embodiment, the server performs this comparison. At a process block 2812, a determination is made if the virtual lottery ticket number equals the winning virtual lottery ticket number. If the virtual lottery ticket number equals the winning virtual lottery number, the process 2300 proceeds to a process block 2814 where the winner is provided with the percentage of the jackpot associated with the virtual lottery ticket price. Alternatively, if the virtual lottery ticket price is associated with a fixed prize, the winner is provided with the fixed prize. The process 2300 then proceeds to the end block 2816. If the virtual lottery ticket number does not equal the winning virtual lottery number, the process 2300 proceeds to the end block 2816.

Figure 29:
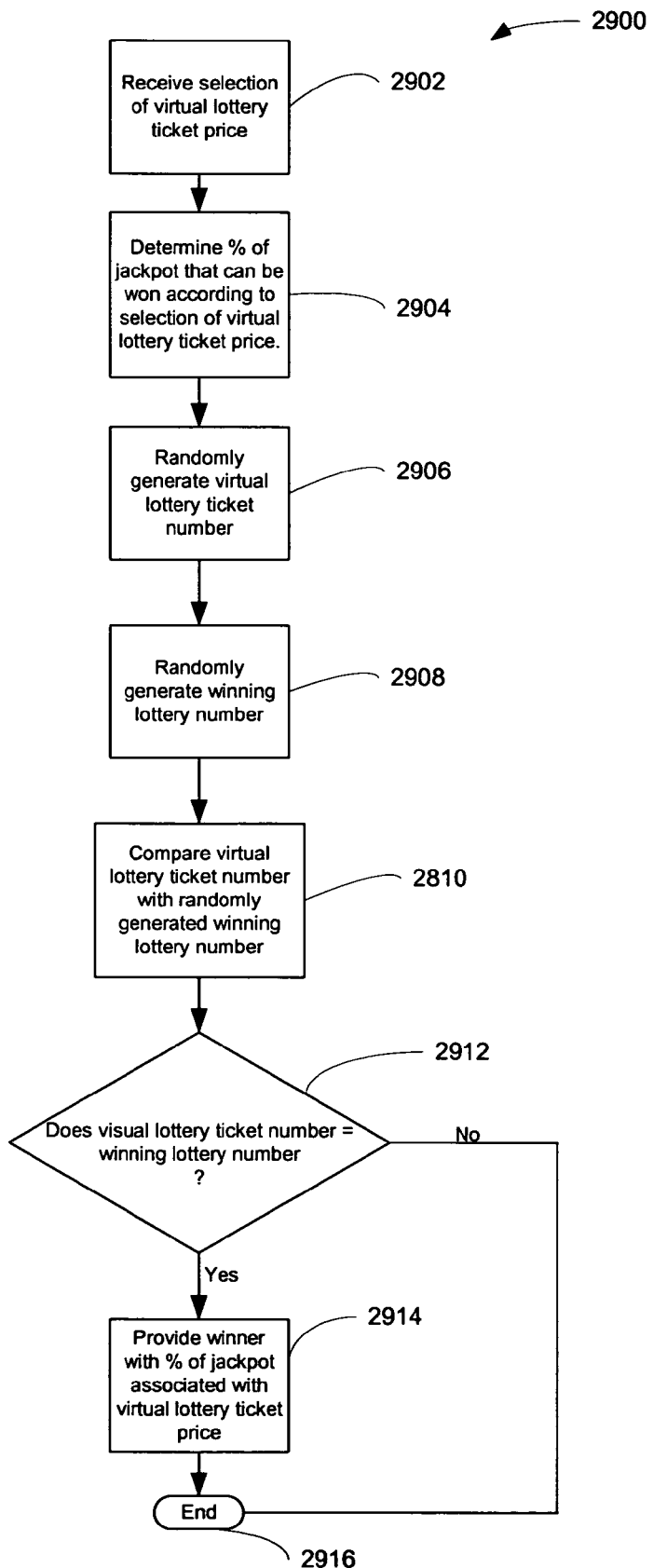
FIG. 29 illustrates another process for conducting the virtual lottery.

FIG. 29 illustrates a process 2900 for the operating the virtual lottery. At a process block 2902, a selection of a virtual lottery ticket price is received. A determination of the potential distribution of the jackpot that can be won is then determined at a process block 2904. If the lottery ticket price is associated with a percentage of the jackpot, the percentage of the current jackpot is calculated and displayed to the player. In one embodiment, this calculation is performed and displayed for all of the price categories prior to the player's selection at the process block 2802. A calculation is not needed for the fixed prize as the fixed prize does not change. At a process block 2906, the player a virtual lottery ticket number is randomly selected. In one embodiment, a quick pick is utilized to randomly select the virtual lottery ticket number. The player can manually enter the virtual lottery ticket number through the input module 2706 on the virtual lottery machine. In an alternative embodiment, the player can choose the quick pick button to have the virtual lottery unit 2404 randomly generated the virtual lottery ticket number for the player. At a process block 2908, the winning virtual lottery ticket number is generated. In one embodiment, the virtual lottery unit generates the winning virtual lottery ticket number. In another embodiment, the server generates the winning virtual lottery ticket number.

At a process block 2910, a comparison is made between virtual lottery ticket number and the winning virtual lottery ticket number. In one embodiment, the virtual lottery unit 2404 performs this comparison. In another embodiment, the server performs this comparison. At a process block 2912, a determination is made if the virtual lottery ticket number equals the winning virtual lottery ticket number. If the virtual lottery ticket number equals the winning virtual lottery number, the process 2300 proceeds to a process block 2914 where the winner is provided with the percentage of the jackpot associated with the virtual lottery ticket price. Alternatively, if the virtual lottery ticket price is associated with a fixed prize, the winner is provided with the fixed prize. The process 2300 then proceeds to the end block 2916. If the virtual lottery ticket number does not equal the winning virtual lottery number, the process 2300 proceeds to the end block 2916.

In one embodiment, the inter-sharing and intra-sharing methodologies discussed above can be implemented in the virtual lottery. For instance, if two players at different virtual lottery units happen to win a jackpot at the same time, the two players may intra-share if they purchased virtual lottery tickets for the same price or may inter-share if they purchased virtual lottery tickets for different prices. If multiple players win at the same time, the players may inter share across price categories and may intra share within the same price category.

Figure 30:
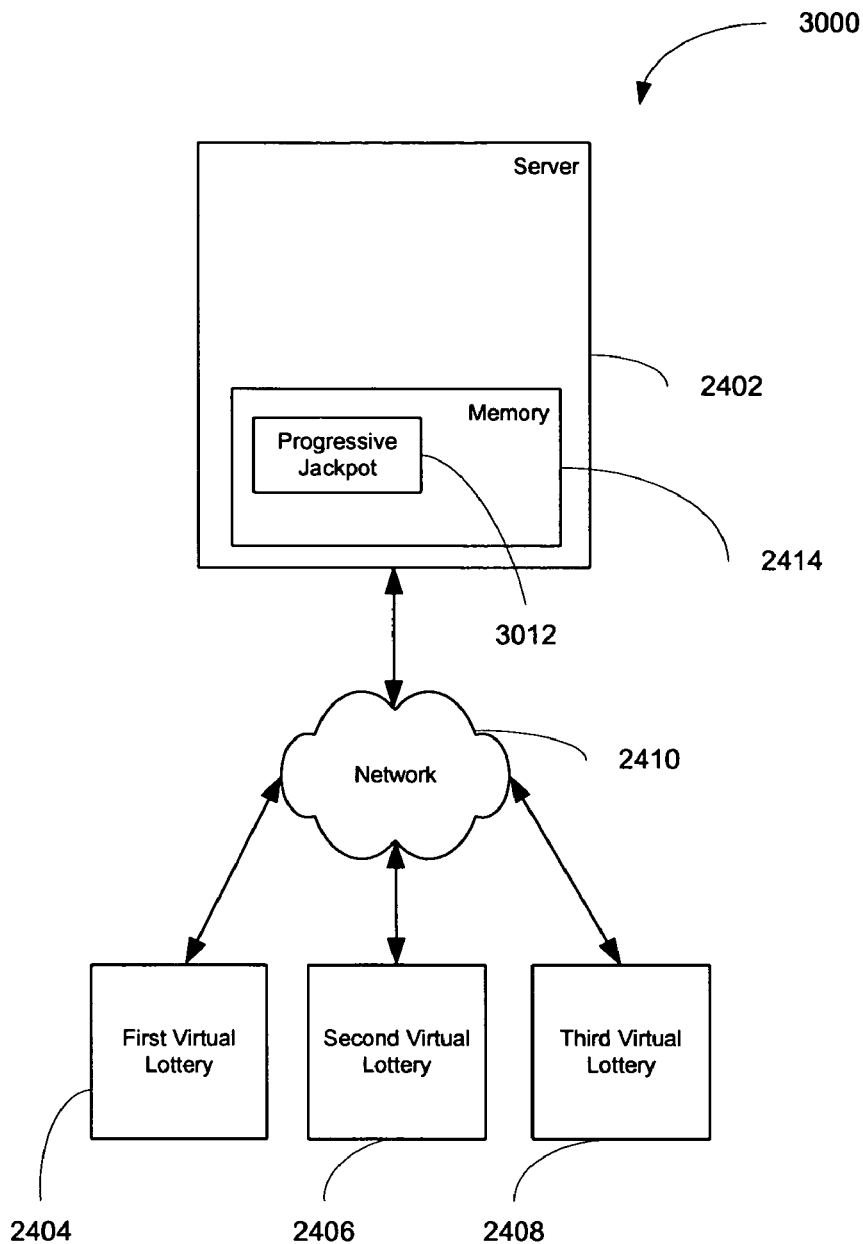
FIG. 30 illustrates a virtual lottery system with a progressive jackpot wherein the advertised jackpot is increased based on a portion of ticket sale revenue.

FIG. 30 illustrates a virtual lottery system 3000 with a progressive jackpot 3012 wherein the advertised jackpot is increased based on a portion of ticket sale revenue. The lottery system 3000 depicted in FIG. 30 is the lottery system depicted in FIG. 24 with a jackpot that is illustrated as being progressive.

Because the lottery system of FIG. 30 utilizes a progressive jackpot, the ticket holder can win a larger jackpot than initially advertised. In one embodiment, the jackpot is increased with a portion of the revenue from each virtual lottery ticket sold.

In one embodiment, the server 2402 communicates with the first virtual lottery unit 2404, the second virtual lottery unit 2406, and the third virtual lottery unit 2408. As players provide payment to enter a virtual lottery at one of the units, at least a portion of the payment is added to a progressive jackpot 3012 stored in the memory 2414. This networking capability between several virtual lottery units allows each of the several units to access a single progressive jackpot 3012. Thus, the progressive jackpot 3012 can be shared among virtual units 2404, 2406, and 2408. In one embodiment, a minimum amount of ticket sales is not required. The lottery prize can be a variable prize from the outset. A percentage of each ticket sale can be contributed to the progressive jackpot.

In another embodiment, a fixed amount of money is added to the jackpot for each ticket sold regardless of the value of the ticket. This makes the progressive jackpot increase in direct proportion to the number of tickets sold.

By having the virtual lottery units connected through the network 2410, the progressive jackpot 3012 can build up based on the quantity and the utilization of the virtual lottery units. Players do not have the time constraints of having to wait for a lottery drawing as in traditional lottery game. Further, players do not have to wait for selections of other players. Accordingly, the progressive jackpot can build up quickly through this type of configuration. The progressive jackpot 3012 can also build up in a similar manner if the virtual lottery units are linked to one another.

In one embodiment, the virtual lottery ticket is associated with a percentage of the progressive jackpot 3012 based on the virtual lottery ticket price. For example, a player with a one-dollar ticket could win twenty-five percent of the progressive jackpot, a player with a two-dollar ticket could win fifty percent of the progressive jackpot, and a player with a three-dollar ticket could win one hundred percent of the progressive jackpot. Consequently, the percentage of the possible jackpot winnings associated with each ticket price can vary. This gives a player purchasing a virtual lottery ticket at a lower price the benefit of participating in a jackpot where other players purchasing a virtual lottery ticket at higher prices are contributing even more to the progressive jackpot. For example, a player with a one-dollar ticket has an associated percentage of the progressive jackpot that the player can win, and a player with a two-dollar ticket or a three-dollar ticket also has an associated percentage of the progressive jackpot the player can win. If the one-dollar ticket holder wins, the one-dollar ticket holder benefits from the portion of the ticketed sales revenue contributed by the two-dollar ticket and the three-dollar ticket to the progressive jackpot. In essence, multiple levels of participation are allowed in a progressive jackpot. Even though the one-dollar ticket holder is limited to winning a lesser percentage, for example, twenty-five percent, the one-dollar ticket holder can benefit from the jackpot prize becoming large.

If the majority of potential ticket holders are induced to purchase three-dollar tickets, the potential ticket holders that can only afford to purchase a one-dollar ticket are still provided with an incentive to participate in the lottery because these ticket holders may still win a portion of a progressive jackpot 3012 that can potentially grow quite large. The growth of the progressive jackpot 3012 is particularly enhanced with the percentage contribution from the higher priced tickets and relatively high starting jackpots resulting from probability-based third-party prize guarantees, as compared with the more traditional pari-mutuel lottery model. The potential ticket holders that can afford the more expensive virtual tickets through the virtual lottery machine are even further induced to purchase tickets that are more expensive. As stated previously, lottery players have an incentive to buy three-dollar tickets because the more expensive tickets carry a greater distribution percentage. With a progressive jackpot, players have an even greater incentive to buy tickets that are more expensive because the jackpot keeps increasing and the potential distribution grows larger.

Furthermore, when a multiple pricing scheme is utilized, players are further encouraged to buy virtual lottery tickets. In traditional lotteries, when the jackpot is won, the next game starts anew with a starting-level jackpot that is generally low. When a multiple pricing scheme is utilized, however, the jackpot is on average maintained at higher levels than without a multiple pricing scheme.

That is, following the selection of a winning number, the jackpot is reduced for ongoing games only if the winner was the purchaser of a three-dollar virtual lottery ticket. If the player with a one-dollar virtual lottery ticket was the winner, such winner would win only twenty-five percent of the jackpot, and the remaining seventy-five percent would carry over for continuing play. Similarly, if the winner was a purchaser of a two-dollar virtual lottery ticket, such winner would only win fifty percent of the jackpot, and the balance of fifty percent would be carried over for continuing play. As contrasted with the foregoing, which results from the multiple pricing scheme and pre-determined percentage allocations for the multiple-priced virtual lottery game, as described herein, in the case of single-priced virtual lottery game or single-priced participation in a progressive jackpot, or with traditional single-priced online lottery games, any winner qualifies for the entire jackpot and, accordingly, the jackpot for continuing play is reduced down to the minimum level. At this minimum level, the lower jackpot is less likely to induce a volume of play consistent with the volume anticipated from the higher average jackpots that would result from both the effect of the jackpot-retention feature described above with the multiple pricing configuration, as well as with the higher starting jackpot levels permitted through the contemplated probability-based third-party prize guarantee structure that is contemplated.

In essence, a rollover is provided when no players win the jackpot, and a limited rollover is provided even when there is a winner, as long as the winner has a lower level denomination priced ticket. Accordingly, the jackpot is on average at a significant level that can induce ticket holders to purchase lottery tickets. This is in contrast to traditional lotteries, which do not have the limited rollover and thereby have jackpots that fall to minimum levels which do not induce potential lottery ticket holders to purchase lottery tickets.

A multiple pricing scheme entails multiple players having multiple levels of participation. Players at lower levels of participation only win a portion of the jackpot but not the complete jackpot. For example, if a one-dollar virtual lottery ticket holder wins, the progressive jackpot distribution can be twenty-five percent of the progressive jackpot leaving seventy-five percent of the progressive jackpot for subsequent players. In addition, the progressive jackpot continues to increase as new virtual lottery tickets are purchased.

Similarly, if a two-dollar virtual lottery ticket holder wins, the progressive jackpot distribution can be fifty percent of the progressive jackpot, leaving the other fifty percent of the progressive jackpot for subsequent players. Again, the progressive jackpot continues to increase. Only when a three-dollar virtual lottery ticket holder wins does the progressive jackpot distribution reach one hundred percent. As such, it is only then when a progressive jackpot starts anew at starting minimum levels.

As it is well known in the art, higher jackpots attract more players to the game. A virtual lottery that has both, a progressive jackpot that continuously grows with the virtual ticket sales, and a multiple-level pricing scheme, maintains the average progressive jackpot at higher amounts. Higher average progressive jackpots further induce play and increase ticket sales revenue.

Figure 31A:
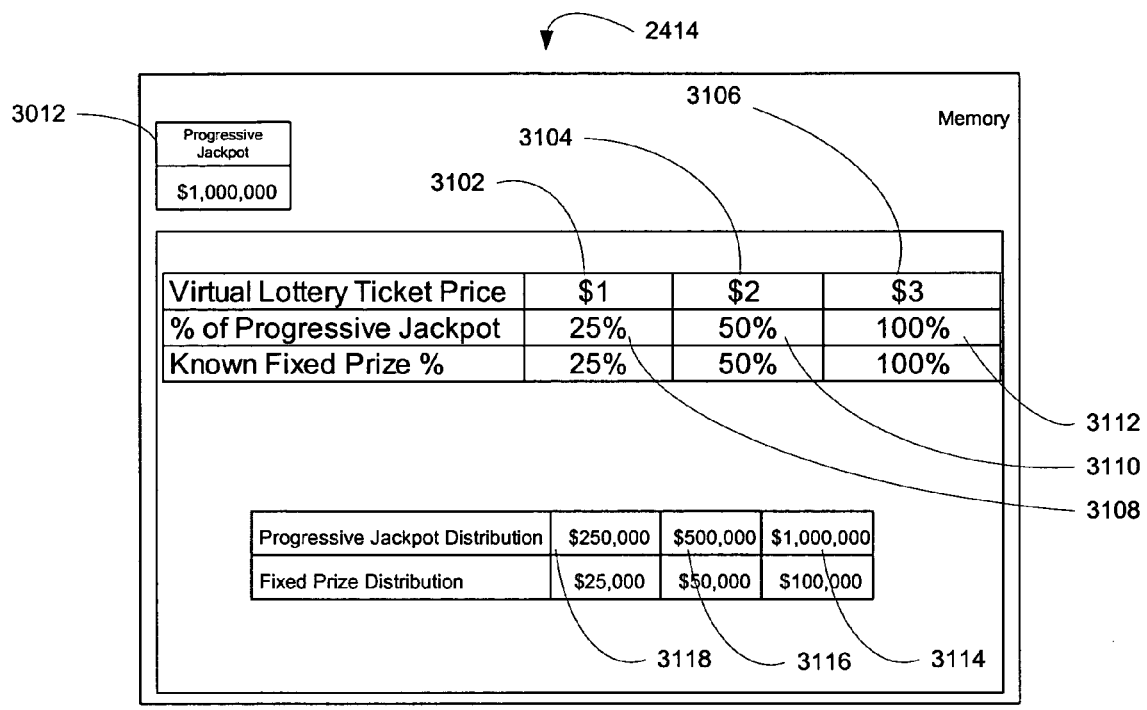
FIG. 31A illustrates the memory containing a plurality of virtual lottery ticket prices and a plurality of known percentages of a progressive jackpot.

FIG. 31A illustrates the memory 2414 containing a plurality of virtual lottery ticket prices and a plurality of known percentages of a progressive jackpot 3012. In one embodiment, percentage 3108 corresponds to a virtual lottery ticket price 3102 providing a one-dollar virtual lottery ticket holder with the ability to win twenty-five percent of the progressive jackpot 3012. Percentage 3104 corresponds to a virtual lottery ticket price 3110 providing a two-dollar virtual lottery ticket holder with the ability to win fifty percent of the progressive jackpot 3012. Percentage 3106 corresponds to a virtual lottery ticket price 3112 providing a three-dollar virtual lottery ticket holder with the ability to win one hundred percent of the progressive jackpot 3012.

In one embodiment, when the progressive jackpot 3012 is initiated, the progressive jackpot 3012 may start with an arbitrary amount, such as one million dollars. In another embodiment, the progressive jackpot 3012 can start with a much higher amount based on an expectation of play and the odds of the game, reflecting a probability-based model and third-party prize guarantee. Such guarantee enables the lottery guarantor to avoid the risk associated with the higher starting jackpot.

The progressive jackpot distribution for each virtual lottery ticket holder varies according to the virtual lottery ticket price and the corresponding percentage. Based on distribution percentages 3112, 3110 and 3108, winning one-dollar virtual lottery ticket holders will receive a progressive jackpot distribution value 3118 of two hundred and fifty thousand dollars. Similarly, winning two-dollar virtual lottery ticket holders will receive a progressive jackpot distribution value 3116 of five hundred thousand dollars. Finally, winning three-dollar virtual lottery ticket holders will receive a progressive jackpot distribution value 3114 of one million dollars.

As the progressive jackpot continues to grow, players have more incentive to continue to buy virtual lottery tickets because the prize that each player can win also grows in proportion to the increase of the progressive jackpot 3012.

In one embodiment, the inter-sharing and intra-sharing methodologies discussed above can be implemented in a virtual lottery that uses a progressive jackpot 3012. For instance, if two players at different virtual lottery units happen to win a progressive jackpot at the same time, the two players may intra-share if they purchased virtual lottery tickets for the same price or may inter-share if they purchased virtual lottery tickets for different prices. The distributions that the two players inter share and intra share would be based on the progressive jackpot 3012. If multiple players win at the same time, the players may inter share across price categories and may intra share within the same price category. The distributions that the multiple players inter share and intra share may be also based on the progressive jackpot 3012.

Figure 31B:
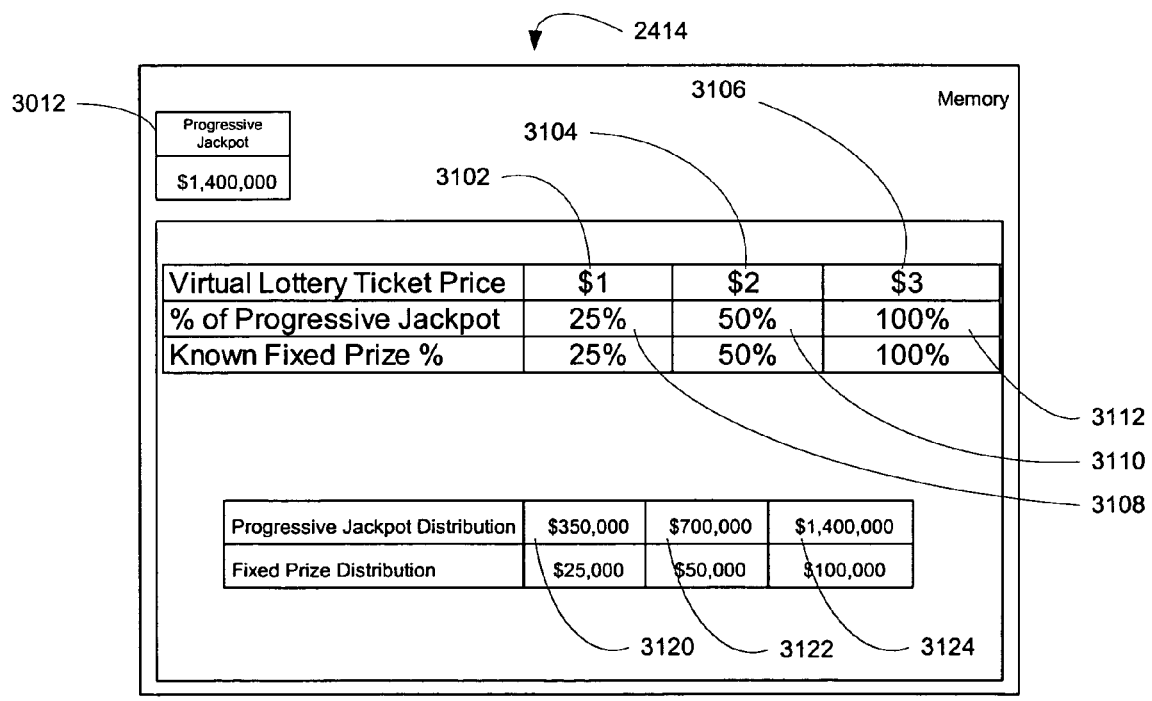
FIG. 31B illustrates the memory containing a plurality of virtual lottery ticket prices and a plurality of known percentages of a progressive jackpot that has increased.

FIG. 31B illustrates the memory 3014 containing a plurality of virtual lottery ticket prices and a plurality of known percentages of a progressive jackpot 3012 that has increased. In one embodiment, a percentage of the virtual lottery ticket price is contributed to the progressive jackpot 3012. As a result, virtual lottery tickets that are more expensive contribute more to the progressive jackpot 3012 than the less expensive virtual lottery tickets. For example, if the contributed percentage were thirty-three percent, a three-dollar virtual lottery ticket would contribute one dollar to that progressive jackpot 3012. By contrast, a one-dollar virtual lottery ticket would contribute thirty-three cents. Therefore, the three-dollar virtual lottery ticket contributes sixty-seven cents more than the one-dollar virtual lottery ticket. However, if he wins, the one-dollar virtual lottery ticket holder may still benefit from the extra sixty-seven cents contributed by the revenue of the three-dollar virtual lottery ticket sale.

In one embodiment, the progressive jackpot 3012 can increase from one million dollars to, for example, one million four hundred thousand dollars. This increase can be the accumulation of the contributions from sales revenue of one-dollar virtual lottery tickets, two-dollar virtual lottery tickets, and three-dollar virtual lottery tickets. With a twenty-five percent distribution 3108, a winning one-dollar virtual lottery ticket holder will receive a progressive jackpot distribution 3120 equal to three hundred and fifty thousand dollars. In comparison to the initial progressive jackpot distribution 3118 of two hundred and fifty thousand dollars, the progressive jackpot distribution 3120 is higher as result of the value increase of the progressive jackpot 3012. The progressive jackpot 3012 in turn increased by contribution of one-dollar, two-dollar and three-dollar virtual lottery tickets. Therefore, the one-dollar virtual lottery ticket holder also benefits from the contributions of the two-dollar and three-dollar virtual lottery ticket sales revenue, as well as from other one-dollar ticket purchases.

Likewise, with a fifty percent distribution 3110, a winning two-dollar virtual lottery ticket holder will receive a progressive jackpot distribution 3122 of seven hundred thousand dollars. In comparison to the initial progressive jackpot distribution 3116 of five hundred thousand dollars, the progressive jackpot distribution 3122 is higher as result of the value increase of the progressive jackpot 3012. The progressive jackpot 3012 in turn increased by contribution of one-dollar, two-dollar and three-dollar virtual lottery tickets. Consequently, the two-dollar virtual lottery ticket holder also benefits from the contributions of one-dollar and three-dollar virtual lottery ticket sales revenue, as well as from other two-dollar ticket purchases.

Finally, a winning three-dollar virtual lottery ticket holder will receive a progressive jackpot distribution 3124 of one million four hundred thousand dollars. The three-dollar virtual lottery ticket holder also benefits from the contributions of one-dollar and two-dollar virtual lottery ticket sales revenue, as well as from other three-dollar ticket purchases.

In another embodiment, the contributions from the sales of one-dollar virtual lottery tickets, two-dollar virtual lottery tickets, and three-dollar virtual lottery tickets can be equal. In other words, a fixed amount of money can be contributed per each virtual lottery ticket sold regardless of the virtual lottery ticket price. For example, ten cents can be contributed to the progressive jackpot 3012 per each virtual lottery ticket sold. Regardless of the virtual lottery ticket price, a winning virtual lottery ticket holder can benefit from the sales contributions of all virtual lottery tickets. Thus, one-dollar virtual lottery ticket holders would still potentially benefit from the contributions of one-dollar, two-dollar and three-dollar virtual lottery ticket sales. The same applies to two-dollar and three-dollar virtual lottery ticket holders.

Figure 32:
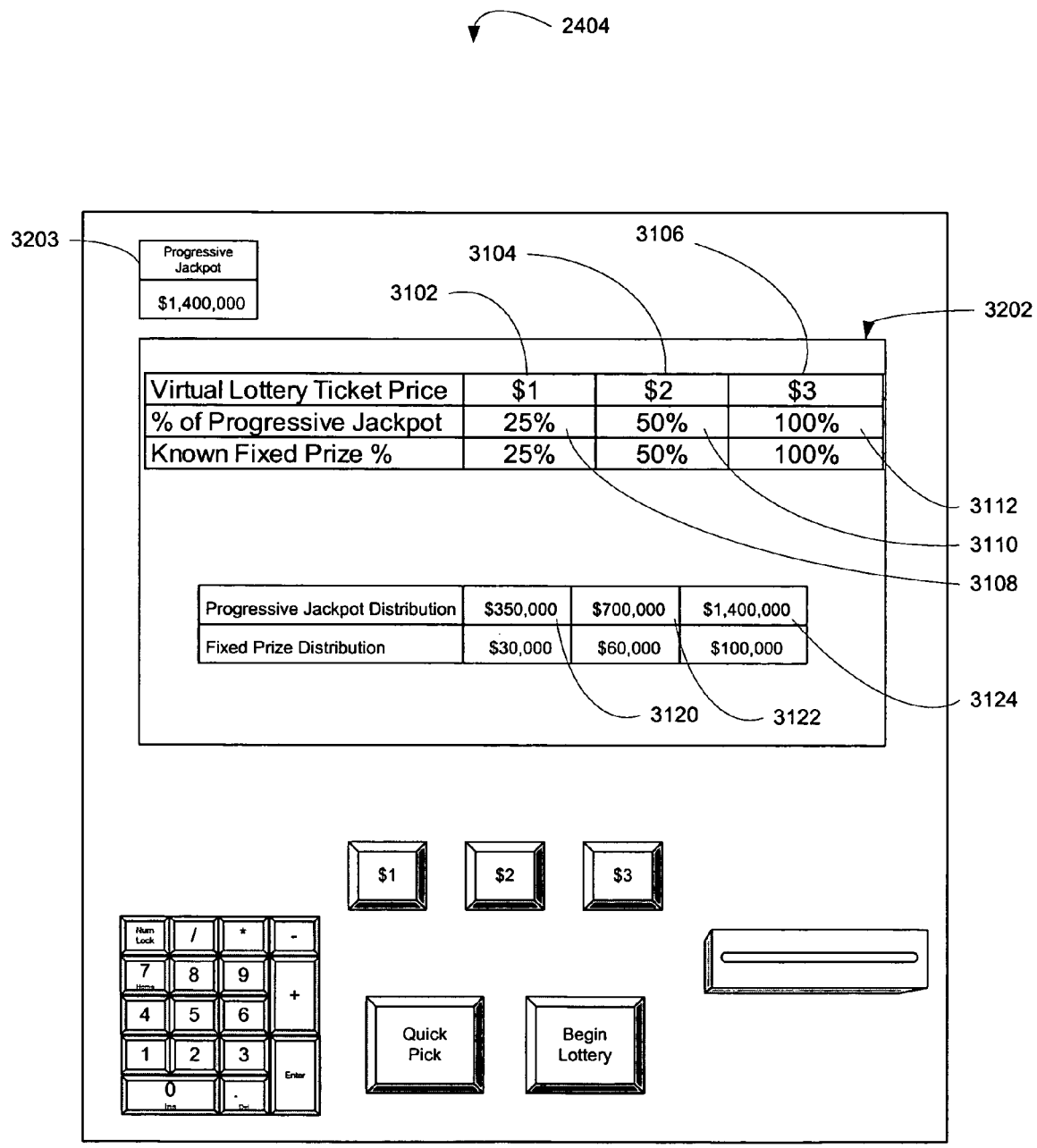
FIG. 32 illustrates the virtual lottery unit for a progressive jackpot.

FIG. 32 illustrates the virtual lottery unit 3004 for a progressive jackpot 3012. The virtual lottery unit 3004 has a progressive jackpot display 3203 that indicates the current progressive jackpot value 3012. In one embodiment, the server 3004 sends the progressive jackpot value 3012 to the virtual lottery unit 3004 for display on the progressive jackpot display 3203. The virtual lottery unit 3004 also has a virtual lottery price display 3202 that displays prices for virtual lottery tickets and associated known percentages for each of the virtual lottery ticket prices. The distribution amount corresponding to each virtual lottery ticket price is also provided. For instance, a player that utilizes the virtual lottery unit 3004 is able to see that a ticket with a virtual lottery ticket price 3102 of one dollar has a percentage distribution 3108 of twenty-five percent. Since the progressive jackpot value 3012 is one million four hundred thousand dollars, the one-dollar progressive jackpot distribution 3120 is three hundred and fifty thousand dollars. Similarly, the player can see that a ticket with a virtual lottery ticket price 3104 of two dollars has a percentage distribution 3110 of fifty percent. Since the progressive jackpot value 3012 is one million four hundred thousand dollars, the two-dollar progressive jackpot distribution 3122 is seven hundred thousand dollars. Finally, the player can also see that a ticket with a virtual lottery ticket price 3106 of three dollars has a percentage distribution 3112 of one hundred percent. Since the progressive jackpot value 3012 is one million four hundred thousand dollars, the three-dollar progressive jackpot distribution 3124 is also one million four hundred thousand dollars.

In another embodiment, the progressive jackpot is sent to a plurality of virtual lottery units operably connected to the server 3004. Each virtual lottery unit receives confirmation of the amount updated progressive jackpot from the server 3004. The update occurs every time a virtual lottery ticket is purchased at any of the connected virtual lottery units. In another embodiment, the update occurs periodically.

In any of the above lottery or virtual lottery configurations, the player may be able to win a secondary prize by having a lottery number that has a subset that equals a subset of the winning lottery number. For instance, the player may choose six numbers, the first three of which are the same as the first three numbers of the winning lottery number. The player may then win a secondary prize. For instance, if the player purchased a one-dollar lottery ticket with a twenty-five percent maximum participation, the player may win half of the twenty-five percent distribution, or twelve and a half percent, as opposed to the full twenty five percent. Alternatively, the winner of a secondary prize may receive a fixed-dollar amount which may vary proportionately or disproportionately with the secondary prize applicable to tickets with alternative denominations and with such fixed secondary prize being based on the applicable ticket price. Thus, a three-dollar ticket winner may win a secondary prize that is three times or four times the amount won by a one-dollar ticket winner.

Other combinations of using a progressive jackpot exist. For example, the progressive jackpot may be available to two-dollar and three-dollar ticket holders only, while one-dollar ticket holders benefit only from the initial amount in the jackpot. Likewise, the progressive jackpot may be available only to three-dollar ticket holders, while two-dollar and one-dollar ticket holders benefit from the initial amount in the jackpot.

While the above description contains many specifics, these should not be construed as limitations on the scope of the disclosure, but rather as an exemplification of preferred embodiments thereof. The disclosure includes any combination or subcombination of the elements from the different species and/or embodiments disclosed herein. One skilled in the art will recognize that these features, and thus the scope of the present disclosure should be interpreted in light of the following claims and any equivalents thereto.

I claim:

1. A virtual lottery unit comprising:
   a virtual lottery ticket price display that displays a first virtual lottery ticket price and a second virtual lottery ticket price;
   a virtual lottery processor configured to (i) operate a virtual lottery game in which the first virtual lottery ticket price corresponds to a first distinct known potential percentage of a progressive jackpot prize that can be won with a virtual lottery ticket purchased according to the first virtual lottery ticket price having a winning virtual lottery ticket number and the second virtual lottery ticket price corresponds to a second distinct known potential percentage of the progressive jackpot prize that can be won with a virtual lottery ticket purchased according to the second virtual lottery ticket price having the winning virtual lottery ticket number, (ii) compare a selection of a virtual lottery ticket number from a player with a winning lottery ticket number, and (iii) calculate a distribution of the progressive jackpot prize to the player based upon a virtual lottery ticket price selected by the player if the virtual lottery ticket number from the player equals the winning virtual lottery ticket number, a sum of the first distinct known potential percentage of the progressive jackpot prize and the second distinct known potential percentage of the progressive jackpot prize being greater than the progressive jackpot prize, the progressive jackpot prize increasing in size based on a portion of ticket sales revenue, the second distinct known potential percentage of the progressive jackpot prize established such that a first association subtracted from a second association results in a fixed non-zero value, the first association equaling the first distinct known potential percentage of the progressive jackpot prize divided by the first virtual lottery ticket price, the second association equaling the second distinct known potential percentage of the progressive jackpot prize divided by the second virtual lottery ticket price;

a price selection input that receives the selection of a virtual lottery ticket price at which the virtual lottery ticket is purchased;

a number selection input that receives the selection of a virtual lottery ticket number from the player; and a random number generator that generates the winning virtual lottery ticket number.

2. The virtual lottery unit of claim 1, wherein an inter-sharing formula is utilized to provide payouts of actual distributions of the progressive jackpot prize to multiple players that each have the selection of the virtual lottery ticket number that equals the winning virtual lottery ticket number.

3. The virtual lottery unit of claim 1, wherein an intra-sharing formula is utilized to provide payouts of actual distributions of the progressive jackpot prize to multiple players that each have the selection of the virtual lottery ticket number that equals the winning virtual lottery ticket number.

4. The virtual lottery unit of claim 1, wherein the portion of ticket sales revenue is accumulated according to identical percentages, each of the identical percentages being associated with each of the virtual lottery ticket prices.

5. The virtual lottery unit of claim 1, wherein the portion of ticket sales revenue is accumulated according to distinct amounts, each of the distinct amounts being associated with each of the virtual lottery ticket prices.

6. The virtual lottery unit of claim 1, wherein the portion of ticket sales revenue is accumulated according to identical amounts, each of the identical amounts being associated with each of the virtual lottery ticket prices.

7. The virtual lottery unit of claim 1, wherein the progressive jackpot is a probabilistic progressive jackpot that has a value which can be greater than revenue generated from the sale of the virtual lottery ticket.

8. The virtual lottery unit of claim 7, wherein the progressive jackpot prize is guaranteed by a third party entity.

9. The virtual lottery unit of claim 1, wherein a value of the progressive jackpot prize is received from a server.

10. The virtual lottery unit of claim 9, further comprising a memory which stores the value of the progressive jackpot prize.

11. The virtual lottery unit of claim 9, wherein the virtual lottery unit is linked to a plurality of virtual lottery units, the virtual lottery unit and the plurality of virtual lottery units being connected through the server.

12. The virtual lottery unit of claim 11, wherein the server sends the increased value of the progressive jackpot prize to each one of the plurality of virtual lottery units.

13. The virtual lottery unit of claim 11, wherein the server sends a value representative of the portion of tickets sale revenue to each one of the plurality of virtual lottery units.

14. The virtual lottery unit of claim 1, wherein the ticket sales revenue is generated by the virtual lottery unit.

15. The virtual lottery unit of claim 1, wherein the ticket sales revenue is generated by the virtual lottery unit and an additional virtual lottery unit connected through a network.

16. The virtual lottery unit of claim 1, wherein the ticket sales revenue is generated by the virtual lottery unit and a plurality of additional virtual lottery units connected through a network.

17. A virtual lottery system comprising:

a server that stores a progressive jackpot that can be won with a winning virtual lottery ticket number, compares a selection of a virtual lottery ticket number received from a virtual lottery unit with the winning virtual lottery ticket number to determine if a virtual lottery game has been won by a player, and calculates a distribution of the progressive jackpot prize to the player based upon a virtual lottery ticket price selected by the player if the virtual lottery ticket number from the player equals the winning virtual lottery ticket number, a sum of a first distinct known potential percentage of the progressive jackpot prize and a second distinct known potential percentage of the progressive jackpot prize is greater than the progressive jackpot prize, wherein the progressive jackpot increases in size based on a portion of virtual lottery ticket sales revenue;

a plurality of virtual lottery units in communication with the server, each of the plurality of virtual lottery units receiving the progressive jackpot value from the server, each of the virtual lottery units having a virtual lottery ticket price display that displays the first virtual lottery ticket price and the second virtual lottery ticket price, each of the virtual lottery units having a virtual lottery unit processor configured to (i) operate a virtual lottery game in which the first virtual lottery ticket price corresponds to the first distinct known potential percentage of a progressive jackpot prize that can be won with a virtual lottery ticket purchased according to the first virtual lottery ticket price having a winning virtual lottery ticket number and the second virtual lottery ticket price corresponds to the second distinct known potential percentage of the progressive jackpot prize that can be won with a virtual lottery ticket purchased according to the second virtual lottery ticket price having the winning virtual lottery ticket number, each of the virtual lottery units having a number selection input that receives a selection of a virtual lottery ticket number from a player, the second distinct known potential percentage of the progressive jackpot prize established such that a first association subtracted from a second association results in a fixed non-zero value, the first association equaling the first distinct known potential percentage of the progressive jackpot prize divided by the first virtual lottery ticket price, the second association equaling the second distinct known potential percentage of the progressive jackpot prize divided by the second virtual lottery ticket price; and a random number generator that generates the winning virtual lottery ticket number.

18. The virtual lottery system of claim 17, wherein after a virtual lottery ticket is purchased at one of the plurality of virtual lottery units, the server sends an increased progressive jackpot value to each of the plurality of virtual lottery units so that each of the plurality of virtual lottery units can provide the player with a current progressive jackpot prize value.

19. The virtual lottery system of claim 18, wherein the server determines the increased progressive jackpot value by adding a previously stored progressive jackpot prize value and a percentage of the price of the virtual lottery ticket sold.

20. The virtual lottery system of claim 18, wherein the server determines the increased progressive jackpot value by adding a previously stored progressive jackpot prize value and a fixed amount.

21. The virtual lottery system of claim 18, wherein the server calculates the distributions of the progressive jackpot value that can be won by computing the percentages associated with each of the virtual lottery ticket prices in relation to the progressive jackpot prize.

22. The virtual lottery system of claim 21, wherein the server sends the calculated distributions to each of the plurality of virtual lottery units.

23. The virtual lottery system of claim 17, wherein the server periodically recalculates an increased progressive jackpot prize value by querying each of the plurality of virtual lottery units for a total amount of sales since a previous query, and wherein the server sends the increased progressive jackpot value to each of the virtual lottery units so that the virtual lottery units can provide the player with a current progressive jackpot value.

24. The virtual lottery system of claim 23, wherein the server calculates the distributions of the progressive jackpot prize value that can be won by computing the percentages associated with each of the virtual lottery ticket prices.

25. The virtual lottery system of claim 23, wherein the server sends the calculated distributions to each of the plurality of virtual lottery units.

26. The virtual lottery system of claim 17, wherein the server decreases the progressive jackpot prize value after a player has won a virtual lottery.

27. The virtual lottery system of claim 26, wherein the server sends the decreased progressive jackpot prize value to each of the virtual lottery units so that the virtual lottery units can provide the player with the current progressive jackpot prize value.

28. The virtual lottery system of claim 26, wherein the server calculates the distributions of the decreased progressive jackpot prize value that can be won by computing the percentages associated with each of the virtual lottery ticket prices in relation to the decreased progressive jackpot prize value.

29. The virtual lottery system of claim 17, wherein the portion of ticket sales revenue is accumulated according to distinct percentages, each of the distinct percentages being associated with each of the virtual lottery ticket prices.

30. The virtual lottery system of claim 29, wherein an inter-sharing formula is utilized to provide payouts of actual distributions of the progressive jackpot prize to multiple players that each have the selection of the virtual lottery ticket number that equals the winning virtual lottery ticket number.

31. The virtual lottery system of claim 29, wherein an intra-sharing formula is utilized to provide payouts of actual distributions of the progressive jackpot prize to multiple players that each have the selection of the virtual lottery ticket number that equals the winning virtual lottery ticket number.

32. The virtual lottery system of claim 17, wherein the portion of ticket sales revenue is accumulated according to identical percentages, each of the identical percentages being associated with each of the virtual lottery ticket prices.

33. The virtual lottery system of claim 17, wherein the portion of ticket sales revenue is accumulated according to distinct amounts, each of the distinct amounts being associated with each of the virtual lottery ticket prices.

34. The virtual lottery system of claim 17, wherein the portion of ticket sales revenue is accumulated according to identical amounts, each of the identical amounts being associated with each of the virtual lottery ticket prices.

35. The virtual lottery system of claim 17, wherein the ticket sales revenue is generated by one of the plurality of virtual lottery units.

36. The virtual lottery system of claim 17, wherein the ticket sales revenue is generated by one of the plurality virtual lottery units and an additional one of the plurality of virtual lottery units connected through a network.

37. The virtual lottery system of claim 17, wherein the ticket sales revenue is generated by the plurality of virtual lottery units.

38. A method comprising:
receiving a selection of a virtual lottery ticket price;
determining, with a virtual lottery processor configured to operate a virtual lottery game, a percentage of a progressive jackpot prize value which increases in size based on a portion of virtual lottery ticket sales revenue, wherein the percentage of the progressive jackpot prize value can be won according to the selection of the virtual lottery ticket price from a first virtual lottery ticket price and a second virtual lottery ticket price, the first virtual lottery ticket price corresponding to a first distinct known potential percentage of the progressive jackpot prize value that can be won with a virtual lottery ticket purchased according to the first virtual lottery ticket price having a winning virtual lottery ticket number, the second virtual lottery ticket price corresponding to a second distinct known potential percentage of the progressive jackpot prize value that can be won with a virtual lottery ticket purchased according to the second virtual lottery ticket price having the winning virtual lottery ticket number, the second distinct known potential percentage of the progressive jackpot prize established such that the first association subtracted from the second association results in a fixed non-zero value, the first association equaling the first distinct known potential percentage of the progressive jackpot prize value divided by the first virtual lottery ticket price, the second association equaling the second distinct known potential percentage of the progressive jackpot prize value divided by the second virtual lottery ticket price;
receiving a player selection of a virtual lottery ticket number;
randomly generating a winning virtual lottery ticket number;
comparing, with the virtual lottery processor, the virtual lottery ticket number with the randomly generated winning lottery ticket number;
calculating, with the virtual lottery processor, a distribution of the progressive jackpot prize value to the player based upon a virtual lottery ticket price selected by the player if the virtual lottery ticket number from the player equals the winning virtual lottery ticket number, a sum of the first distinct known potential percentage of the progressive jackpot prize value and the second distinct known potential percentage of the progressive jackpot prize value is greater than the progressive jackpot prize value; and providing the distribution of the progressive jackpot prize value to the player if the virtual lottery ticket number from the player equals the winning virtual lottery ticket number.

39. The method of claim 38, wherein an inter-sharing formula is utilized to provide payouts of actual distributions of the progressive jackpot prize to multiple players that each have the selection of the virtual lottery ticket number that equals the winning virtual lottery ticket number.

40. The method of claim 38, wherein an intra-sharing formula is utilized to provide payouts of actual distributions of the progressive jackpot prize to multiple players that each have the selection of the virtual lottery ticket number that equals the winning virtual lottery ticket number.

41. The method of claim 38, wherein the portion of ticket sales revenue is accumulated according to identical percentages, each of the identical percentages being associated with each of the virtual lottery ticket prices.

42. The method of claim 38, wherein the portion of ticket sales revenue is accumulated according to distinct amounts, each of the distinct amounts being associated with each of the virtual lottery ticket prices.

43. The method of claim 38, wherein the portion of ticket sales revenue is accumulated according to identical amounts, each of the identical amounts being associated with each of the virtual lottery ticket prices.

44. The method of claim 38, wherein the ticket sales revenue is generated by a virtual lottery unit.

45. The method of claim 38, wherein the ticket sales revenue is generated by a virtual lottery unit and an additional virtual lottery unit connected through a network.

46. The method of claim 38, wherein the ticket sales revenue is generated by a virtual lottery unit and a plurality of additional virtual lottery units connected through a network.

47. The method of claim 38, further comprising increasing the progressive jackpot value by adding a previously stored progressive jackpot prize value and a percentage of the virtual lottery ticket price.

48. The method of claim 38, further comprising increasing the progressive jackpot prize value by adding a previously stored progressive jackpot value and a fixed value.

49. The method of claim 38, further comprising calculating distributions of the progressive jackpot prize value that can be won by computing the percentage of the progressive jackpot that can be won according to the selection of the virtual lottery ticket price.

50. The method of claim 38, further comprising communicating the increased progressive jackpot value to a plurality of players, wherein each one of the plurality of players may participate in the virtual lottery, the virtual lottery utilizing the increased progressive jackpot prize value.

51. The method of claim 38, further comprising communicating the increased progressive jackpot value from a server to a plurality of virtual lottery units, the virtual lottery units utilizing the increased progressive jackpot prize value.

52. The virtual lottery unit of claim 1, wherein an inter-sharing formula and an intra-sharing formula are utilized to provide payouts of actual distributions of the progressive jackpot prize to multiple players that each have the selection of the virtual lottery ticket number that equals the winning virtual lottery ticket number.

53. The virtual lottery system of claim 17, wherein an inter-sharing formula and an intra-sharing formula are utilized to provide payouts of actual distributions of the progressive jackpot prize to multiple players that each have the selection of the virtual lottery ticket number that equals the winning virtual lottery ticket number.

54. The method of claim 38, wherein an inter-sharing formula and an intra-sharing formula are utilized to provide payouts of actual distributions of the progressive jackpot prize to multiple players that each have the selection of the virtual lottery ticket number that equals the winning virtual lottery ticket number.

55. The virtual lottery unit of claim 1, wherein the first distinct known potential percentage of the progressive jackpot prize is determined based on a potential single winner.

56. The virtual lottery unit of claim 1, wherein the second distinct known potential percentage of the progressive jackpot prize is determined based on a potential single winner.

57. The virtual lottery system of claim 17, wherein the first distinct known potential percentage of the progressive jackpot prize is determined based on a potential single winner.

58. The virtual lottery system of claim 17, wherein the second distinct known potential percentage of the progressive jackpot prize is determined based on a potential single winner.

59. The method of claim 38, wherein the first distinct known potential percentage of the progressive jackpot prize value is determined based on a potential single winner.

60. The method of claim 38, wherein the second distinct known potential percentage of the progressive jackpot prize value is determined based on a potential single winner.

* * * * *